US012485471B2

(12) United States Patent
Shindou et al.

(10) Patent No.: US 12,485,471 B2
(45) Date of Patent: Dec. 2, 2025

(54) BINDING SYSTEM, METHOD FOR BINDING, AND COMPUTER READABLE STORAGE MEDIUM STORING PROGRAM

(71) Applicant: MAX CO., LTD., Tokyo (JP)

(72) Inventors: Shigeki Shindou, Tokyo (JP); Kenichi Arai, Tokyo (JP); Yosei Nodaguchi, Tokyo (JP)

(73) Assignee: Max Co., Ltd., Tokyo (JP)

(*) Notice: Subject to any disclaimer, the term of this patent is extended or adjusted under 35 U.S.C. 154(b) by 364 days.

(21) Appl. No.: 18/098,882

(22) Filed: Jan. 19, 2023

(65) Prior Publication Data
US 2023/0226592 A1    Jul. 20, 2023

(30) Foreign Application Priority Data
Jan. 20, 2022   (JP) ................... 2022-007035

(51) Int. Cl.
*G05B 19/4155* (2006.01)
*B21F 15/04* (2006.01)
*E04G 21/12* (2006.01)

(52) U.S. Cl.
CPC .......... *B21F 15/04* (2013.01); *E04G 21/123* (2013.01); *G05B 19/4155* (2013.01); *G05B 2219/39147* (2013.01)

(58) Field of Classification Search
CPC ...... B25J 11/005; B25J 9/1633; B25J 9/1687; B25J 15/0066; G05B 2219/39147; G05B 2219/45033; G05B 2219/45104; G05B 2219/37217; G05B 2219/39131; G05B 2219/39132; G05B 2219/49015; B21F 15/04; B21F 15/00; B21F 27/08; E04G 21/123; E04G 21/122; E04G 21/15;
(Continued)

(56) References Cited

U.S. PATENT DOCUMENTS

| 2018/0181134 A1 | 6/2018 | Muck et al. |
| 2020/0009673 A1* | 1/2020 | Fujii ............. B23K 9/095 |

(Continued)

FOREIGN PATENT DOCUMENTS

| CN | 111576888 A | 8/2020 | |
| CN | 113846803 A * | 12/2021 | ............ E04C 5/04 |

(Continued)

OTHER PUBLICATIONS

Extended European Search Report dated May 4, 2023, issued by the European Patent Office in the corresponding European Patent Application No. 23152684.9. (10 pages).

*Primary Examiner* — Khoi H Tran
*Assistant Examiner* — Tanner L Cullen
(74) *Attorney, Agent, or Firm* — Banner & Witcoff, Ltd.

(57) ABSTRACT

A binding system including: a binding device including a binding machine that binds reinforcing bars with a wire, and a transfer robot that moves the binding machine to a binding position by a relative movement between the binding machine and the reinforcing bars; an information acquisition unit configured to acquire binding related information related to an operation of binding the reinforcing bars with the wire; and a position information acquisition unit configured to acquire position information of the binding position in a manner associable with the binding related information for the binding position acquired by the information acquisition unit.

9 Claims, 46 Drawing Sheets

(58) Field of Classification Search
CPC ................................. E04C 5/04; B25B 25/00;
B65B 27/10; B65B 13/28; B65B 13/16
See application file for complete search history.

(56) References Cited

U.S. PATENT DOCUMENTS

| | | | | |
|---|---|---|---|---|
| 2020/0147797 A1* | 5/2020 | George | ................ | B25J 19/023 |
| 2023/0094722 A1* | 3/2023 | Matsuno | ................ | B25J 5/005 |
| | | | | 140/118 |

FOREIGN PATENT DOCUMENTS

| | | |
|---|---|---|
| CN | 215443176 U | 1/2022 |
| JP | 2013-035052 A | 2/2013 |
| JP | 2019-039170 A | 3/2019 |
| JP | 2020-504254 A | 2/2020 |
| JP | 2020-197072 A | 12/2020 |

\* cited by examiner

BINDING SYSTEM, METHOD FOR BINDING, AND COMPUTER READABLE STORAGE MEDIUM STORING PROGRAM

CROSS-REFERENCE TO RELATED APPLICATIONS

This application claims priority to Japanese Patent Application No. 2022-007035 filed on Jan. 20, 2022, the content of which is incorporated herein by reference.

TECHNICAL FIELD

The present invention relates to a binding system including a binding machine that binds reinforcing bars with a wire.

BACKGROUND ART

Reinforcing bars are used in concrete structures to improve the strength, and are bound with wires such that the reinforcing bars do not deviate from a predetermined position when concrete is poured.

In the related art, there has been proposed a binding machine called a reinforcing bar binding machine that winds a wire around two or more reinforcing bars, and twists the wire wound around the reinforcing bars to bind the two or more reinforcing bars with the wire.

In addition to the binding machine used by being held by hand, as a reinforcing mesh manufacturing device, there is known a device in which a plurality of binding machines are arranged in two front and rear rows, and a machine is inserted and removed by being moved up and down while supplying reinforcing bars, thereby binding the reinforcing bars (for example, see JP2013-35052A).

In a reinforcing mesh manufacturing device in the related art, information related to binding, such as information indicating whether reinforcing bars can be normally bound with a wire and information for specifying a position of a binding position where binding has not been normally performed, is not acquired. As a result, in a reinforcing mesh having a plurality of binding positions, it is difficult to search for the binding related information for each binding position.

An object of the present invention is to provide a binding system capable of acquiring binding related information and a position of a binding position.

SUMMARY OF INVENTION

According to an aspect of the present invention, there is provided a binding system including: a binding device including a binding machine that binds reinforcing bars with a wire, and a transfer robot that moves the binding machine to a binding position by a relative movement between the binding machine and the reinforcing bars; an information acquisition unit configured to acquire binding related information related to an operation of binding the reinforcing bars with the wire; and a position information acquisition unit configured to acquire position information of the binding position in a manner associable with the binding related information for the binding position acquired by the information acquisition unit.

In a structure in which a plurality of binding positions are formed, the position information for specifying the binding position and the binding related information in each binding position may be associated with each other.

DESCRIPTION OF EMBODIMENTS

Hereinafter, an example of binding equipment as an embodiment of a binding device of the present invention, and a reinforcing bar binding machine as an embodiment of a binding machine used for the binding equipment will be described with reference to the drawings.

Figure 1A:
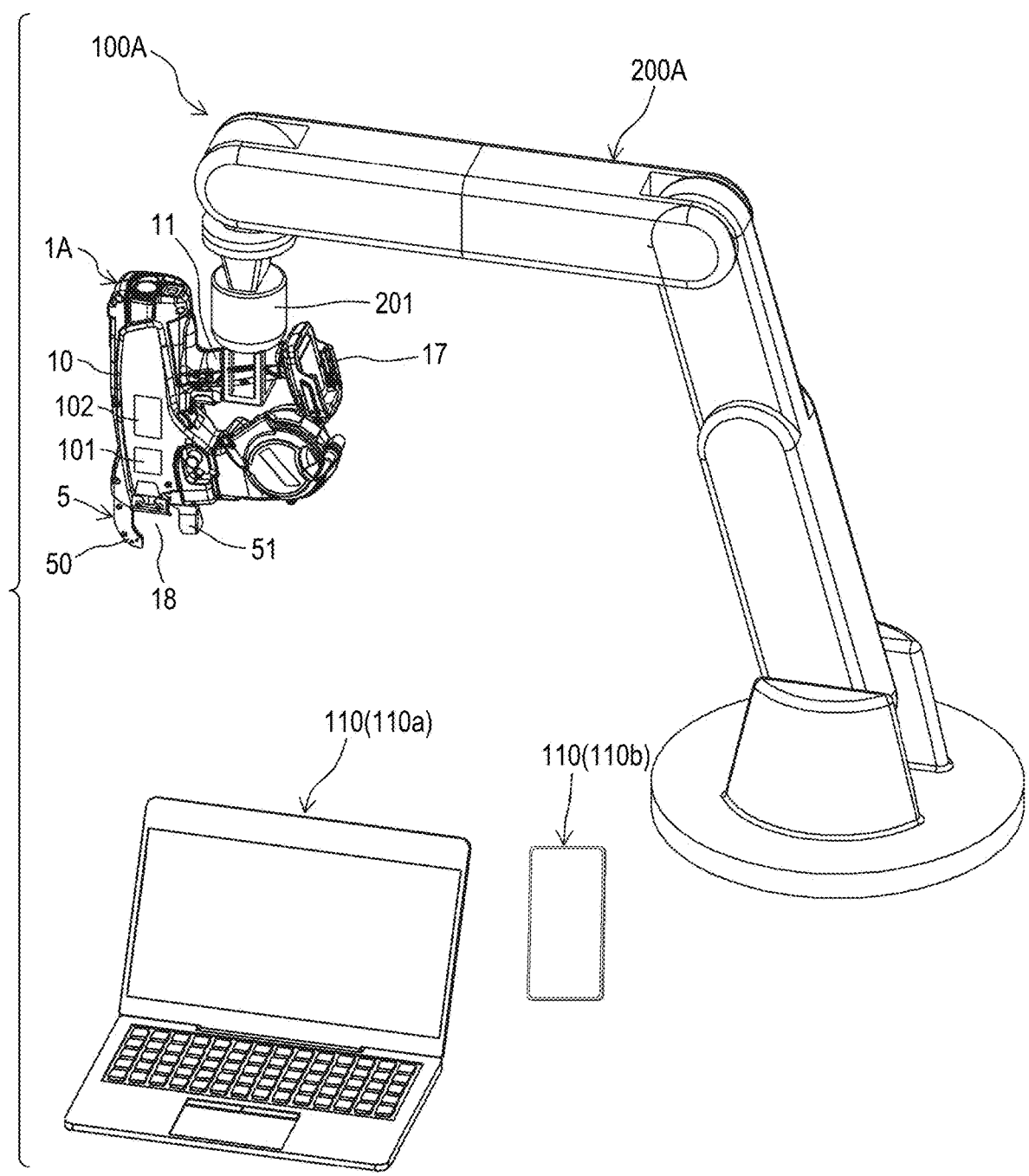
FIG. 1A is a perspective view illustrating an example of binding equipment according to the present embodiment.
Figure 1B:
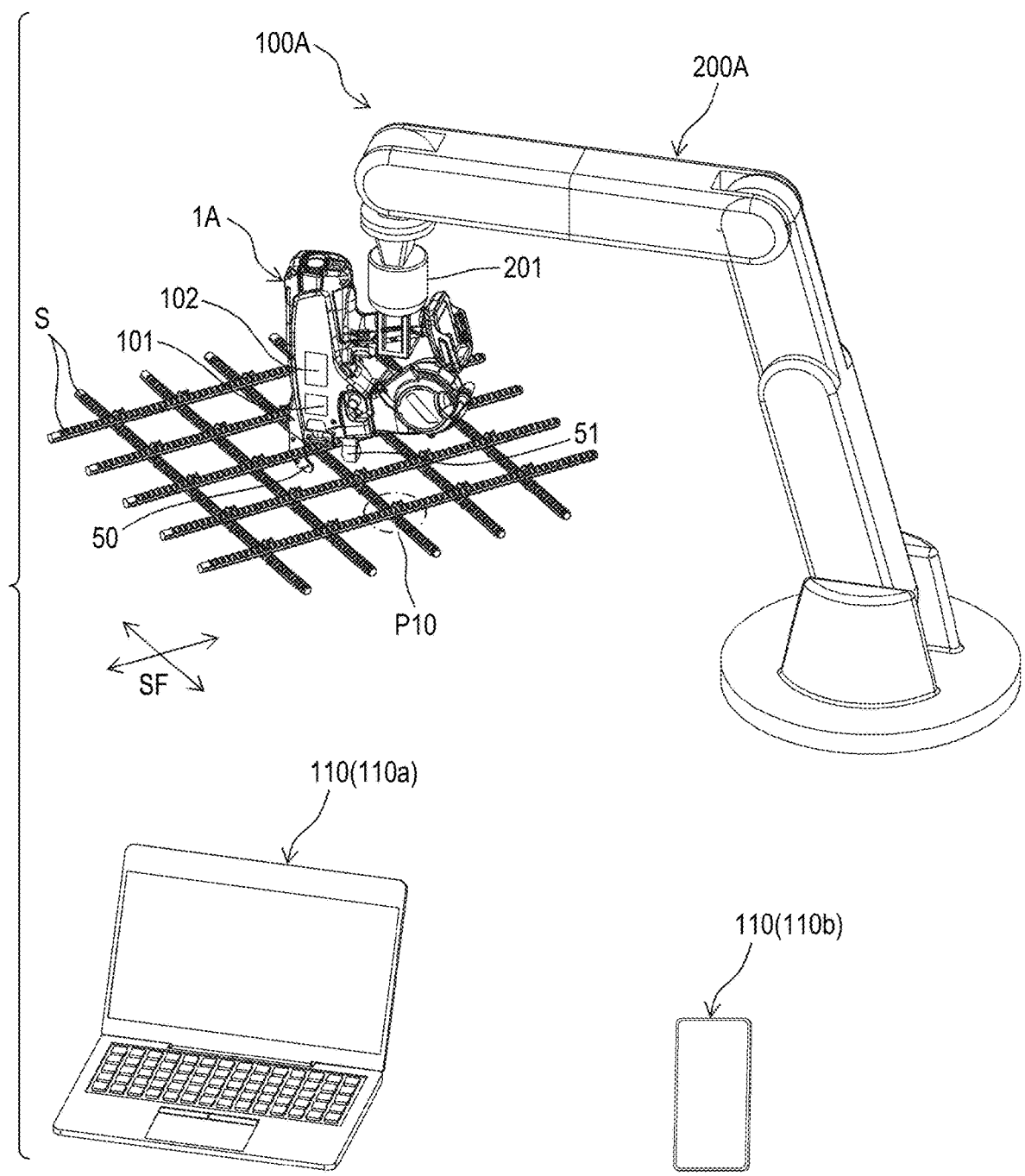
FIG. 1B is a perspective view illustrating the example of the binding equipment according to the present embodiment.
Figure 1C:
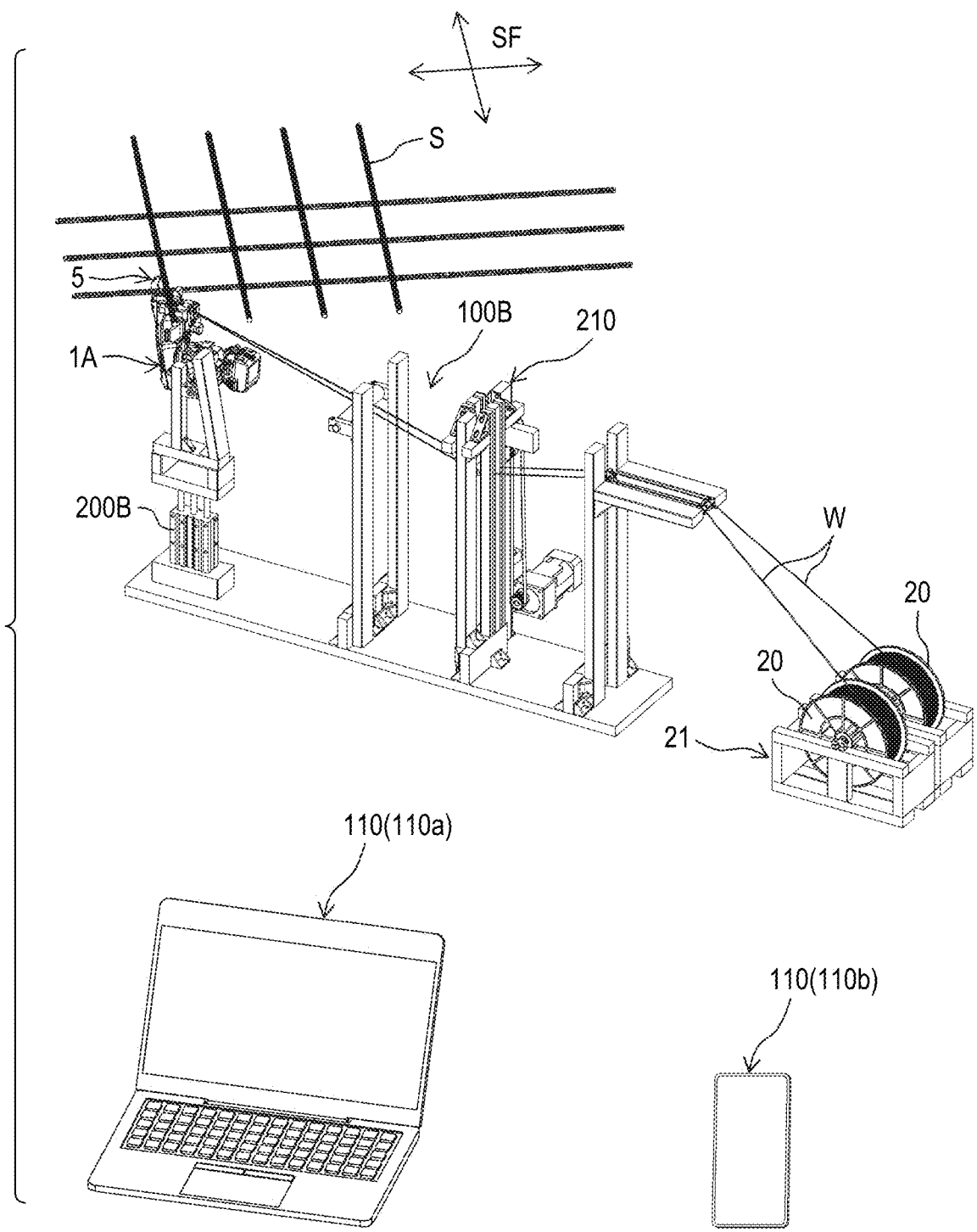
FIG. 1C is a perspective view illustrating another example of the binding equipment according to the present embodiment.

Example of Overall Configuration of Binding Equipment According to Present Embodiment FIGS. 1A and 1B are perspective views illustrating an example of binding equipment according to the present embodiment, and FIG. 1C is a perspective view illustrating another example of the binding equipment according to the present embodiment. Binding equipment 100A illustrated in FIGS. 1A and 1B includes: a reinforcing bar binding machine 1A that uses reinforcing bars S as a target to be bound and an intersection of two intersecting reinforcing bars S as a binding position P10, and binds the intersection of the two intersecting reinforcing bars S with a wire W; and a transfer robot 200A that moves the reinforcing bar binding machine 1A to the binding position P10.

The transfer robot 200A is implemented by, for example, a device called a robot arm or the like in which a plurality of arms are rotatably connected via a shaft, and moves the reinforcing bar binding machine 1A to the binding position P10 by moving the reinforcing bar binding machine 1A in a direction approaching and a direction separating from a disposition plane SF of the reinforcing bars S and in a direction along the disposition plane SF.

Binding equipment 100B illustrated in FIG. 1C has a configuration in which a reel accommodation unit 21 that accommodates reels 20 around which the wire W is wound is independent of the reinforcing bar binding machine 1A, and includes the reinforcing bar binding machine 1A, the reel accommodation unit 21 provided corresponding to the reinforcing bar binding machine 1A, and a wire drawing mechanism 210 that draws out the wire W from the reels 20 accommodated in the reel accommodation unit 21. In addition, the binding equipment 100B includes a transfer robot 200B that moves the reinforcing bar binding machine 1A to the binding position P10.

The binding equipment 100B moves the binding position P10 to a predetermined position facing the reinforcing bar binding machine 1A by moving the reinforcing bars S in the direction along the disposition plane SF by another transfer robot such as a transport mechanism (not illustrated). In addition, the transfer robot 200B moves the reinforcing bar binding machine 1A to the binding position P10 by moving the reinforcing bar binding machine 1A in the direction approaching and the direction separating from the disposition plane SF of the reinforcing bars S.

The reinforcing bar binding machine 1A illustrated in FIGS. 1A, 1B, and 1C includes an information acquisition unit 101 as an example of an information acquisition means that acquires binding related information related to a binding operation of binding the reinforcing bars S with the wire W, such as information indicating presence or absence of a failure that hinders the binding operation of binding the reinforcing bars S with the wire W, information indicating a state (also referred to as a binding state) of the wire W that binds the reinforcing bars S by the binding operation, information identifying the reinforcing bars S, and information identifying a position of the binding position P10. In addition, the reinforcing bar binding machine 1A includes an information communication unit 102 that notifies an information processing device 110 (110a and 110b) such as a personal computer, a smartphone, or a tablet of the binding related information acquired by the information acquisition unit 101. The information communication unit 102 implemented by, for example, a wireless communication chip including an antenna, a transmission circuit, a reception circuit, and the like.

Figure 2:
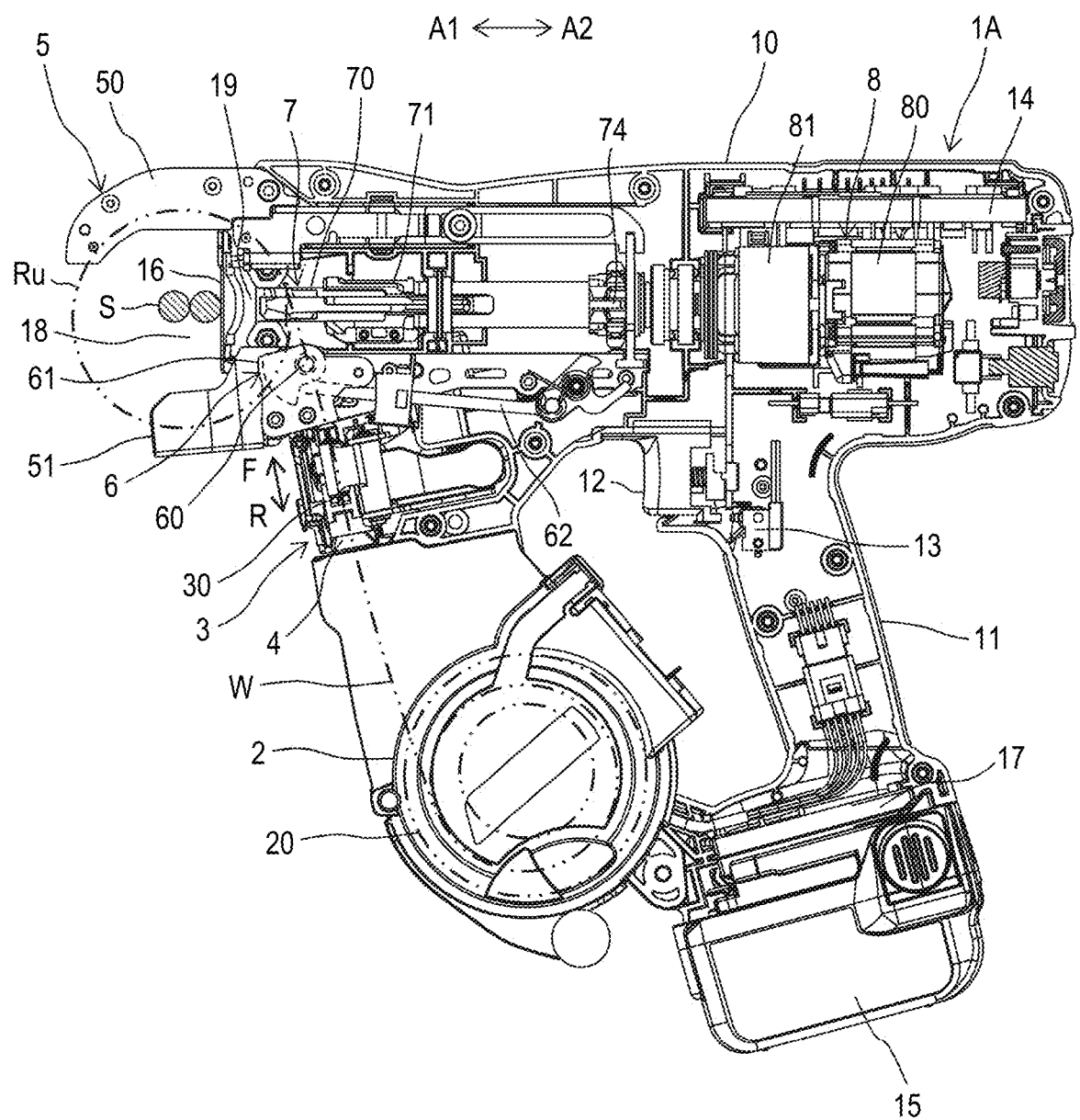
FIG. 2 is a side view illustrating an example of a reinforcing bar binding machine according to the present embodiment.

Example of Configuration of Reinforcing Bar Binding Machine According to Present Embodiment FIG. 2 is a side view illustrating an example of the reinforcing bar binding machine according to the present embodiment. The reinforcing bar binding machine 1A is an example of a binding machine, and binds the intersection of the two intersecting reinforcing bars S with the wire W. In this example, the wire W is wound around the intersection of the two reinforcing bars S by an operation of feeding the wire W in a forward direction indicated by an arrow F, the wire W wound around the reinforcing bars S is cut after being wrapped around the reinforcing bars S by an operation of feeding the wire W in a reverse direction indicated by an arrow R, then the wire W is twisted, and the intersection of the two reinforcing bars S is bound with the wire W.

In order to realize the above-described functions, the reinforcing bar binding machine 1A includes a magazine 2 in which the wire W is accommodated, a wire feeding unit 3 that feeds the wire W in the forward direction and the reverse direction, and wire guides 4 that guide the wire W fed by the wire feeding unit 3. In addition, the reinforcing bar binding machine 1A includes a curl forming unit 5 constituting a path through which the wire W fed by the wire feeding unit 3 is wound around the reinforcing bars S, and a cutting unit 6 that cuts the wire W wrapped around the reinforcing bars S. Further, the reinforcing bar binding machine 1A includes a binding unit 7 that twists the wire W wrapped around the reinforcing bars S, and a driving unit 8 that drives the binding unit 7.

The magazine 2 is an example of an accommodation unit, and a reel 20, around which an elongated wire W is wound so as to be able to be unwound, is rotatably and detachably accommodated therein. As the wire W, a wire formed of a plastically deformable metal wire, a wire obtained by coating a metal wire with a resin, or a twisted wire is used.

In a configuration in which the reinforcing bars S are bound with a single wire W, the single wire W is wound around a hub portion (not illustrated) of the reel 20, and the single wire W can be drawn out while the reel 20 rotates. In addition, in a configuration in which the reinforcing bars S are bound with a plurality of wires W, the plurality of wires W are wound around the hub portion, and the plurality of wires W can be simultaneously drawn out while the reel 20 rotates. For example, in a configuration in which the reinforcing bars S are bound with two wires W, the two wires W are wound around the hub portion, and the two wires W can be simultaneously drawn out while the reel 20 rotates.

In the reinforcing bar binding machine 1A illustrated in FIG. 1C, since the reel accommodation unit 21 that accommodates the reels 20 around which the wire W is wound has a configuration independent of the reinforcing bar binding machine 1A, the magazine 2 may not be provided. Similarly, in the reinforcing bar binding machine 1A illustrated in FIGS. 1A and 1B, the magazine 2 that accommodates the reel 20 may be implemented to be independent of the reinforcing bar binding machine 1A, and a form of the magazine 2 independent of the reinforcing bar binding machine 1A is not limited to a form illustrated in FIG. 2. Further, in the reinforcing bar binding machine A in which the reinforcing bars S are bound with a plurality of wires W, in a configuration in which the reel accommodation unit 21 (magazine 2) is independent of the reinforcing bar binding machine 1A, a plurality of reels 20 around which a single wire W is wound may be accommodated in the reel accommodation unit 21 (magazine 2), and the wire W may be simultaneously drawn out from the respective reels 20, so that the plurality of wires W may be supplied to the reinforcing bar binding machine 1A.

The wire feeding unit 3 includes a pair of feeding gears 30 that clamp and feed the wire W. In the wire feeding unit 3, as a rotation operation of a feed motor 31 (see FIGS. 4A, 4B, 4C, and 4D) is transmitted, the feeding gears 30 rotate. As a result, the wire feeding unit 3 feeds the wire W clamped between the pair of feeding gears 30 along an extending direction of the wire W. In a configurations in which a plurality of, for example, two wires W are fed to bind the reinforcing bars S, the two wires W are fed in a state of being arranged in parallel.

In the wire feeding unit 3, by switching forward and reverse of a rotation direction of the feed motor 31, a rotation direction of the feeding gears 30 is switched, and forward and reverse of a feeding direction of the wire W is switched, whether to feed the wire W in the forward direction indicated by the arrow F, or feed the wire W in the reverse direction indicated by the arrow R.

The wire guides 4 are provided at predetermined positions on an upstream side and a downstream side of the wire feeding unit 3 with respect to the feeding direction in which the wire W is fed in the forward direction. In the configuration in which the two wires W are fed to bound the reinforcing bars S, the wire guide 4 provided on the upstream side of the wire feeding unit 3 regulates orientations of the two wires W in a radial direction, and guides the two entered wires W between the pair of feeding gears 30 in parallel. The wire guide 4 provided on the downstream side of the wire feeding unit 3 regulates the orientations of the two wires W in the radial direction, and guides the two entered wires W to the cutting unit 6 and the curl forming unit 5 in parallel.

The curl forming unit 5 includes a curl guide 50 that imparts a winding habit to the wire W fed by the wire feeding unit 3, and a leading guide 51 that leads, to the binding unit 7, the wire W imparted with the winding habit by the curl guide 50. In the reinforcing bar binding machine 1A, the path of the wire W fed by the wire feeding unit 3 is regulated by the curl forming unit 5, so that a trajectory of the wire W becomes a loop Ru as indicated by a chain double-dashed line in FIG. 2, and the wire W is wound around the reinforcing bars S.

The cutting unit 6 has a configuration in which the wire W is cut by a relative operation of a pair of blade portions, and in this example, includes a fixed blade portion 60 and a movable blade portion 61 that rotates about the fixed blade portion 60 which serves as a fulcrum axis. In the cutting unit 6, an operation of the binding unit 7 is transmitted to the movable blade portion 61 via a transmission member 62, and the cutting unit 6 cuts the wire W sandwiched between the fixed blade portion 60 and the movable blade portion 61 by a rotation operation of the movable blade portion 61.

The binding unit 7 includes a locking member 70 that locks the wire W and a sleeve 71 that causes the locking member 70 to operate. The driving unit 8 includes a motor 80 and a reduction gear 81 that performs speed reduction and torque amplification.

When the binding unit 7 is driven by the driving unit 8, the sleeve 71 causes the locking member 70 to operate so as to lock the wire W. In addition, the binding unit 7 binds the reinforcing bars S by twisting the wire W after the operation of the sleeve 71 is transmitted to the movable blade portion 61 via the transmission member 62 and the cutting unit 6 cuts the wire W in conjunction with the operation of the sleeve 71.

In the reinforcing bar binding machine 1A, the wire feeding unit 3, the wire guides 4, the cutting unit 6, the binding unit 7, the driving unit 8, and the like are accommodated inside a main body portion 10. In the reinforcing bar binding machine 1A, the binding unit 7 is provided inside a front end side (also referred to as a front side) which is one end portion along an extending direction of the main body portion 10, and the driving unit 8 is provided inside a rear end side (also referred to as a rear side) which is the other end portion thereof.

In addition, in the reinforcing bar binding machine 1A, the curl guide 50 and the leading guide 51 of the curl forming unit 5 are provided at an end portion of the front side of the main body portion 10. In the reinforcing bar binding machine 1A, a portion between the curl guide 50 and the leading guide 51 serves as an introduction portion 18 where the reinforcing bars S are placed. Further, in the reinforcing bar binding machine 1A, an abutting portion 16 against which the reinforcing bars S placed into the introduction portion 18 abuts is provided between the curl guide 50 and the leading guide 51 at the end portion of the front side of the main body portion 10.

Further, in a case where the reinforcing bar binding machine 1A is applied in a form to be used by being held by hand of an operator, a handle portion 11 which can be operated by being held by hand is provided in the main body portion 10. In the reinforcing bar binding machine 1A, the handle portion 11 extends downward from the main body portion 10, and a battery attachment portion 17 to which a battery 15 is attachably and detachably attached is provided at a lower portion of the handle portion 11. In addition, in the reinforcing bar binding machine 1A, the magazine 2 is provided in front of the handle portion 11.

In the case where the reinforcing bar binding machine 1A is applied in a form to be used by being held by hand of an operator, a trigger 12 is provided on the front side of the handle portion 11, and a switch 13 is provided inside the handle portion 11. In the reinforcing bar binding machine 1A, the control unit 14 controls the motor 80 and the feed motor 31 in accordance with a state of the switch 13 pressed with an operation of the trigger 12. The control unit 14 is implemented by, for example, a Micro controller unit (MCU) including a processor, a memory, an interface, and the like.

Incidentally, since the reinforcing bar binding machine 1A used in the binding equipment 100A and the binding equipment 100B includes the trigger 12, an operation confirmation can be performed by the reinforcing bar binding machine 1A alone without performing control by the information processing device 110a. However, the reinforcing bar binding machine 1A used in the binding equipment 100A and the binding equipment 100B may be implemented not to include the trigger 12 and the switch 13.

Figure 3A:
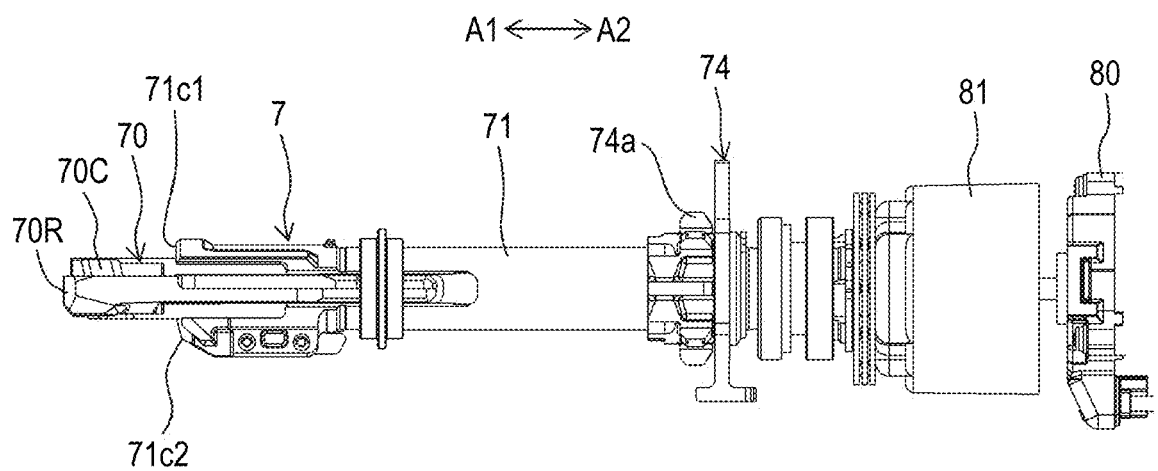
FIG. 3A is a side view illustrating an example of a binding unit.
Figure 3B:
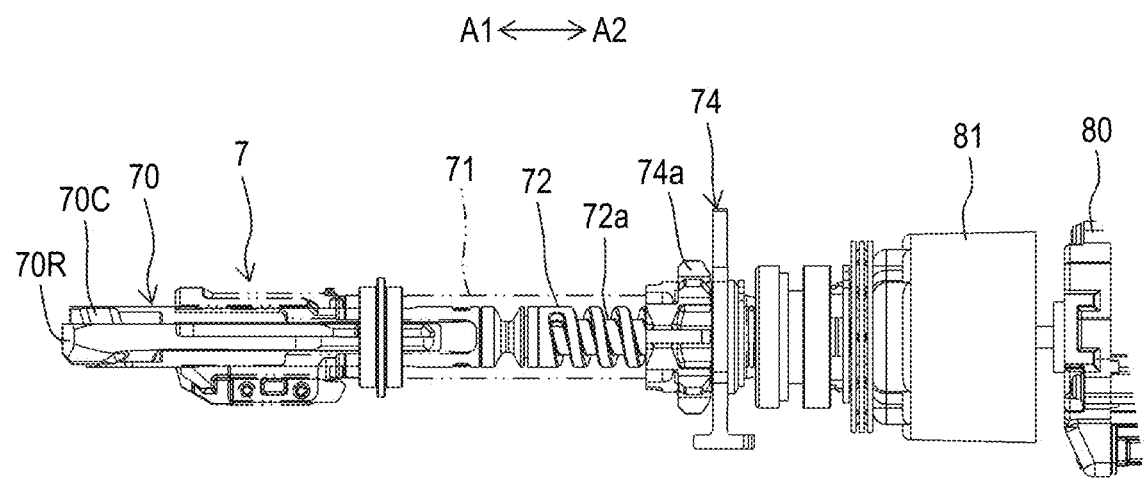
FIG. 3B is an internal structural view illustrating the example of the binding unit.
Figure 3C:
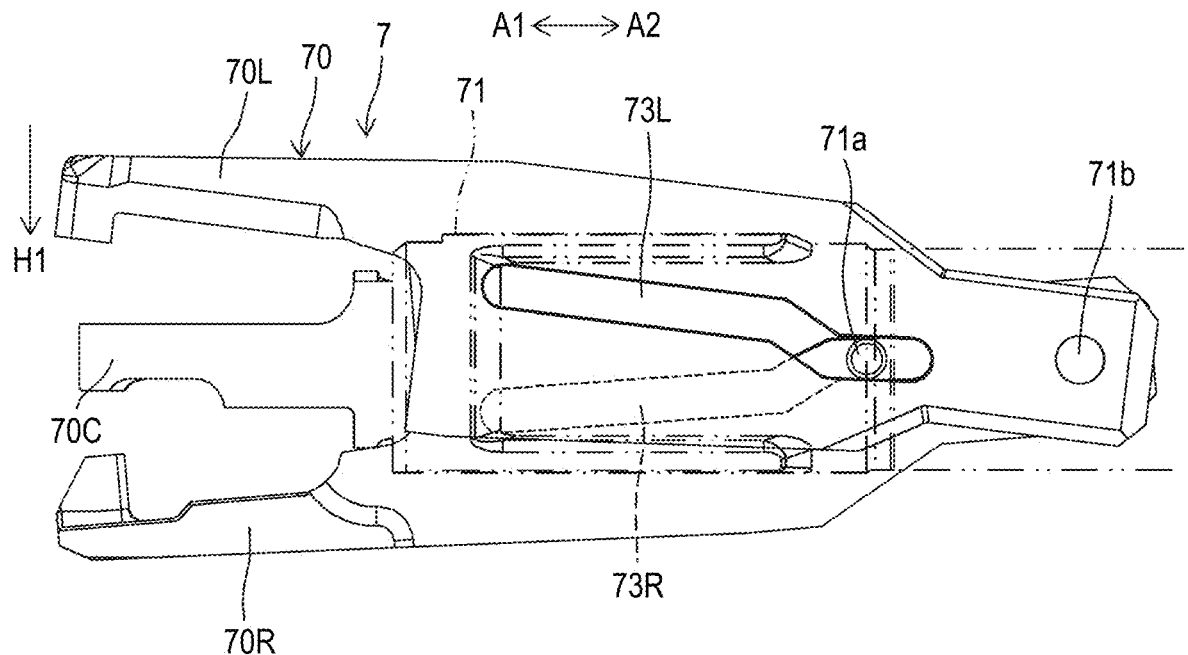
FIG. 3C is a main part plan view illustrating the example of the binding unit.
Figure 3D:
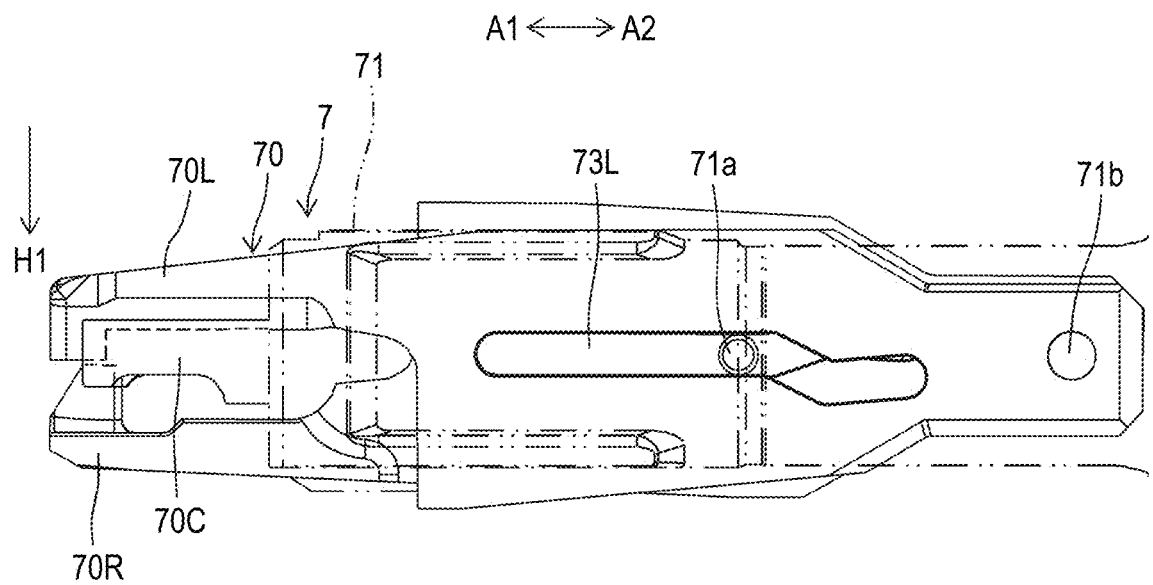
FIG. 3D is a main part plan view illustrating the example of the binding unit.

FIG. 3A is a side view illustrating an example of the binding unit, FIG. 3B is an internal structural view illustrating the example of the binding unit, and FIGS. 3C and 3D are main part plan views illustrating the example of the binding unit.

Next, the example of the binding unit according to the present embodiment will be described with reference to the drawings. The binding unit 7 includes a rotation shaft 72 that moves the sleeve 71 and causes the sleeve 71 to rotate so as to cause the locking member 70 to operate. In the binding unit 7 and the driving unit 8, the rotation shaft 72 and the motor 80 are connected to each other via the reduction gear 81, and the rotation shaft 72 is driven by the motor 80 via the reduction gear 81.

The locking member 70 includes a center hook 70C connected to the rotation shaft 72, and a first side hook 70R and a second side hook 70L that open and close with respect to the center hook 70C.

In the binding unit 7, a side on which the center hook 70C, the first side hook 70R, and the second side hook 70L are provided is referred to as a front side, and a side on which the rotation shaft 72 is connected to the reduction gear 81 is referred to as a rear side.

The center hook 70C is connected to a front end, which is one end portion of the rotation shaft 72, via a configuration that is rotatable with respect to the rotation shaft 72, rotatable integrally with the rotation shaft 72, and movable in an axial direction integrally with the rotation shaft 72.

A front end side of the first side hook 70R, which is one end portion thereof along the axial direction of the rotation shaft 72, is located on one side portion with respect to the center hook 70C. In addition, a rear end side of the first side hook 70R, which is the other end portion thereof along the axial direction of the rotation shaft 72, is rotatably supported on the center hook 70C by a shaft 71b.

A front end side of the second side hook 70L, which is one end portion thereof along the axial direction of the rotation shaft 72, is located on the other side portion with respect to the center hook 70C. In addition, a rear end side of the second side hook 70L, which is the other end portion thereof along the axial direction of the rotation shaft 72, is rotatably supported on the center hook 70C via the shaft 71b.

As a result, in the locking member 70, the front end side of the first side hook 70R opens and closes in a direction in which the front end side is separated from and brought into contact with the center hook 70C by a rotation operation about the shaft 71b as a fulcrum. In addition, the front end side of the second side hook 70L opens and closes in a direction in which the front end side is separated from and brought into contact with the center hook 70C.

The sleeve 71 has a shape in which a range of a predetermined length along the axial direction of the rotation shaft 72 from an end portion in a forward direction indicated by an arrow A1 is divided into two ranges in a radial direction, and the first side hook 70R and the second side hook 70L are inserted. In addition, the sleeve 71 has a tubular shape covering the periphery of the rotation shaft 72, and has a convex portion (not illustrated) protruding from an inner peripheral surface of a tubular space into which the rotation shaft 72 is inserted. The convex portion enters a groove portion of a feed screw 72a formed along the axial direction on an outer periphery of the rotation shaft 72.

When the rotation shaft 72 rotates, the sleeve 71 moves in a front-rear direction, which is a direction along the axial direction of the rotation shaft 72, in accordance with a rotation direction of the rotation shaft 72 by an action of the convex portion (not illustrated) and the feed screw 72a of the rotation shaft 72. When the sleeve 71 moves to an end portion in a forward direction of the feed screw 72a along the axial direction of the rotation shaft 72, the sleeve 71 rotates integrally with the rotation shaft 72.

The sleeve 71 includes an opening and closing pin 71a that opens and closes the first side hook 70R and the second side hook 70L. The first side hook 70R includes an opening and closing guide hole 73R into which the opening and closing pin 71a is inserted, and the second side hook 70L includes an opening and closing guide hole 73L into which the opening and closing pin 71a is inserted.

The opening and closing guide holes 73R and 73L are formed by grooves extending along a moving direction of the sleeve 71. The opening and closing guide hole 73R has a shape in which a movement in a linear direction of the opening and closing pin 71a that moves in conjunction with the sleeve 71 is converted into an opening and closing operation by rotation of the first side hook 70R with the shaft 71b as a fulcrum. The opening and closing guide hole 73L has a shape in which the movement in the linear direction of the opening and closing pin 71a that moves in conjunction with the sleeve 71 is converted into an opening and closing operation by rotation of the second side hook 70L with the shaft 71b as a fulcrum.

When the sleeve 71 moves to the rear side indicated by an arrow A2, the first side hook 70R and the second side hook 70L move in a direction separating from the center hook 70C by the rotation operation with the shaft 71b as a fulcrum due to a trajectory of the opening and closing pin 71a and the shapes of the opening and closing guide holes 73R and 73L.

As a result, the first side hook 70R and the second side hook 70L are opened with respect to the center hook 70C, and a feed path through which the wire W passes is formed between the first side hook 70R and the center hook 70C and between the second side hook 70L and the center hook 70C.

In a state where the first side hook 70R and the second side hook 70L are opened with respect to the center hook 70C, the wire W fed in the forward direction by the wire feeding unit 3 passes through between the center hook 70C and the first side hook 70R. The wire W passing through between the center hook 70C and the first side hook 70R is led to the curl forming unit 5. Then, the wire W to which the winding habit is imparted by the curl guide 50 of the curl forming unit 5 and which is led to the binding unit 7 by the leading guide 51 passes through between the center hook 70C and the second side hook 70L.

When the sleeve 71 moves to the front side indicated by the arrow A1, the first side hook 70R and the second side hook 70L move in a direction approaching the center hook 70C by the rotation operation with the shaft 71b as a fulcrum due to the trajectory of the opening and closing pin 71a and the shapes of the opening and closing guide holes 73R and 73L. As a result, the first side hook 70R and the second side hook 70L are closed with respect to the center hook 70C.

When the first side hook 70R is closed with respect to the center hook 70C, the wire W sandwiched between the first side hook 70R and the center hook 70C is locked in a form of capable of moving between the first side hook 70R and the center hook 70C. In addition, when the second side hook 70L is closed with respect to the center hook 70C, the wire W sandwiched between the second side hook 70L and the center hook 70C is locked in a form of not coming off from between the second side hook 70L and the center hook 70C.

In an operation of feeding the wire W wound around the reinforcing bars S in the reverse direction by the wire feeding unit 3, a portion sandwiched between the second side hook 70L and the center hook 70C is positioned on the upstream side in a feeding direction of the wire W, and the portion sandwiched between the first side hook 70R and the center hook 70C is positioned on the downstream side in the feeding direction of the wire W.

As a result, the wire W wound around the periphery of the reinforcing bars S is wrapped around the reinforcing bars S with a diameter of the loop Ru reduced by pulling the portion sandwiched between the first side hook 70R and the center hook 70C toward a wire feeding unit 3 direction by the operation of feeding the wire W in the reverse direction by the wire feeding unit 3.

The sleeve 71 includes a bent portion 71c1 that forms the wire W into a predetermined shape by pressing and bending the front end side of the wire W in a predetermined direction from the portion sandwiched between the second side hook 70L and the center hook 70C, the front end side being one end portion of the wire W wrapped around the reinforcing bars S. In addition, the sleeve 71 includes a bent portion 71c2 that forms the wire W into a predetermined shape by pressing and bending a terminal end side of the wire W in a predetermined direction, the terminal end side being the other end portion of the wire W which is wrapped around the reinforcing bars S and cut by the cutting unit 6. The bent portion 71c1 and the bent portion 71c2 are formed at an end portion of the sleeve 71 in the forward direction indicated by the arrow A1.

When the sleeve 71 moves in the forward direction indicated by the arrow A1, the front end side of the wire W locked by the center hook 70C and the second side hook 70L is pressed by the bent portion 71c1 and bent toward a reinforcing bar S side. In addition, when the sleeve 71 moves in the forward direction indicated by the arrow A1, the terminal end side of the wire W which is locked by the center hook 70C and the first side hook 70R and cut by the cutting unit 6 is pressed by the bent portion 71c2 and bent toward the reinforcing bar S side.

The binding unit 7 includes a rotation regulating unit 74 that regulates rotations of the locking member 70 and the sleeve 71 in conjunction with the rotation operation of the rotation shaft 72. The rotation regulating unit 74 includes a rotation regulating blade 74a in the sleeve 71, and includes a rotation regulating claw (not illustrated) to which the rotation regulating blade 74a is locked in the main body portion 10.

The rotation regulating blade 74a is implemented by providing, at predetermined intervals in a circumferential direction of the sleeve 71, a plurality of convex portions protruding in the radial direction from an outer periphery of the sleeve 71. The rotation regulating blade 74a is fixed to the sleeve 71, and moves and rotates integrally with the sleeve 71.

In the rotation regulating unit 74, the rotation regulating blade 74a is locked in an operation region where the wire W is locked by the locking member 70, the wire W is wrapped around the reinforcing bar S and then cut, and further the wire W is bent and molded by the bent portions 71c1 and 71c2 of the sleeve 71. When the rotation regulating blade 74a is locked, the rotation of the sleeve 71 in conjunction with the rotation of the rotation shaft 72 is regulated, and the sleeve 71 moves in the front-rear direction by the rotation operation of the rotation shaft 72.

In addition, in the rotation regulating unit 74, locking of the rotation regulating blade 74a is released in an operation region where the wire W locked by the locking member 70 is twisted. When the locking of the rotation regulating blade 74a is released, the sleeve 71 rotates in conjunction with the rotation of the rotation shaft 72. In the locking member 70, the center hook 70C, the first side hook 70R, and the second side hook 70L that lock the wire W rotate in conjunction with the rotation of the sleeve 71.

Example of Binding Operation of Reinforcing Bar Binding Machine According to Present Embodiment Next, an operation of binding the reinforcing bars S with the wire W by the reinforcing bar binding machine 1A according to the present embodiment will be described with reference to the drawings.

In the reinforcing bar binding machine 1A, a state in which the wire W is clamped between the pair of feeding gears 30, and the front end of the wire W is positioned between the clamped position of the feeding gears 30 and the fixed blade portion 60 of the cutting unit 6 is a standby state. In addition, in the reinforcing bar binding machine 1A, in the standby state, the sleeve 71 and the first side hook 70R, the second side hook 70L, and the center hook 70C that are attached to the sleeve 71 are moved in a rear direction indicated by the arrow A2, and as illustrated in FIG. 3C, the first side hook 70R is opened with respect to the center hook 70C, and the second side hook 70L is opened with respect to the center hook 70C.

When the feed motor 31 is driven in a forward rotation direction from the standby state, the wire W is fed in a forward direction indicated by an arrow F by the wire feeding unit 3. In a case of a configuration in which a plurality of, for example, two wires W are fed, the two wires W are fed by the wire guides 4 in a state of being arranged in parallel along the axial direction of the loop Ru formed by the wires W.

The wire W fed in the forward direction passes through between the center hook 70C and the first side hook 70R and is fed to the curl guide 50 of the curl forming unit 5. By passing through the curl guide 50, the wire W is imparted with a winding habit of being wound around the reinforcing bars S placed in the introduction portion 18 between the curl guide 50 and the leading guide 51.

The wire W to which the winding habit is imparted by the curl guide 50 is led by the leading guide 51 and is further fed in the forward direction by the wire feeding unit 3, so that the wire W is led between the center hook 70C and the second side hook 70L by the leading guide 51. When the wire W is fed to a predetermined position, driving of the feed motor 31 is stopped.

After feeding of the wire W in the forward direction is stopped, the motor 80 is driven in a forward rotation direction. In the sleeve 71, in an operation region where the wire W is locked by the locking member 70, rotation of the sleeve 71 in conjunction with the rotation of the rotation shaft 72 is regulated by locking the rotation regulating blade 74a. As a result, rotation of the motor 80 is converted into a linear movement, and the sleeve 71 moves in an arrow A1 direction which is the forward direction.

In the locking member 70, when the sleeve 71 moves in the forward direction indicated by the arrow A1, the first side hook 70R and the second side hook 70L move in a direction approaching the center hook 70C by the rotation operation with the shaft 71b as a fulcrum due to the trajectory of the opening and closing pin 71a and the shapes of the opening and closing guide holes 73R and 73L.

As a result, as illustrated in FIG. 3D, the first side hook 70R and the second side hook 70L are closed with respect to the center hook 70C.

When the first side hook 70R is closed with respect to the center hook 70C, the wire W sandwiched between the first side hook 70R and the center hook 70C is locked in the form of capable of moving between the first side hook 70R and the center hook 70C.

On the other hand, when the second side hook 70L is closed with respect to the center hook 70C, the wire W sandwiched between the second side hook 70L and the center hook 70C is locked in the form of not coming off from between the second side hook 70L and the center hook 70C.

In an operation of closing the first side hook 70R and the second side hook 70L, the sleeve 71 is moved forward to a position where the wire W is locked, and then the rotation of the motor 80 is temporarily stopped, and the feed motor 31 is driven in a reverse rotation direction.

As a result, the pair of feeding gears 30 rotates in the reverse direction, and the wire W clamped between the pair of feeding gears 30 is fed in the reverse direction indicated by the arrow R. Since the front end side of the wire W is locked in the form of not coming off from between the second side hook 70L and the center hook 70C, the wire W is wrapped around the reinforcing bars S by the operation of feeding the wire W in the reverse direction.

After the wire W is wrapped around the reinforcing bars S and driving of the feed motor 31 in the reverse rotation direction is stopped, the motor 80 is driven in the forward rotation direction to further move the sleeve 71 in the forward direction indicated by the arrow A1.

When the operation of the sleeve 71 moving in the forward direction is transmitted to the cutting unit 6 by the transmission member 62, the movable blade portion 61 rotates, and the wire W locked by the first side hook 70R and the center hook 70C is cut by operations of the fixed blade portion 60 and the movable blade portion 61.

By driving the motor 80 in the forward rotation direction, the sleeve 71 is moved in the forward direction indicated by the arrow A1, and as described above, the wire W is cut, and the bent portions 71c1 and 71c2 move in the direction approaching the reinforcing bars S substantially at the same time. As a result, the front end side of the wire W locked by the center hook 70C and the second side hook 70L is pressed toward the reinforcing bar S side by the bent portion 71c1, and is bent toward the reinforcing bar S side with a locking position as a fulcrum. When the sleeve 71 further moves in the forward direction, the wire W locked between the second side hook 70L and the center hook 70C is maintained in a state of being sandwiched by the bent portion 71c1.

In addition, the terminal end side of the wire W which is locked by the center hook 70C and the first side hook 70R and cut by the cutting unit 6 is pressed toward the reinforcing bar S side by the bent portion 71c2, and is bent toward the reinforcing bar S side with the locking position as a fulcrum. When the sleeve 71 further moves in the forward direction, the wire W locked between the first side hook 70R and the center hook 70C is maintained in a state of being sandwiched by the bent portion 71c2.

After the front end side and the terminal end side after cutting of the wire W are bent toward the reinforcing bars S side, when the motor 80 is further driven in the forward rotation direction, the sleeve 71 further moves in the forward direction. When the sleeve 71 moves to a predetermined position and reaches the operation region where the wire W locked by the locking member 70 is twisted, the locking of the rotation regulating blade 74a is released.

Accordingly, when the motor 80 is further driven in the forward rotation direction, the sleeve 71 rotates in conjunction with the rotation shaft 72, and the wire W locked by the locking member 70 is twisted.

When it is detected that a load applied to the motor 80 is maximized by twisting the wire W, a normal rotation of the motor 80 is stopped. Next, when the motor 80 is driven in the reverse rotation direction, the rotation shaft 72 rotates in the reverse direction, and when the sleeve 71 rotates in the reverse direction following the reverse rotation of the rotation shaft 72, the rotation regulating blade 74a is locked, and thus the rotation of the sleeve 71 in conjunction with the rotation of the rotation shaft 72 is regulated. As a result, the sleeve 71 moves in an arrow A2 direction which is the rear direction.

When the sleeve 71 moves in the rear direction, the bent portions 71c1 and 71c2 are separated from the wire W, and maintenance of the wire W by the bent portions 71c1 and 71c2 is released. In addition, when the sleeve 71 moves in the rear direction, the opening and closing pin 71a passes through the opening and closing guide holes 73R and 73L. As a result, the first side hook 70R moves in a direction separating from the center hook 70C by the rotation operation with the shaft 71b as a fulcrum. In addition, the second side hook 70L moves in a direction separating from the center hook 70C by the rotation operation with the shaft 71b as a fulcrum. As a result, the wire W is removed from the locking member 70.

Example of Control Function of Binding Equipment According to Present Embodiment FIGS. 4A, 4B, 4C, and 4D are block diagrams illustrating examples of control functions of the binding equipment. In the binding equipment 100A illustrated in FIG. 1A and the like, in the example of the control function illustrated in FIG. 4A, the information processing device 110a that controls the transfer robot 200A is connected to the transfer robot 200A and the reinforcing bar binding machine 1A attached to the transfer robot 200A such that transmission and reception of signals and the like for controlling the transfer robot 200A and the reinforcing bar binding machine 1A are possible.

Figure 4A:
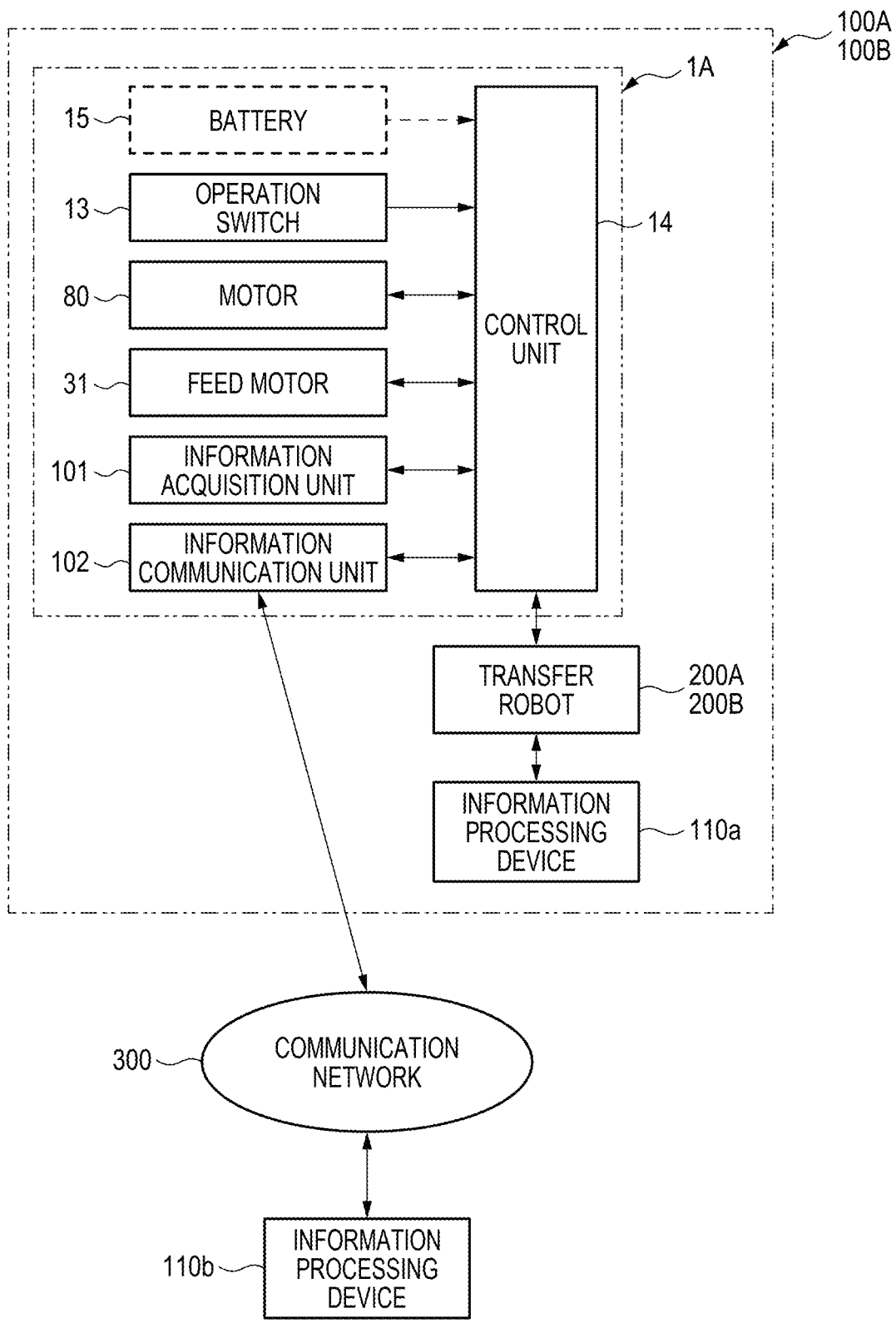
FIG. 4A is a block diagram illustrating an example of a control function of the binding equipment.

In addition, in the binding equipment 100B illustrated in FIG. 1C and the like, in the example of the control function illustrated in FIG. 4A, the information processing device 110a that controls the transfer robot 200B is connected to the transfer robot 200B and the reinforcing bar binding machine 1A attached to the transfer robot 200B such that transmission and reception of signals and the like for controlling the transfer robot 200B and the reinforcing bar binding machine 1A are possible.

Further, in the binding equipment 100A and 100B, the information communication unit 102 of the reinforcing bar binding machine 1A is connected to a communication network 300 such as a cloud such that transmission and reception of the binding related information and the like acquired by the information acquisition unit 101 of the reinforcing bar binding machine 1A are possible.

In addition, in the binding equipment 100A and 100B, the information processing device 110b to which the binding related information acquired by the information acquisition unit 101 of the reinforcing bar binding machine 1A is notified is connected to the communication network 300 such that transmission and reception of the binding related information and the like are possible.

Figure 4B:
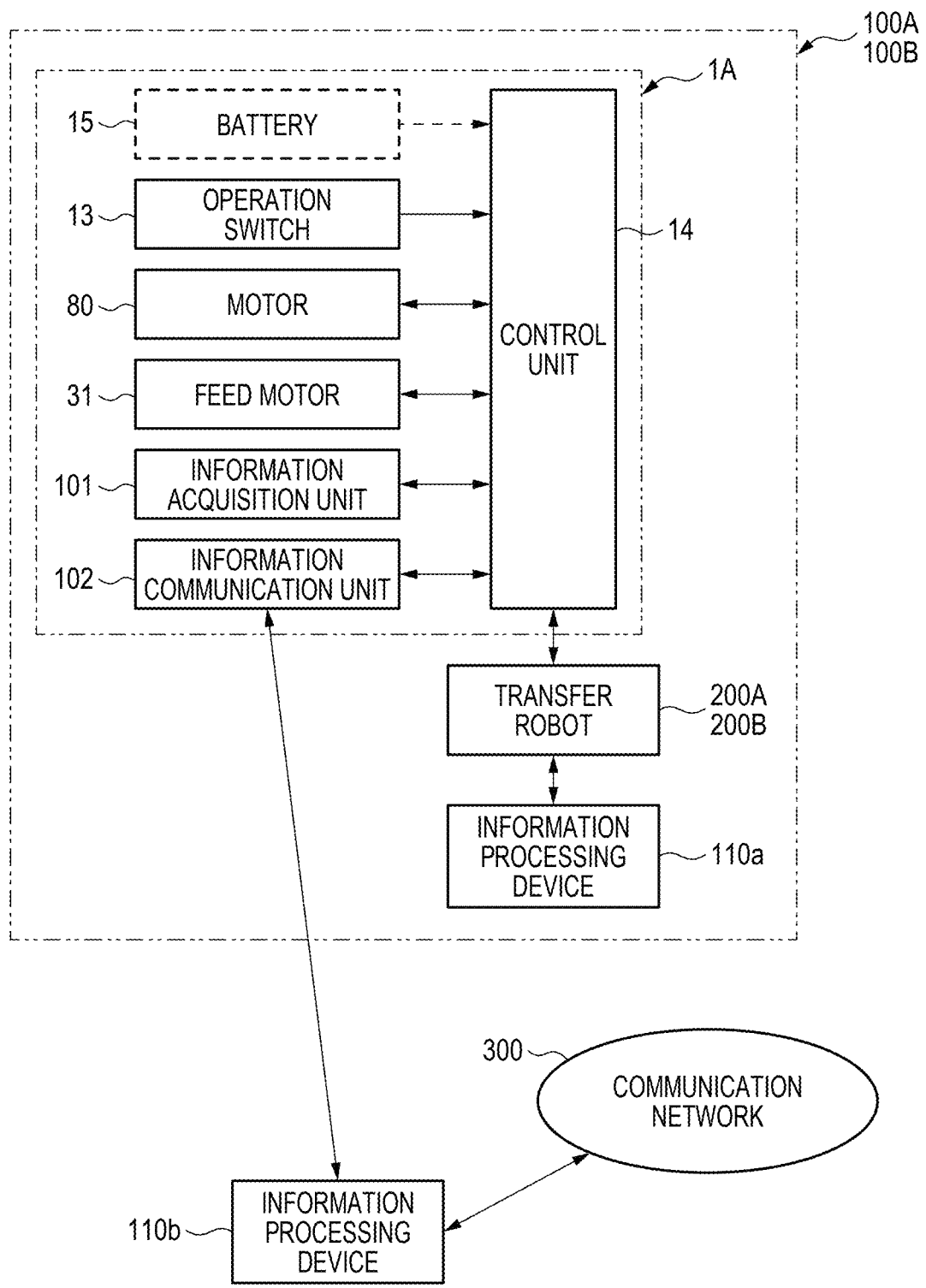
FIG. 4B is a block diagram illustrating an example of a control function of the binding equipment.

In the binding equipment 100A and 100B illustrated in FIG. 4B, the information processing device 110a is connected to the transfer robots 200A and 200B and to the reinforcing bar binding machine 1A via the transfer robots 200A and 200B, the information processing device 110b is connected to the communication network 300, the information communication unit 102 of the reinforcing bar binding machine 1A is not connected to the communication network 300, and the information processing device 110b is connected to the information communication unit 102 of the reinforcing bar binding machine 1A such that transmission and reception of the binding related information and the like are possible.

Figure 4C:
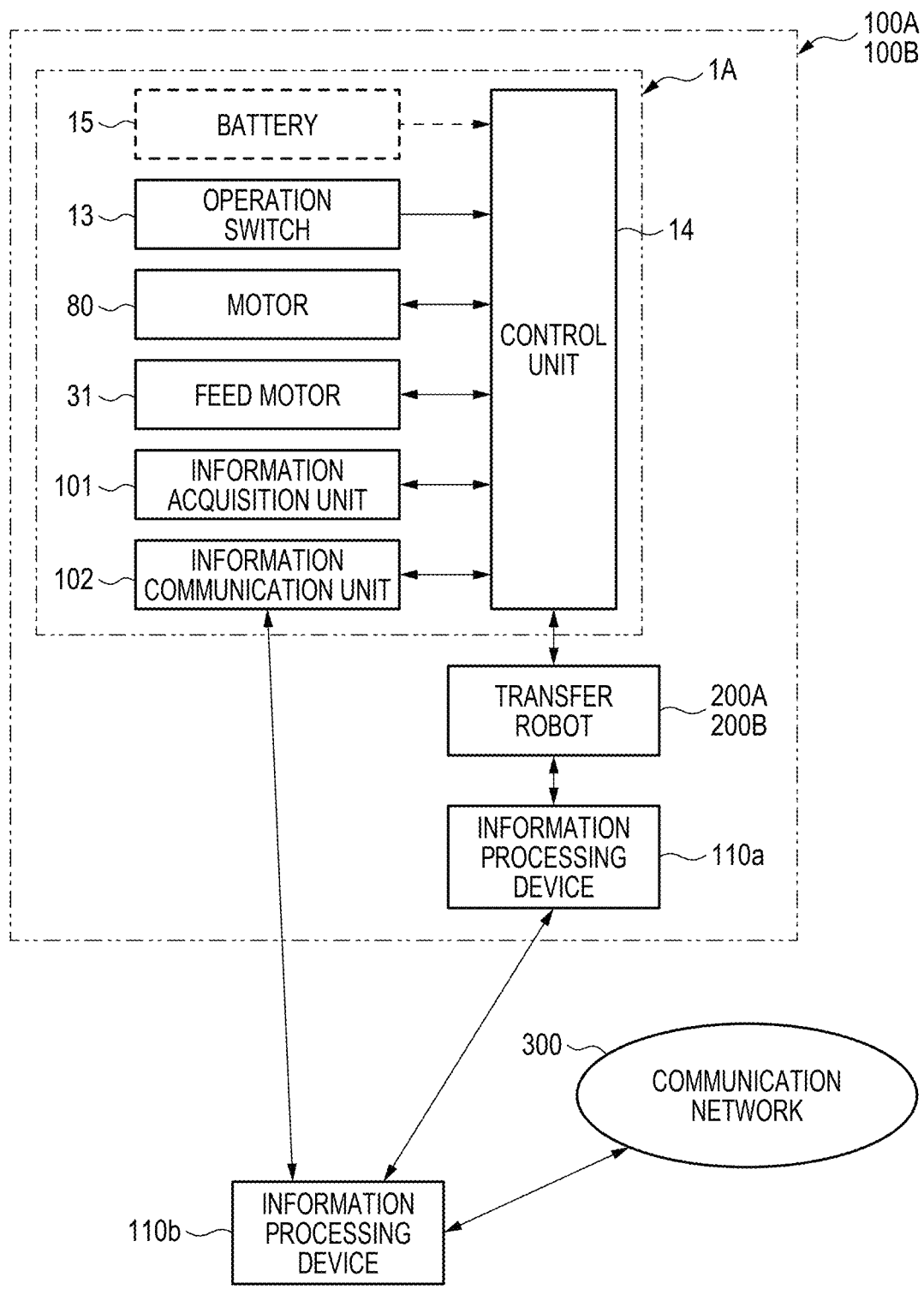
FIG. 4C is a block diagram illustrating an example of a control function of the binding equipment.

In the binding equipment 100A and 100B illustrated in FIG. 4C, the information processing device 110a is connected to the transfer robots 200A and 200B and to the reinforcing bar binding machine 1A via the transfer robots 200A and 200B, the information processing device 110b is connected to the communication network 300 and the information communication unit 102 of the reinforcing bar binding machine 1A, the information communication unit 102 of the reinforcing bar binding machine 1A is not connected to the communication network 300, and the information processing device 110b is connected to the information processing device 110a such that transmission and reception of the binding related information and the like are possible.

Figure 4D:
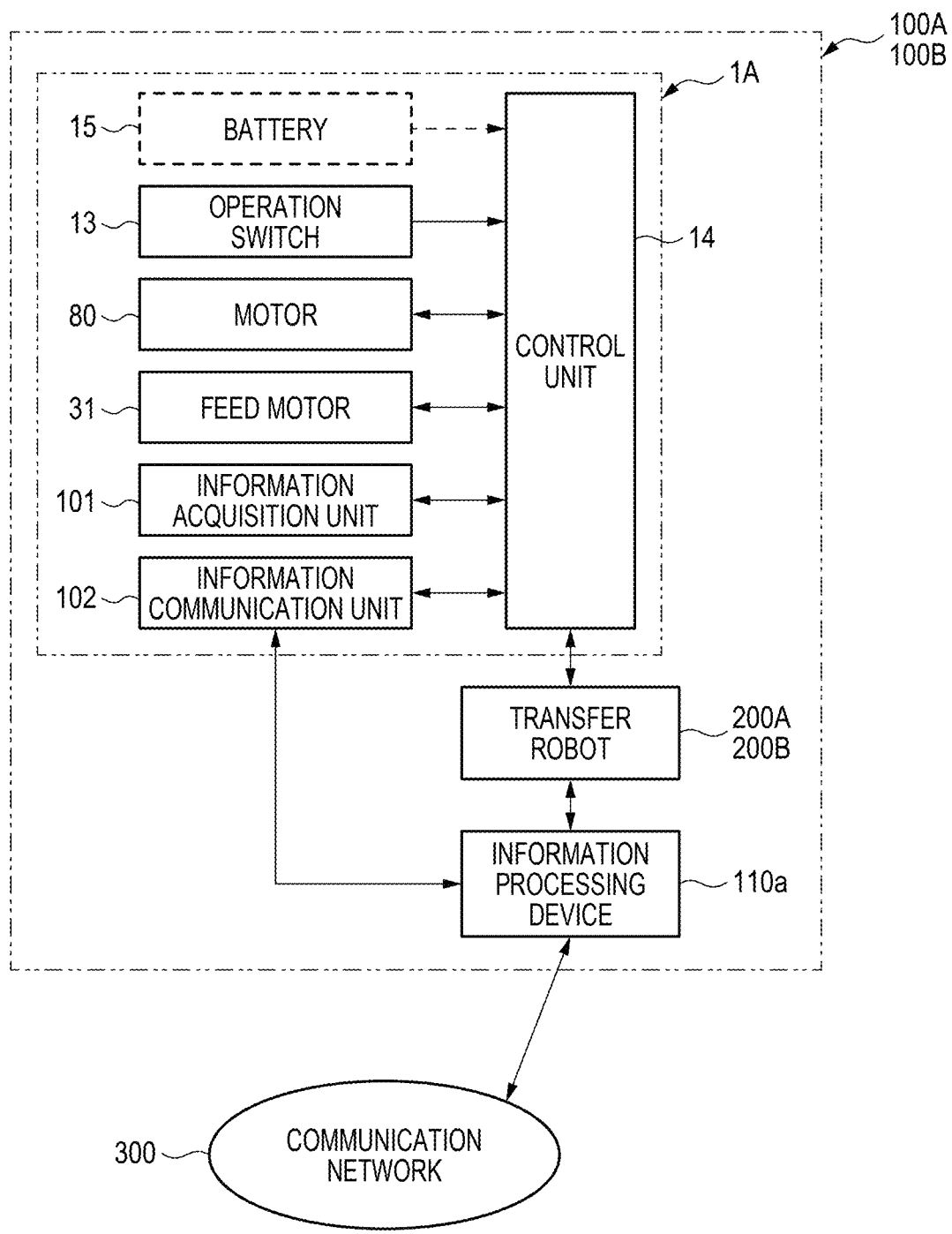
FIG. 4D is a block diagram illustrating an example of a control function of the binding equipment.

In the binding equipment 100A and 100B illustrated in FIG. 4D, the information processing device 110a that controls the transfer robots 200A and 200B has the function of the information processing device 110b to which the binding related information acquired by the information acquisition unit 101 of the reinforcing bar binding machine 1A is notified, and the information processing device 110a is connected to the transfer robots 200A and 200B and to the reinforcing bar binding machine 1A via the transfer robots 200A and 200B, and is connected to the communication network 300 and the information communication unit 102 of the reinforcing bar binding machine 1A.

In the binding equipment 100A, the information processing device 110a controls the transfer robot 200A according to a predetermined program to move the reinforcing bar binding machine 1A to the binding position P10. In the binding equipment 100B, the information processing device 110a controls the transfer robot 200B according to a predetermined program to move the reinforcing bar binding machine 1A to the binding position P10. In addition, in the binding equipment 100A, when the reinforcing bar binding machine 1A is moved to the binding position P10, the information processing device 110a controls the reinforcing bar binding machine 1A according to a predetermined program, and outputs a signal for causing the reinforcing bar binding machine 1A to perform an operation of binding the reinforcing bars S. In the reinforcing bar binding machine 1A, when a signal of performing the operation of binding the reinforcing bars S is input, the control unit 14 controls the motor 80 and the feed motor 31 to perform the above-described series of operations of binding the reinforcing bars S with the wire W.

According to a mode in which the reinforcing bar binding machine 1A is used alone, the control unit 14 controls, in accordance with the state of the switch 13 pressed by the operation of the trigger 12 illustrated in FIG. 2, the motor 80 and the feed motor 31, to perform the series of operations of binding the reinforcing bars S with the wire W.

In the reinforcing bar binding machine 1A, the information acquisition unit 101 acquires the binding related information related to the binding operation of binding the reinforcing bars S with the wire W, and the control unit 14 notifies the information processing device 110b of the binding related information acquired by the information acquisition unit 101 through the information communication unit 102. In a configuration illustrated in FIG. 4A, the reinforcing bar binding machine 1A notifies the communication network 300 such as a cloud of the binding related information acquired by the information acquisition unit 101 through the information communication unit 102. The information processing device 110b acquires the binding related information from the communication network 300. In configurations illustrated in FIGS. 4B and 4C, the reinforcing bar binding machine 1A notifies the information processing device 110b of the binding related information acquired by the information acquisition unit 101 through the information communication unit 102. In a configuration illustrated in FIG. 4D, the reinforcing bar binding machine 1A notifies the information processing device 110a of the binding related information acquired by the information acquisition unit 101 through the information communication unit 102.

The information processing device 110b illustrated in FIGS. 4A, 4B, and 4C performs reporting based on the binding related information acquired by the information acquisition unit 101 of the reinforcing bar binding machine 1A. As illustrated in FIG. 4D, in a case where the information processing device 110a has the function of the information processing device 110b, the information processing device 110a performs the reporting based on the binding related information acquired by the information acquisition unit 101 of the reinforcing bar binding machine 1A and performs control of the reinforcing bar binding machine 1A and the transfer robots 200A and 200B. The control of the reinforcing bar binding machine 1A and the transfer robots 200A and 200B based on the binding related information acquired by the information acquisition unit 101 provided in the reinforcing bar binding machine 1A is also referred to as feedback control.

The binding related information is, for example, information necessary for determining whether the binding operation can be performed, information necessary for determining whether the binding is normally performed, information necessary for specifying the position of the binding position P10, information necessary for identifying the reinforcing bars S to be bound, information for determining the remaining amount of the wire W, and the like. In addition, the binding related information is information such as a current value of the motor 80, a control signal of the feed motor 31, the number of times of detection of various abnormalities, and the number of times of binding.

The information processing device 110b illustrated in FIGS. 4A, 4B, and 4C reports the binding related information acquired from the reinforcing bar binding machine 1A. The information processing device 110b illustrated in FIGS. 4A, 4B, and 4C may determine whether the binding operation can be performed based on the binding related information acquired from the reinforcing bar binding machine 1A, and report binding availability information indicating whether the binding operation can be performed.

In addition, the information processing device 110b illustrated in FIGS. 4A, 4B, and 4C may determine a binding result indicating whether the binding is normally performed based on the binding related information acquired from the reinforcing bar binding machine 1A, and report binding result information indicating the binding result.

Further, the information processing device 110b illustrated in FIGS. 4A, 4B, and 4C may specify a position of the binding position P10 based on the binding related information acquired from the reinforcing bar binding machine 1A, and report position information for specifying the position of the binding position P10.

In addition, the information processing device 110b illustrated in FIGS. 4A, 4B, and 4C may identify a diameter, a combination, or the like of the reinforcing bars S to be bound based on the binding related information acquired from the reinforcing bar binding machine 1A, and report reinforcing bar identification information.

Further, the information processing device 110b illustrated in FIGS. 4A, 4B, and 4C may report the binding result information and the position information (address) of the binding position P10 in association with each other.

In addition, the information processing device 110b illustrated in FIGS. 4A, 4B, and 4C may determine the remaining amount of the wire W based on the binding related information acquired from the reinforcing bar binding machine 1A or the reel accommodation unit 21, and report wire remaining amount information.

The information processing device 110b illustrated in FIG. 4C notifies the information processing device 110a of the binding related information acquired from the reinforcing bar binding machine 1A. The information processing device 110a illustrated in FIG. 4C reports the binding related information notified from the information processing device 110b.

The information processing device 110a illustrated in FIG. 4C may determine whether the binding operation can be performed based on the binding related information notified from the information processing device 110b, and report binding availability information indicating whether the binding operation can be performed.

In addition, the information processing device 110a illustrated in FIG. 4C may determine a binding result indicating whether the binding is normally performed based on the binding related information notified from the information processing device 110b, and report the binding result information indicating the binding result.

Further, the information processing device 110a illustrated in FIG. 4C may specify the position of the binding position P10 based on the binding related information notified from the information processing device 110b, and report the position information for specifying the position of the binding position P10.

In addition, the information processing device 110a illustrated in FIG. 4C may identify the diameter, the combination, or the like of the reinforcing bars S to be bound based on the binding related information notified from the information processing device 110b, and report the reinforcing bar identification information.

Further, the information processing device 110a illustrated in FIG. 4C may report the binding result information and the position information (address) of the binding position P10 in association with each other.

In addition, the information processing device 110a illustrated in FIG. 4C may determine the remaining amount of the wire W based on the binding related information acquired from the information processing device 110b, and report the wire remaining amount information.

The information processing device 110a illustrated in FIG. 4D reports the binding related information acquired from the reinforcing bar binding machine 1A. The information processing device 110a illustrated in FIG. 4D may determine whether the binding operation can be performed based on the binding related information acquired from the reinforcing bar binding machine 1A, and report the binding availability information indicating whether the binding operation can be performed.

In addition, the information processing device 110a illustrated in FIG. 4D may determine the binding result indicating whether the binding is normally performed based on the binding related information acquired from the reinforcing bar binding machine 1A, and report the binding result information indicating the binding result.

Further, the information processing device 110a illustrated in FIG. 4D may specify the position of the binding position P10 based on the binding related information acquired from the reinforcing bar binding machine 1A, and report the position information for specifying the position of the binding position P10.

In addition, the information processing device 110a illustrated in FIG. 4D may identify a diameter, a combination, or the like of the reinforcing bars S to be bound based on the binding related information acquired from the reinforcing bar binding machine 1A, and report the reinforcing bar identification information.

Further, the information processing device 110a illustrated in FIG. 4D may report the binding result information and the position information (address) of the binding position P10 in association with each other.

In addition, the information processing device 110a illustrated in FIG. 4D may determine the remaining amount of the wire W based on the binding related information acquired from the reinforcing bar binding machine 1A or the reel accommodation unit 21, and report the wire remaining amount information.

The information processing device 110a illustrated in FIGS. 4C and 4D may control the reinforcing bar binding machine 1A and the transfer robots 200A and 200B based on the binding availability information.

In addition, the information processing device 110a illustrated in FIGS. 4C and 4D may control the reinforcing bar binding machine 1A and the transfer robots 200A and 200B based on the binding result information.

Further, the information processing device 110a illustrated in FIGS. 4C and 4D may control the reinforcing bar binding machine 1A and the transfer robots 200A and 200B based on the position information of the binding position P10.

In addition, the information processing device 110a illustrated in FIGS. 4C and 4D may control the reinforcing bar binding machine 1A and the transfer robots 200A and 200B based on the reinforcing bar identification information.

Further, the information processing device 110a illustrated in FIGS. 4C and 4D may store the binding result information and the position information (address) of the binding position P10 in association with each other, and control the reinforcing bar binding machine 1A and the transfer robots 200A and 200B based on a relation between the binding result information and the position information of the binding position P10.

The information processing device 110a illustrated in FIGS. 4C and 4D may control the reinforcing bar binding machine 1A and the transfer robots 200A and 200B based on the wire remaining amount information.

Example of Configuration of Information Acquisition Unit by Sensor

Figure 5:
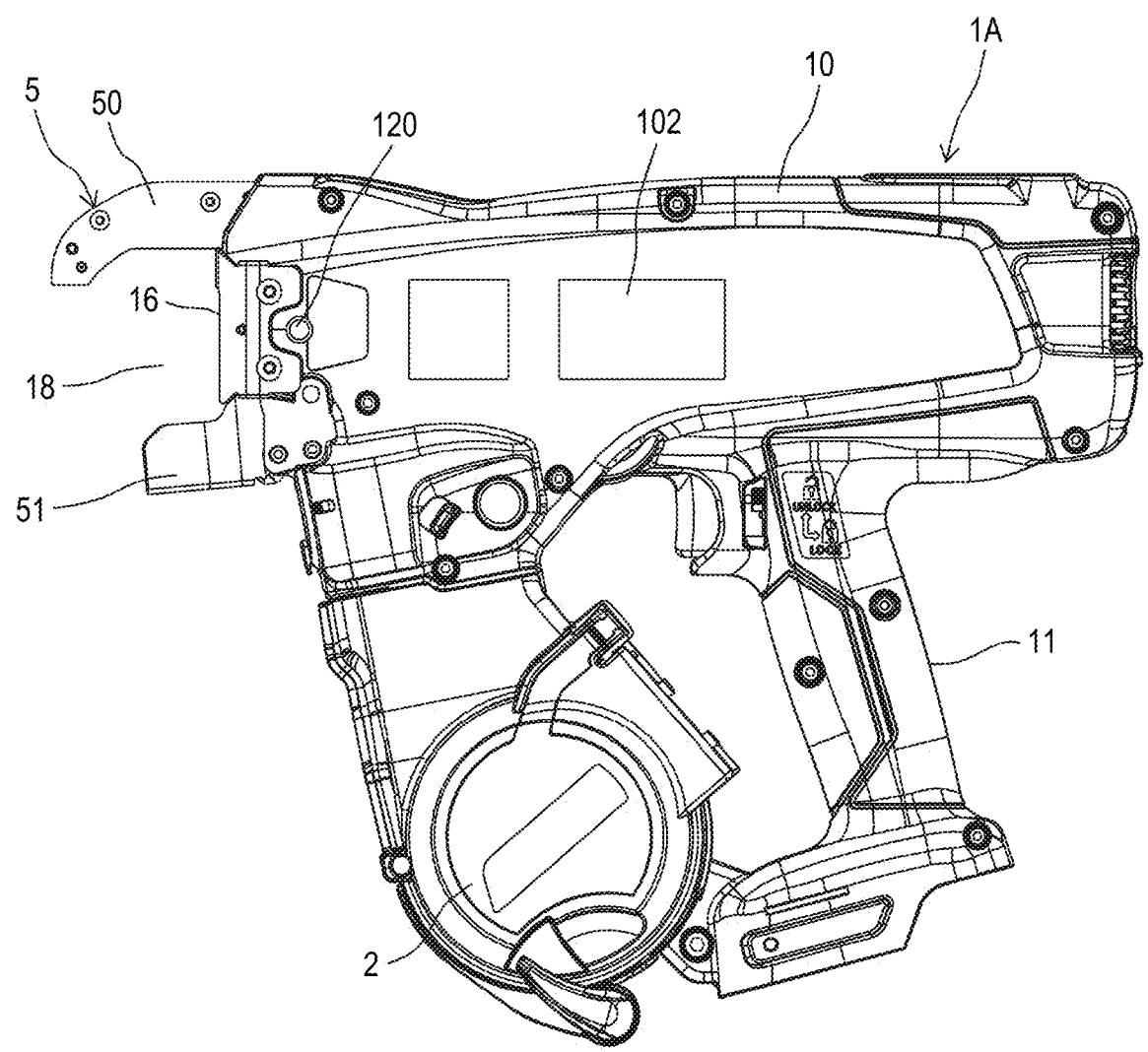
FIG. 5 is a side view illustrating an example of the reinforcing bar binding machine including an information acquisition unit.

FIG. 5 is a side view illustrating an example of the reinforcing bar binding machine including an information acquisition unit. The reinforcing bar binding machine 1A includes a sensor 120 as the information acquisition unit 101. The sensor 120 includes an optical sensor capable of detecting any object in a binding space 19 in which the locking member 70 operates in the main body portion 10 illustrated in FIG. 2, a magnetic sensor capable of detecting a metal object, and the like.

Reporting Example of Binding Related Information

Figure 6:
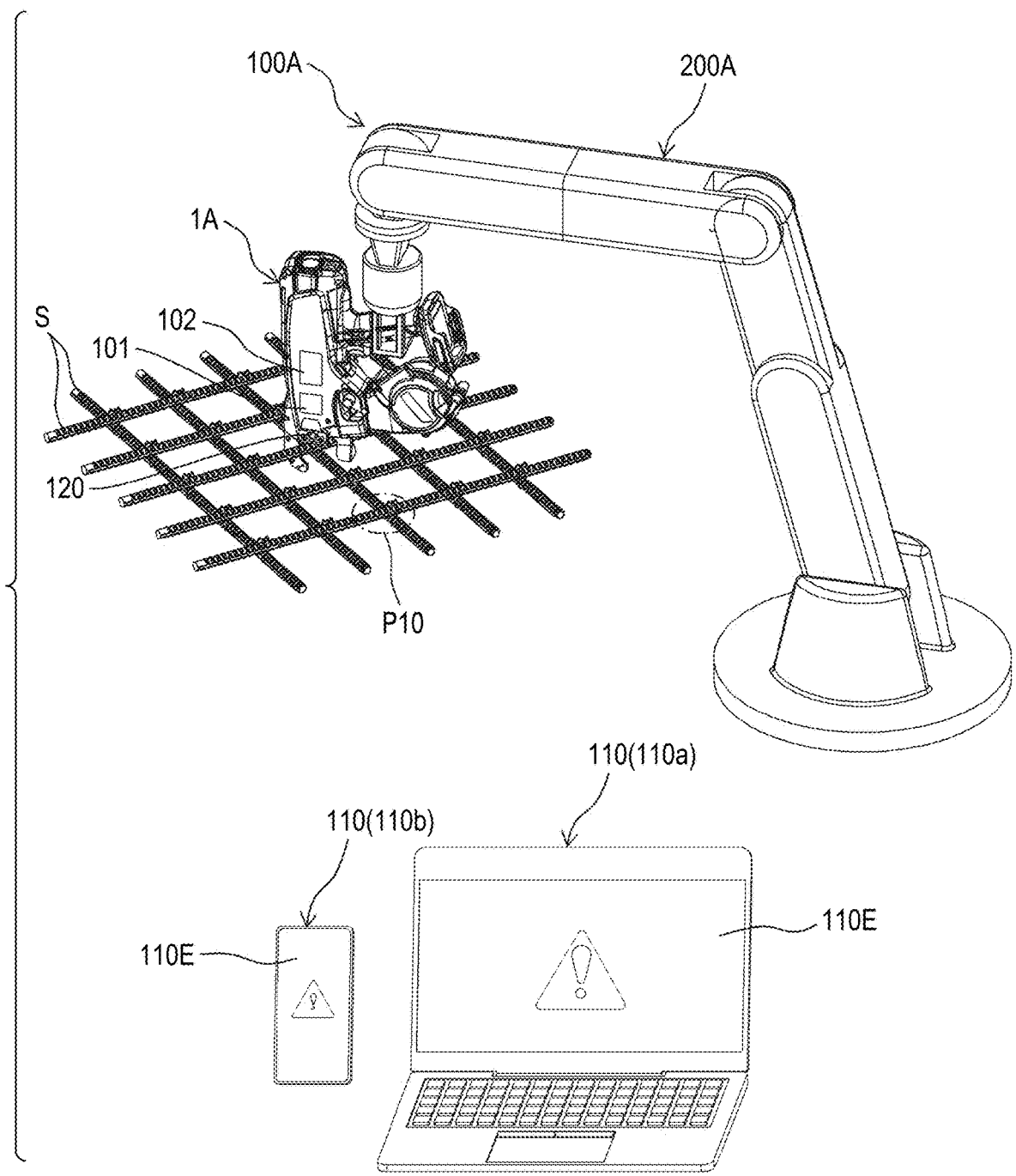
FIG. 6 is an explanatory view illustrating a reporting example in the information processing device based on binding related information acquired by the information acquisition unit.

FIG. 6 is an explanatory view illustrating a reporting example in the information processing device based on the binding related information acquired by the information acquisition unit, and next, control of reporting based on the binding related information acquired by the sensor 120 will be described with reference to the drawings.

In the binding equipment 100A, the transfer robots 200A and 200B are controlled by the information processing device 110a illustrated in FIGS. 4A, 4B, 4C, and 4D, and the transfer robots 200A and 200B move the reinforcing bar binding machine 1A to a predetermined binding position P10.

In the reinforcing bar binding machine 1A, the sensor 120 which is the information acquisition unit 101 detects whether there is a foreign matter in the binding space 19, and acquires, as the binding availability information which is the binding related information, foreign matter detection information which is a detection result of presence or absence of the foreign matter for determining whether the binding operation can be performed. In the control unit 14 of the reinforcing bar binding machine 1A, when the sensor 120 detects that there is a foreign matter in the binding space 19, the information communication unit 102 notifies the information processing device 110b illustrated in FIGS. 4A, 4B, and 4C and the information processing device 110a illustrated in FIG. 4D of the foreign matter detection information.

When the information processing devices 110a and 110b receive the foreign matter detection information from the reinforcing bar binding machine 1A, the information processing devices 110a and 110b determine whether the binding operation can be performed, and output report information 110E in accordance with whether the binding operation can be performed. The report information 110E may be output as visual information such as an image or a character, or may be output as auditory information such as a sound.

When the information processing device 110a that controls the binding equipment 100A is a personal computer, the report information 110E may be output by the personal computer. In addition, the report information 110E may be output by the information processing device 110b such as a smartphone or a tablet. The information processing device 110*b* is communicably connected to the information processing device 110*a* that controls the binding equipment 100A and does not perform control of the binding equipment 100A.

Example of Configuration of Information Acquisition Unit by Camera

Figure 7A:
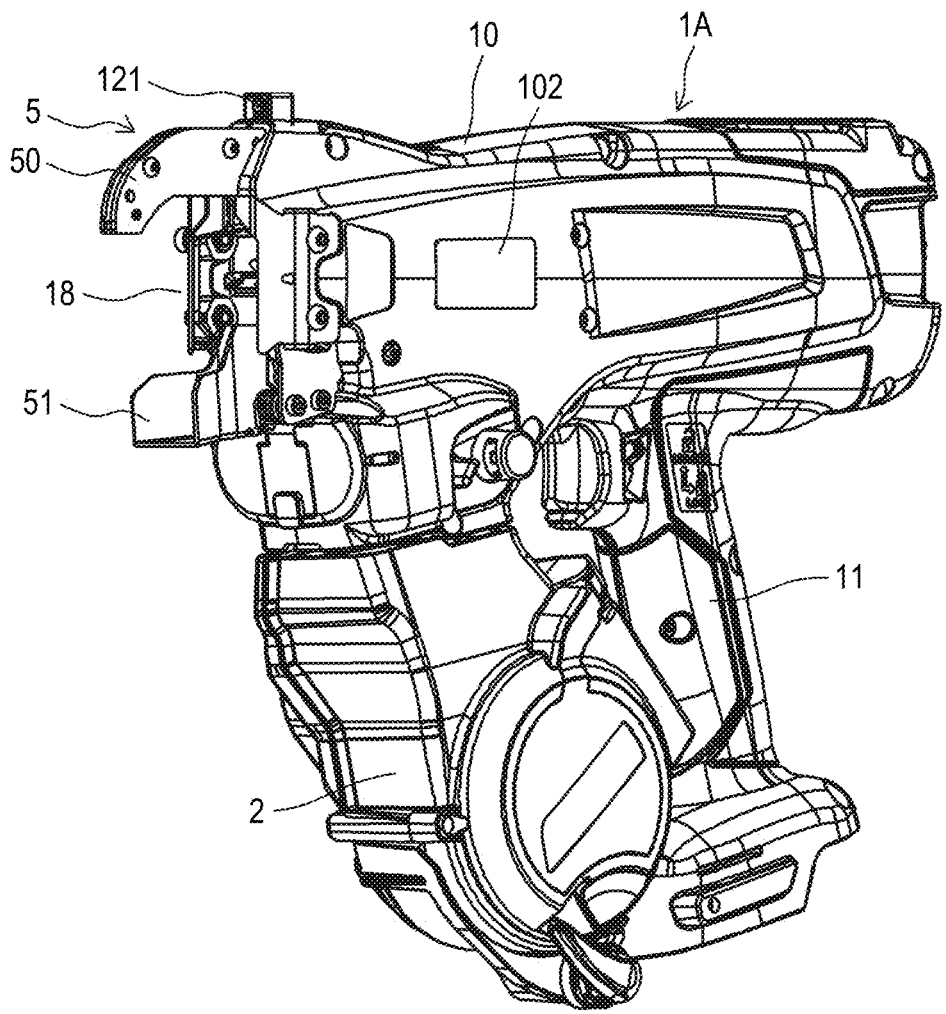
FIG. 7A is a perspective view illustrating another example of the reinforcing bar binding machine including the information acquisition unit.
Figure 7B:
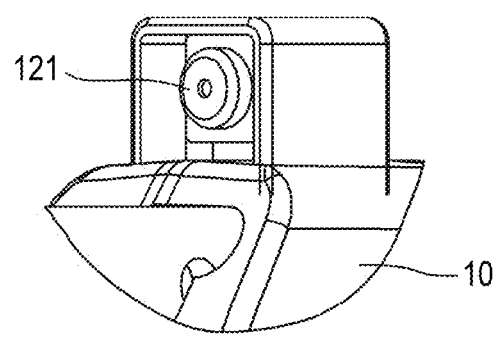
FIG. 7B is a perspective view illustrating another example of the reinforcing bar binding machine including the information acquisition unit.

FIGS. 7A and 7B are perspective views illustrating another example of the reinforcing bar binding machine including an information acquisition unit. The reinforcing bar binding machine 1A includes a camera 121 as the information acquisition unit 101. The camera 121 is provided on an upper surface or a side surface of the main body portion 10 such that a front side of the curl forming unit 5 is in an image capturing range.

Figure 8:
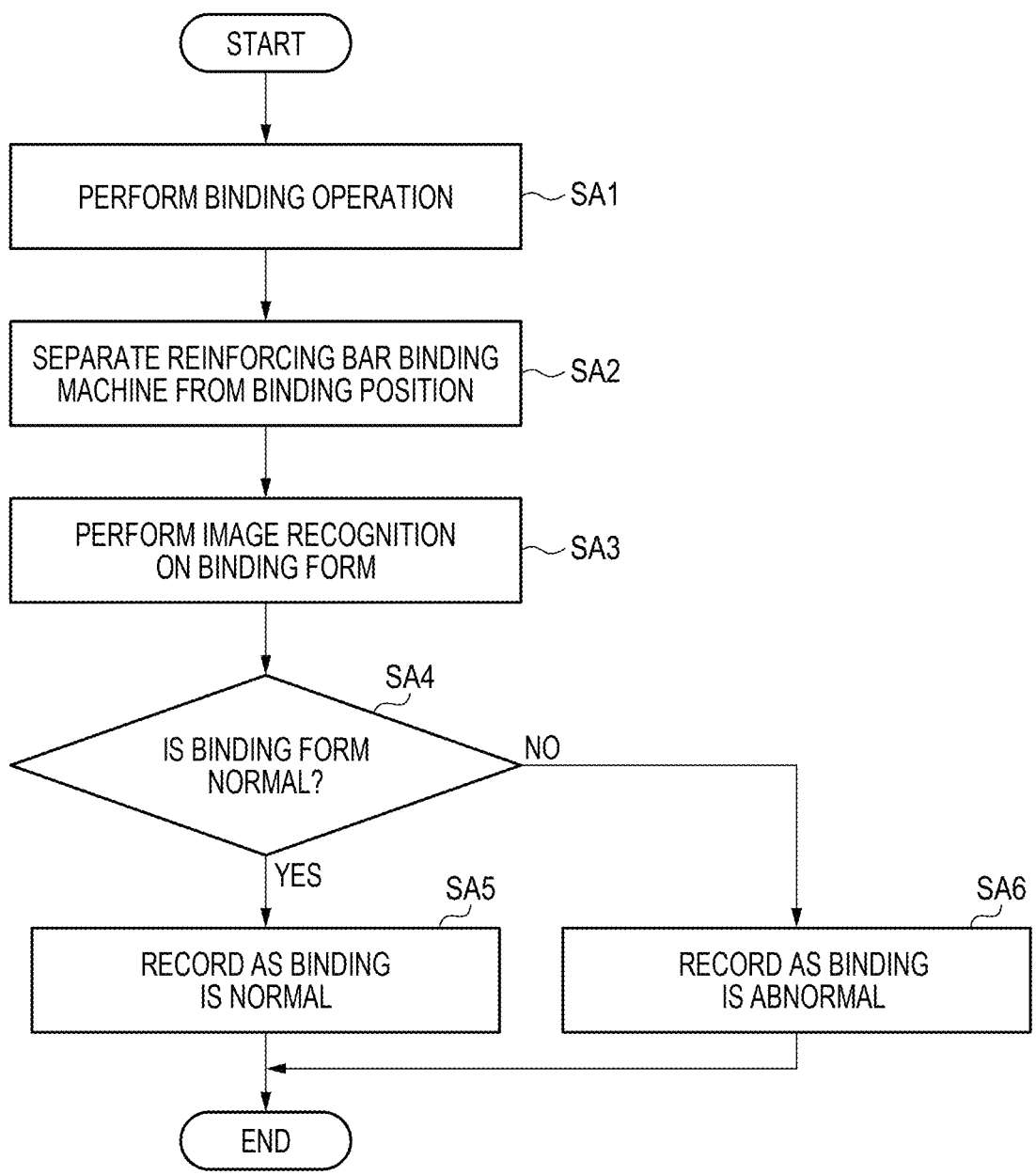
FIG. 8 is a flowchart illustrating an example of an operation based on binding position image information acquired by image recognition of a binding form.

Example of Operation Based on Binding Position Image Information Acquired by Image Recognition of Binding Form FIG. 8 is a flowchart illustrating an example of an operation based on binding position image information acquired by image recognition of a binding form. With reference to the drawings, control based on information acquired by the camera 121 will be described as control based on the binding related information. In the binding equipment 100A, in step SA1 of FIG. 8, when the above-described binding operation is performed, the information processing device 110*a* controls the transfer robot 200A according to a predetermined program, and in step SA2 of FIG. 8, the reinforcing bar binding machine 1A of which the binding operation is ended is moved in a direction separating from the binding position P10 by the operation of the transfer robot 200A. In the binding equipment 100B illustrated in FIG. 1C, when the above-described binding operation is performed, the information processing device 110*a* controls the transfer robot 200B according to a predetermined program, and the reinforcing bar binding machine 1A of which the binding operation is ended is moved in a direction separating from the binding position P10 by the operation of the transfer robot 200B. The following operation will be described with respect to the binding equipment 100A, and the same applies to the binding equipment 100B.

With an operation of moving the reinforcing bar binding machine 1A of which the binding operation is ended in a direction separating from the binding position P10 to remove the reinforcing bars S from between the curl guide 50 and the leading guide 51 of the curl forming unit 5, when the reinforcing bar binding machine 1A is moved to a position where the binding position P10 including the wire W that binds the reinforcing bars S falls within the image capturing range of the camera 121, the control unit 14 of the reinforcing bar binding machine 1A controls the camera 121 to capture the binding position P10 including the wire W that binds the reinforcing bars S, and acquires binding position image information after the binding operation as the binding related information, the binding position image information includes a binding form obtained by the wire W which is necessary for determining whether the binding is normally performed. The binding position P10 including the wire W that binds the reinforcing bars S may be captured from a plurality of directions by changing an orientation of the reinforcing bar binding machine 1A or the like.

The control unit 14 of the reinforcing bar binding machine 1A notifies the information processing device 10*b*, through the information communication unit 102, of the binding position image information after binding acquired by capturing the binding position P10 including the wire W that binds the reinforcing bars S by the camera 121 in the embodiments illustrated in FIGS. 4A, 4B, and 4C, and notifies the information processing device 110*a*, through the information communication unit 102, of the binding position image information after binding in the embodiment illustrated in FIG. 4D.

The information processing device 110*b* illustrated in FIGS. 4A, 4B, and 4C, and the information processing device 110*a* illustrated in FIG. 4D may report the binding position image information. In addition, the information processing device 110*b* illustrated in FIG. 4C notifies the information processing device 110*a* illustrated in FIG. 4C of the binding position image information.

The information processing device 110*a* illustrated in FIGS. 4C and 4D performs image recognition of the binding position image information after binding, and identifies presence or absence of an abnormal portion based on the shape or the like of the wire W that binds the reinforcing bars S in step SA3 of FIG. 8, and determines whether the binding is normally performed in step SA4 of FIG. 8. Incidentally, the information processing device 110*a* may generate a 3D image by synthesizing the binding position image information of a 2D image acquired by capturing the binding position P10 from a plurality of directions, and determine whether the binding is normally performed based on the 2D image and the 3D image. In addition, as the binding related information, it may be determined whether the binding is normally performed by using a value of a current flowing in the motor 80 or the like in the operation of twisting the wire W. Further, the information processing device 110*a* illustrated in FIGS. 4C and 4D may report binding result information indicating whether the binding is normally performed, and the information processing device 110*b* illustrated in FIGS. 4A and 4B may report binding result information after determining whether the binding is normally performed.

Figure 9A:
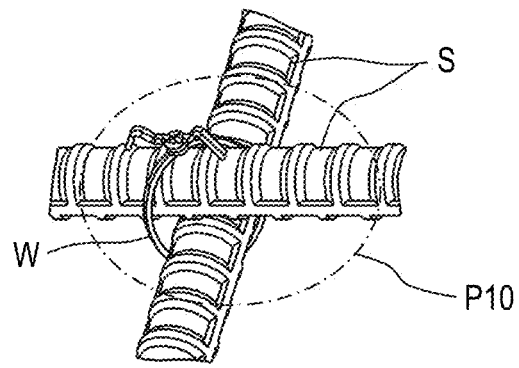
FIG. 9A is a perspective view illustrating an example of a binding position bound with a wire.
Figure 9B:
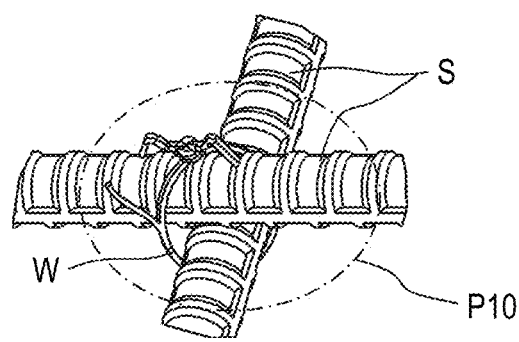
FIG. 9B is a perspective view illustrating an example of a binding position bound with a wire.
Figure 9C:
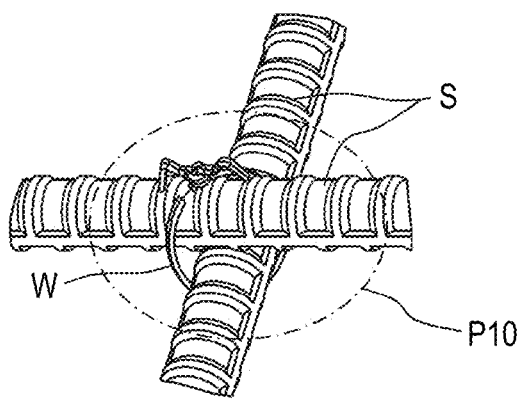
FIG. 9C is a perspective view illustrating an example of a binding position bound with a wire.
Figure 10A:
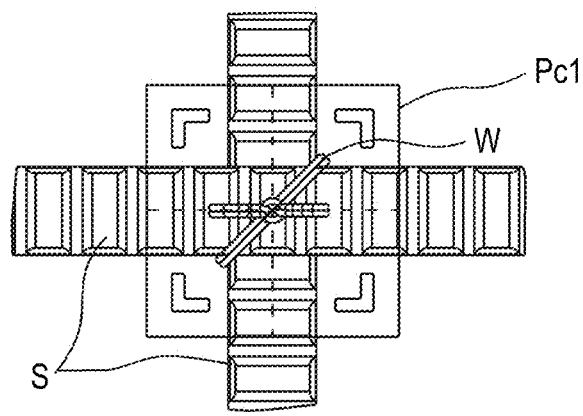
FIG. 10A is an explanatory view illustrating an example of the binding position image information.
Figure 10B:
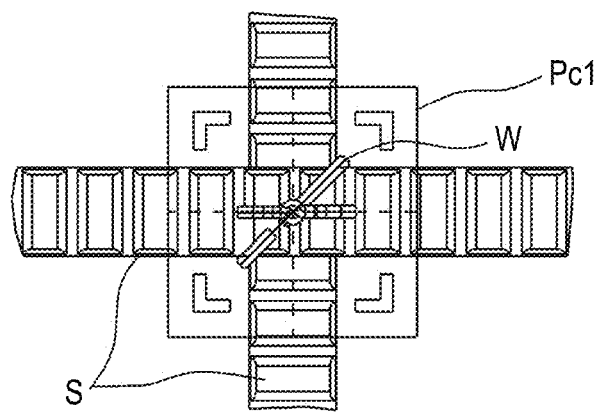
FIG. 10B is an explanatory view illustrating an example of the binding position image information.

FIGS. 9A, 9B, and 9C are perspective views illustrating examples of a binding position bound with a wire, and FIGS. 10A and 10B are explanatory views illustrating an example of binding position image information after binding. When the wire W that binds the reinforcing bars S is not cut or the like and is normally bound as illustrated in FIG. 9A, as illustrated in FIG. 10A, no abnormal portion is detected in binding position image information Pc1 after binding in which the corresponding binding position P10 is captured. Accordingly, the information processing device 110*a* illustrated in FIGS. 4C and 4D determines that the reinforcing bars S are normally bound with the wire W, and records that the binding result is normal in step SA5 of FIG. 8.

On the other hand, in a case where the reinforcing bars S are bound by two wires W, when one wire is cut as illustrated in FIG. 9B or two wires W are cut as illustrated in FIG. 9C, as illustrated in FIG. 10B, an abnormal portion is detected in the binding position image information Pc1 after binding in which the corresponding binding position P10 is captured. Accordingly, the information processing device 10*a* illustrated in FIGS. 4C and 4D determines that the reinforcing bars S are not normally bound with the wire W, and records that the binding result is abnormal in step SA6 of FIG. 8.

Incidentally, the information processing device 110*b* illustrated in FIGS. 4A, 4B, and 4C may record the binding result. In addition, a person may input predetermined information to the information processing device 110*a* illustrated in FIGS. 4A and 4B based on the binding position image information reported by the information processing device 110b illustrated in FIGS. 4A and 4B, and the information processing device 110a illustrated in FIGS. 4A and 4B may determine whether the binding is normally performed based on the input information, and may record the binding result.

Example of Operation of Associating Binding Result Information with Position Information The information processing device 110a illustrated in FIGS. 4A, 4B, 4C, and 4D constitutes a position information acquisition means, and acquires the position information (address) of the binding position P10 at which the binding operation is performed. In the information processing device 110a illustrated in FIG. 4C, the binding position image information Pc1 after binding notified from the information processing device 110b, binding result information indicating whether the binding is normally performed determined based on the binding position image information Pc1, and the address of the binding position P10 are stored in association with each other.

In addition, in the information processing device 110a illustrated in FIG. 4D, the binding position image information Pc1 after binding acquired from the reinforcing bar binding machine 1A, the binding result information determined based on the binding position image information Pc1, and the address of the binding position P10 are stored in association with each other. Further, in the information processing device 110a illustrated in FIGS. 4A and 4B, the binding result information input by the person with a determination based on the binding position image information Pc1 notified to the information processing device 110b and the address of the binding position P10 are stored in association with each other.

In the information processing device 110a illustrated in FIGS. 4A and 4B, the address and a time of the binding position P10 are stored in association with each other. In the reinforcing bar binding machine 1A, whether the binding is normally performed is determined and binding result information is acquired, and the binding result information and the time are stored in association with each other. Accordingly, when the information stored in the information processing device 110a and the information stored in the reinforcing bar binding machine 1A are written and compared with each other based on the time, the binding result information and the address of the binding position P10 can be associated with each other. In addition, by assigning identification information to the information stored in the information processing device 110a and the information stored in the reinforcing bar binding machine 1A, it is possible to compare the binding result information with the address of the binding position P10 without using the time.

Figure 11:
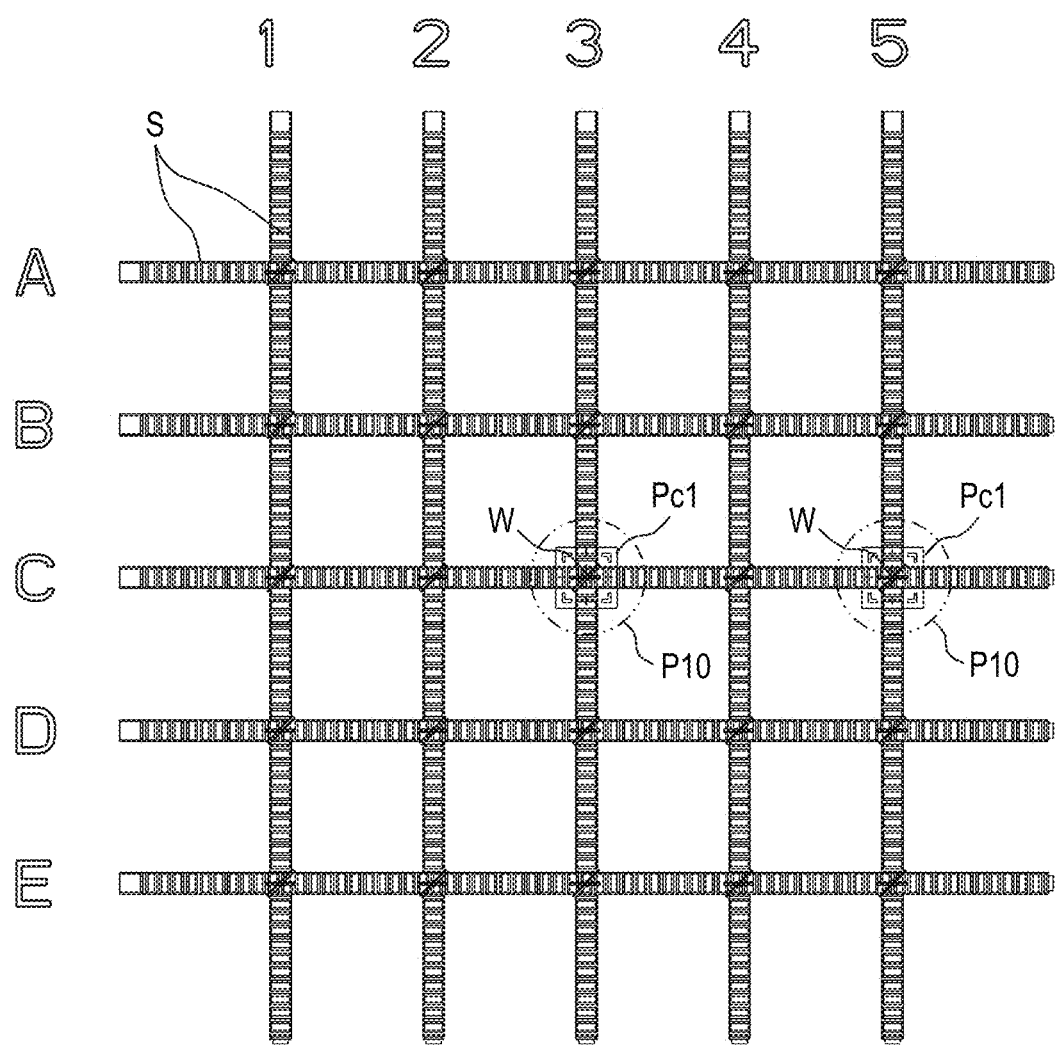
FIG. 11 is an explanatory view illustrating an example of an address for specifying the binding position.

FIG. 11 is an explanatory view illustrating an example of an address for specifying a binding position. Since the reinforcing bars S are arranged, for example, in a lattice pattern, a unique identifier is given to each of the reinforcing bars S in a row direction and the reinforcing bars S in a column direction by a number, an alphabet, or the like. Then, an address for specifying the binding position P10 is generated by a combination (Si, Sj) of an identifier Si in the row direction and an identifier Sj in the column direction.

Figure 12A:
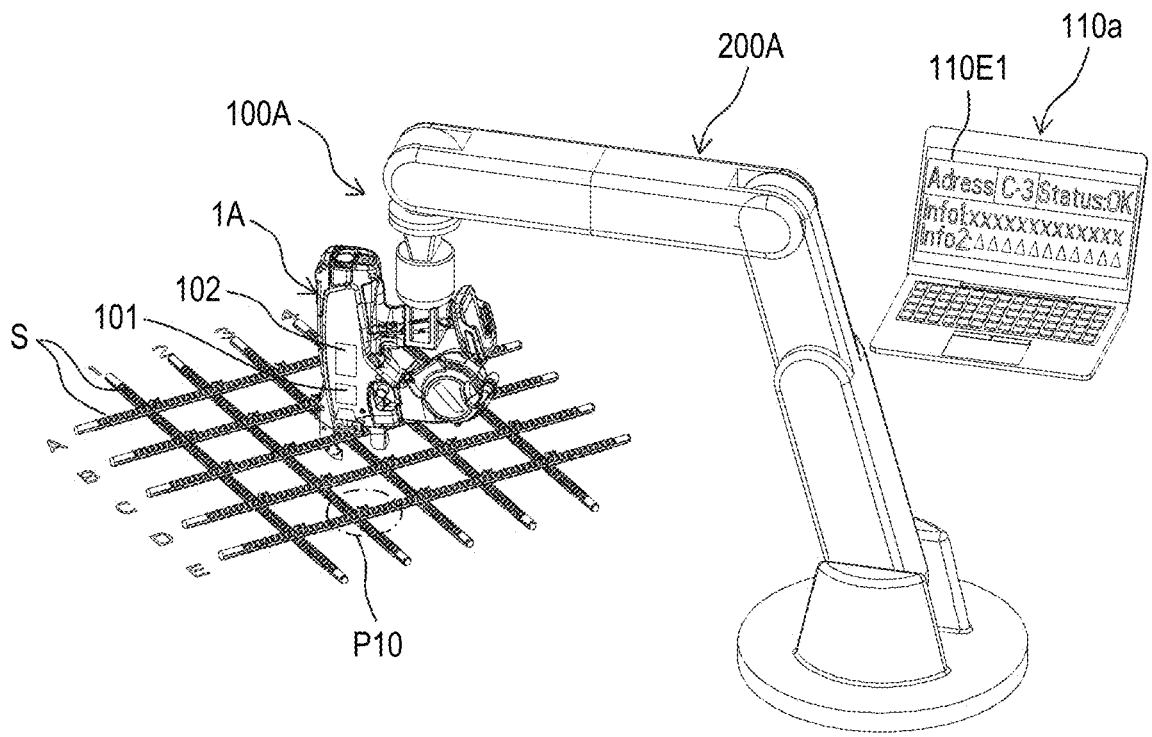
FIG. 12A is an explanatory view illustrating an output example of a binding result.
Figure 12B:
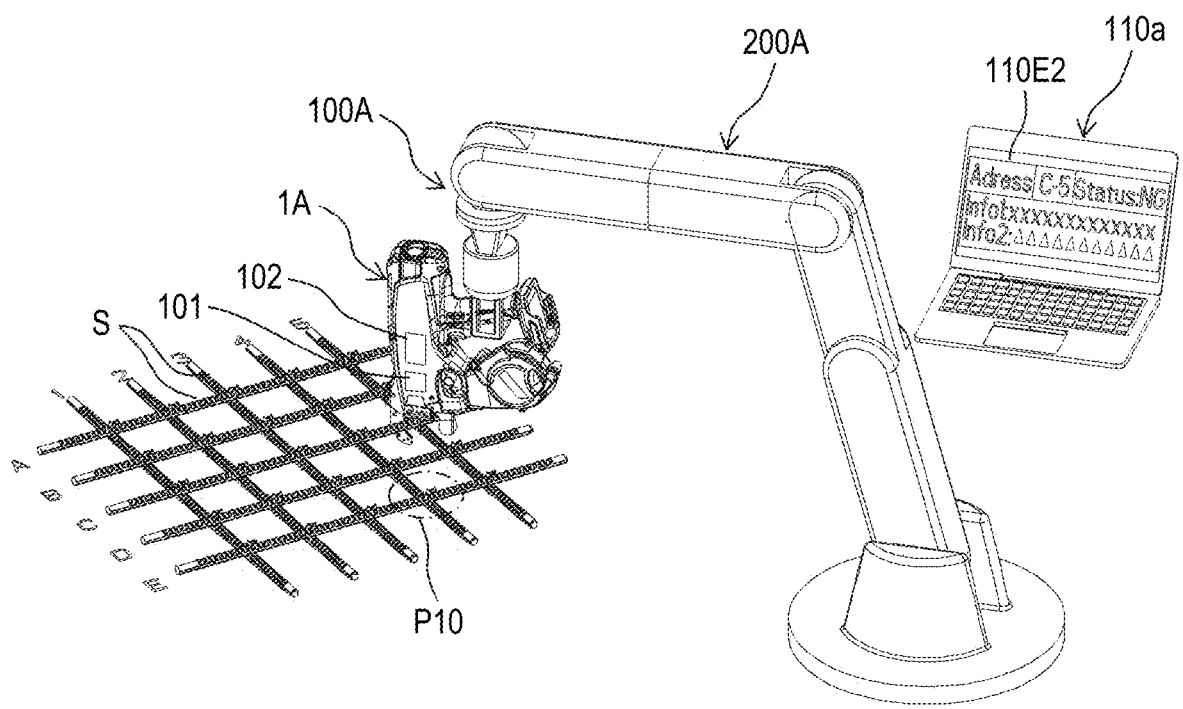
FIG. 12B is an explanatory view illustrating an output example of the binding result.

FIGS. 12A and 12B are explanatory views illustrating output examples of the binding result. For example, when it is determined that the wire W that binds the reinforcing bars S is not cut and the binding result is normal based on the binding position image information Pc1 acquired at the binding position P10 specified by an address (C, 3), the information processing device 110a stores the binding result information indicating that the binding result is normal and the address of the binding position P10. When the information processing device 110a determines that the binding result is normal, as illustrated in FIG. 12A, the information processing device 110a outputs, for example, report information 110E1 including the binding result information indicating that the binding result is normal and the address of the binding position P10 as visual information.

On the other hand, for example, when it is determined that the wire W that binds the reinforcing bars S is cut and the binding result is abnormal based on the binding position image information Pc1 acquired at the binding position P10 specified by an address (C, 5), the information processing device 110a stores the binding result information indicating that the binding result is abnormal and the address of the binding position P10. When the information processing device 110a determines that the binding result is abnormal, as illustrated in FIG. 12B, the information processing device 110a outputs, for example, report information 110E2 including the binding result information indicating that the binding result is abnormal and the address of the binding position P10 as visual information.

Determination of whether the binding result is normal or abnormal may be performed by comparing the binding position image information Pc1 acquired in a current binding operation with a past binding position image information Pc1 specified by the address of the binding position P10 from which the binding result is acquired, or may be performed by comparing the binding position image information Pc1 acquired in the current binding operation with the binding position image information Pc1 indicating a standard form in which the binding is normally performed, which is acquired in advance. A person may confirm and compare the binding position image information Pc1 reported in the current binding operation, determine whether the binding result is normal or abnormal, and input the binding result information to the information processing device 110a.

FIGS. 13A, 13B, 13C, 13D, and 13E are flowcharts illustrating examples of an operation of associating the binding result information with the position information. The information processing device 110a acquires the address (Si, Sj) of the binding position P10 in step SB1 of FIG. 13A, and performs the above-described binding operation at the binding position P10 specified by the address (Si, Sj) in step SB2 of FIG. 13A. When the binding operation is performed, the binding related information is acquired in step SB3 of FIG. 13A. The binding related information is, for example, the binding position image information Pc1 or information based on the binding position image information Pc1.

In this example, for each address of the binding position P10, the past binding position image information obtained by accumulating information obtained by digitizing the binding position image information Pc1 that the binding result is normal and performing statistical processing on the information is stored. Then, in step SB4 of FIG. 13A, the binding position image information Pc1 acquired in the current binding operation is compared with the past binding position image information indicating the normal binding result, and whether a difference therebetween is within a predetermined range, that is, whether the binding position image information Pc1 has a shape close to the normal binding result is determined. The binding position image information Pc1 acquired in the current binding operation may be compared with the past binding position image information indicating a normal result specified by the address of the binding position P10 from which the binding result is acquired, and whether the difference therebetween is within a predetermined range, that is, whether the binding position image information Pc1 has a shape close to the normal binding result may be determined.

Figure 13A:
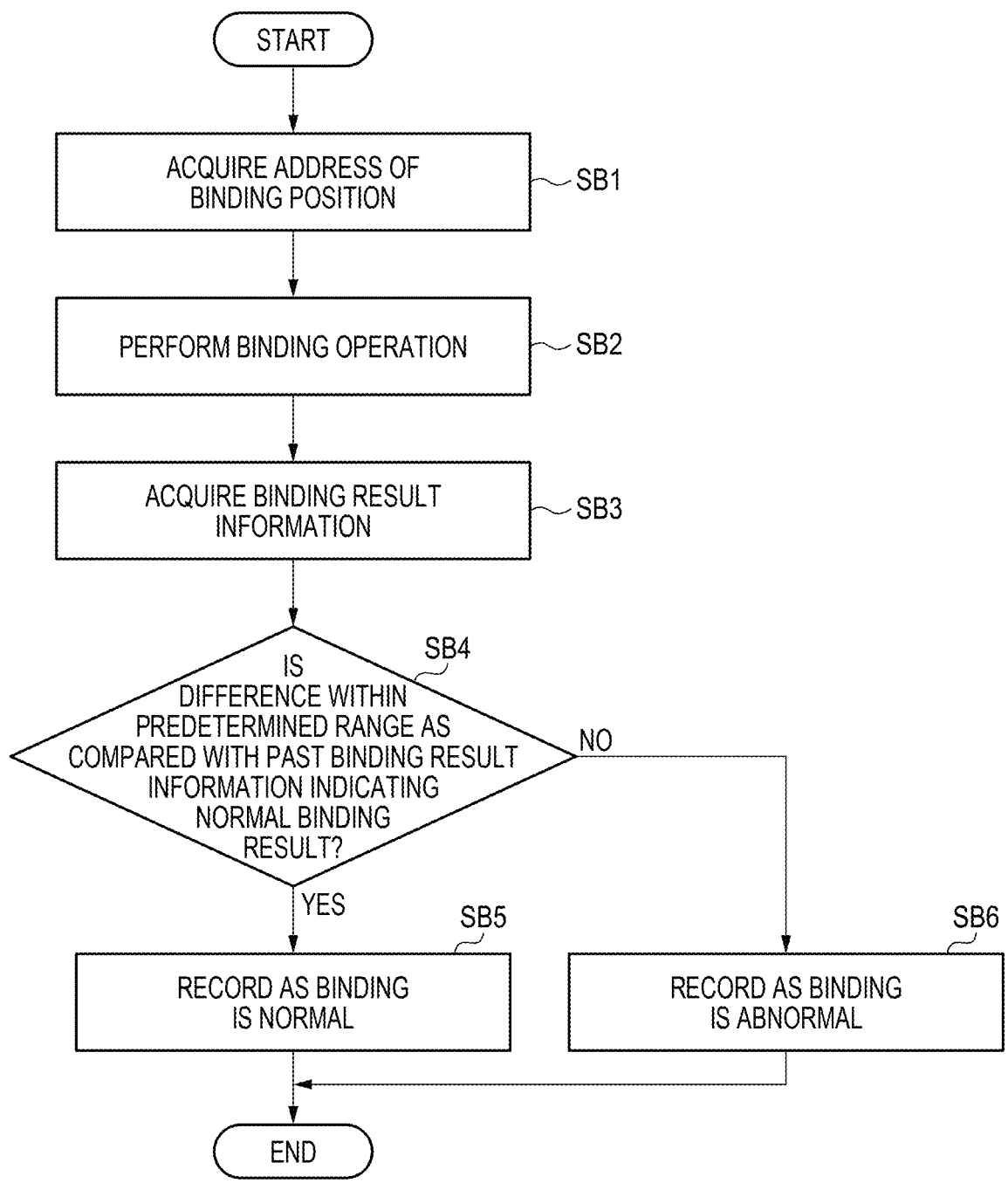
FIG. 13A is a flowchart illustrating an example of an operation of associating binding result information with position information.

When the difference between the binding position image information Pc1 acquired in the current binding operation and the past binding position image information indicating the normal binding result is within the predetermined range, the binding result information indicating that the binding result is normal is recorded in step SB5 of FIG. 13A. On the other hand, when the difference between the binding position image information Pc1 acquired in the current binding operation and the past binding result information indicating the normal binding result exceeds the predetermined range, the binding result information indicating that the binding result is abnormal is recorded in step SB6 of FIG. 13A.

When the information processing device 110 determines that the binding result is abnormal, a subsequent binding operation may be stopped. In addition, as the binding related information, the value of the current flowing through the motor 80 in the operation of twisting the wire W, information indicating a binding strength set by an operation unit (not illustrated) of the reinforcing bar binding machine 1A, and the like may be stored for each address in association with the address of the binding position P10, or may be reported. Further, it may be determined whether the binding is normally performed based on the value of the current flowing through the motor 80, and the binding result information may be stored for each address in association with the address of the binding position P10.

In addition, the binding result information and the address of the binding position P10 may be stored in association with each other, and when it is determined based on the past binding result information that an abnormal binding result has occurred at the same binding position P10 a predetermined number of times or more, it may be determined that an abnormality has occurred, and the subsequent binding operation may be stopped, or report information may be output.

Figure 13B:
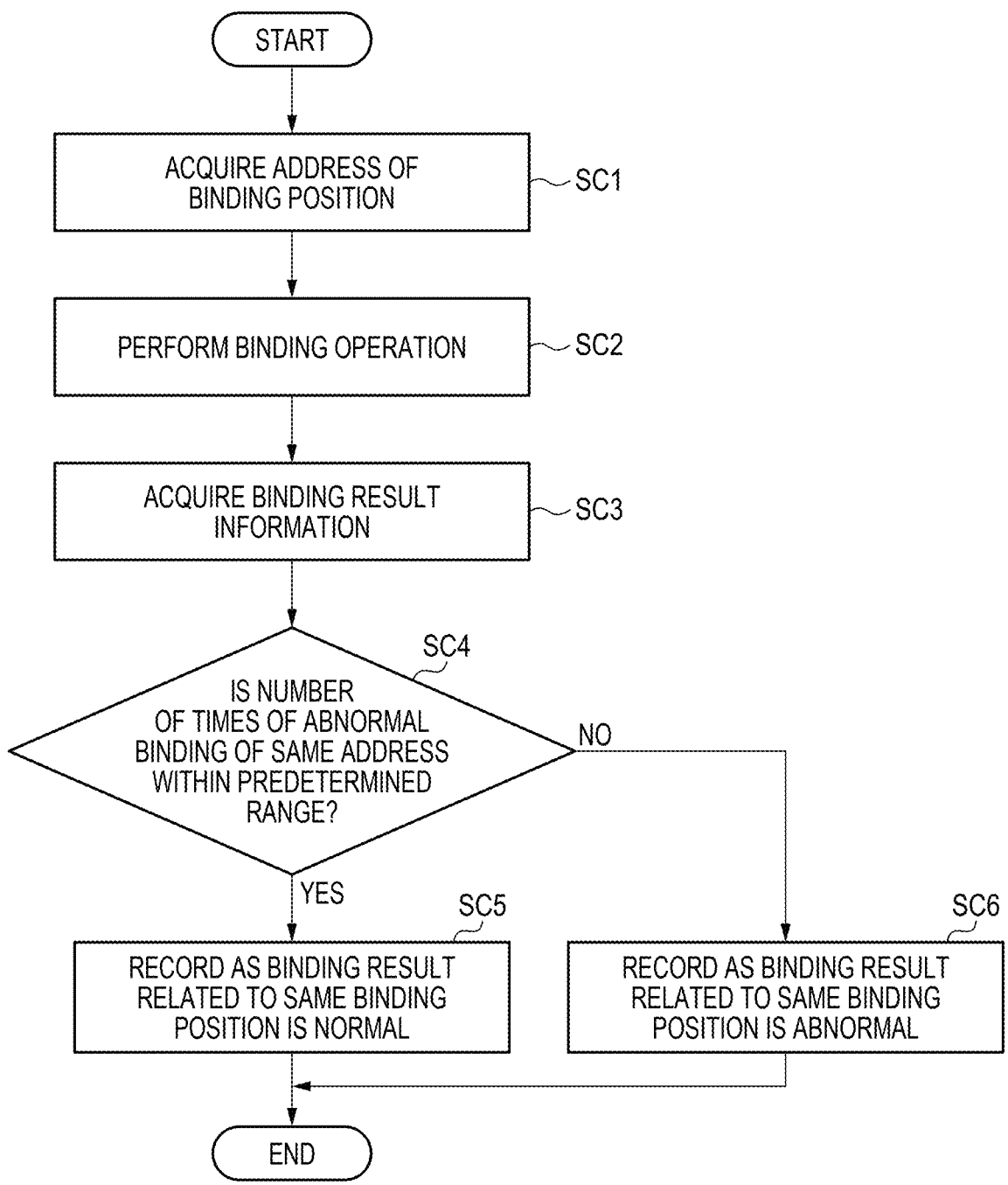
FIG. 13B is a flowchart illustrating an example of the operation of associating the binding result information with the position information.

That is, the address (Si, Sj) of the binding position P10 is acquired in step SC1 of FIG. 13B, and the above-described binding operation is performed at the binding position P10 specified by the address (Si, Sj) in step SC2 of FIG. 13B. When the binding operation is performed, the binding related information is acquired in step SC3 of FIG. 13B. The binding related information is, for example, the binding position image information Pc1 or information based on the binding position image information Pc1.

In step SC4 of FIG. 13B, whether the binding is normal or abnormal is determined based on the binding position image information Pc1 acquired in the current binding operation, and whether the number of times that the individual binding results aggregated for each binding position specified by the same address is abnormal is within a predetermined number of times is determined.

When the number of times that the individual binding results aggregated for each binding position specified by the same address is abnormal is within the predetermined number of times, in step SC5 of FIG. 13B, the binding result information indicating that the binding result related to the same binding position determined based on the individual binding results is normal is recorded. On the other hand, when the number of times that the individual binding results aggregated for each binding position specified by the same address is abnormal exceeds the predetermined number of times, in step SC6 of FIG. 13B, the binding result information indicating that the binding result related to the same binding position determined based on the individual binding results is abnormal is recorded.

Further, the binding equipment 100A is used for an application of manufacturing a structure in which a predetermined number of reinforcing bars S are assembled in a lattice pattern or the like and a plurality of binding positions P10 are formed, and in the same structure, when it is determined that the number of times that the individual binding results of respective binding positions aggregated for a plurality of different binding positions P10 as a whole are abnormal is equal to or more than a predetermined number of times, it is determined that an abnormality has occurred, and the subsequent binding operation may be stopped, or report information may be output.

Figure 13C:
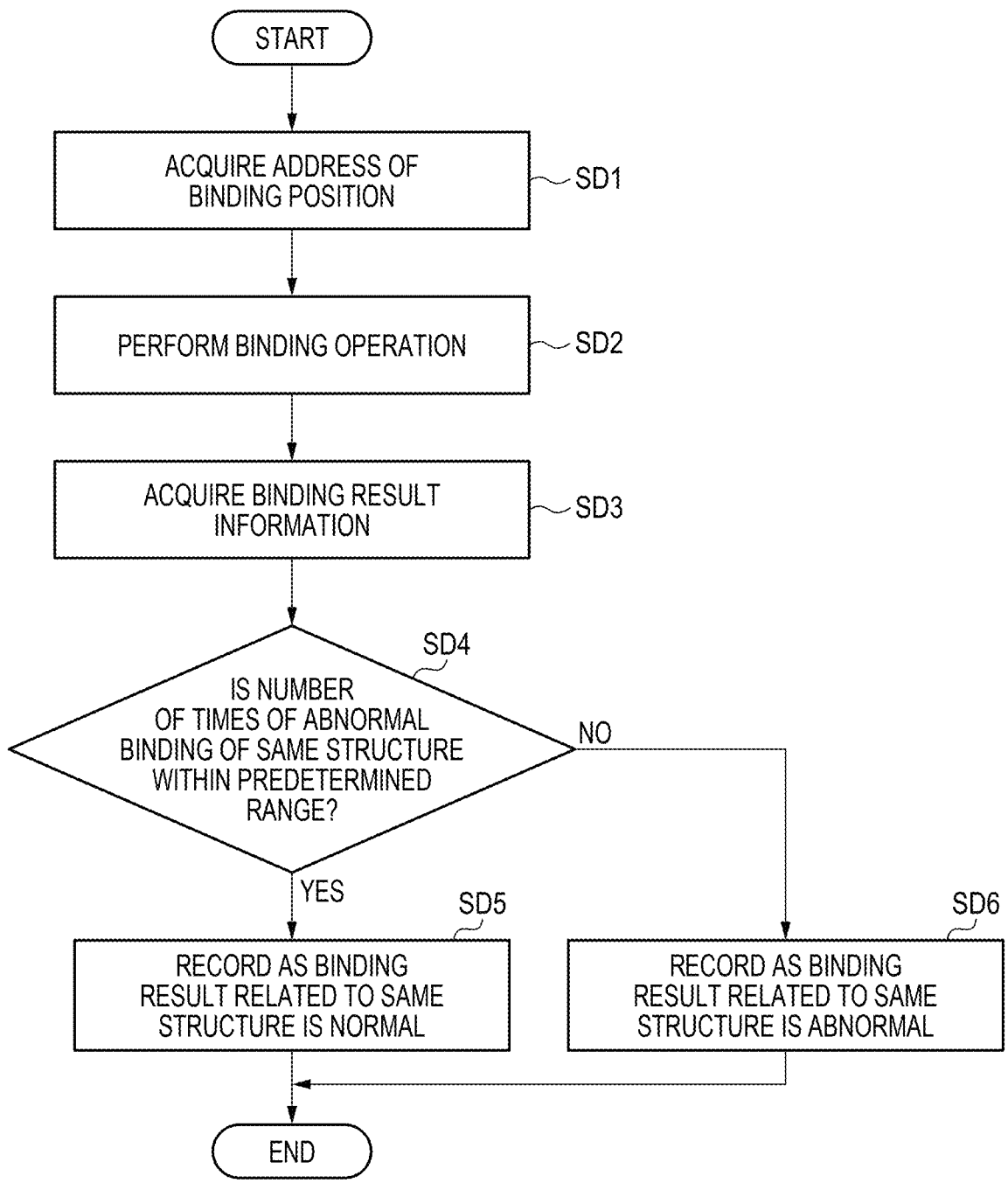
FIG. 13C is a flowchart illustrating an example of the operation of associating the binding result information with the position information.

That is, the address (Si, Sj) of the binding position P10 is acquired in step SD1 of FIG. 13C, and the above-described binding operation is performed at the binding position P10 specified by the address (Si, Sj) in step SD2 of FIG. 13C. When the binding operation is performed, the binding related information is acquired in step SD3 of FIG. 13C. The binding related information is, for example, the binding position image information Pc1 or information based on the binding position image information Pc1.

In step SD4 of FIG. 13C, whether the binding is normal or abnormal is determined based on the binding position image information Pc1 acquired in the current binding operation, and in the same structure, whether the number of times that the individual binding results of the respective binding positions aggregated for the plurality of different binding positions P10 as a whole are abnormal is within the predetermined number of times is determined.

In the same structure, when the number of times that the individual binding results of the respective binding positions aggregated for the plurality of different binding positions P10 as a whole are abnormal is within the predetermined number of times, in step SD5 of FIG. 13C, binding result information indicating that the binding results related to the same structure determined based on the individual binding results is normal is recorded. On the other hand, in the same structure, when the number of times that the individual binding results of the respective binding positions aggregated for the plurality of different binding positions P10 as a whole are abnormal exceeds the predetermined number of times, in step SD6 of FIG. 13C, binding result information indicating that the binding results related to the same structure determined based on the individual binding results is abnormal is recorded.

In the reinforcing bar binding machine 1A, whether the binding is normally performed is determined and the binding result information is acquired, and the binding result information and the time are stored in association with each other, so that whether the manufacturing (binding operation) of one structure has ended from a time when the binding is performed and the manufacturing (binding operation) of a next structure is started may be determined, and whether the number of times that the binding result of the same structure is abnormal is within a predetermined number of times may be determined.

In addition, depending on a distribution of the binding positions P10 in which the binding result is abnormal, the strength of the structure may be insufficient, and the structure may not be transported while maintaining the shape. Therefore, when it is determined that the transport of the structure is difficult based on the address of the binding position P10 for which the binding result is abnormal in the same structure, the subsequent binding operation may be stopped, or the report information may be output.

Figure 13D:
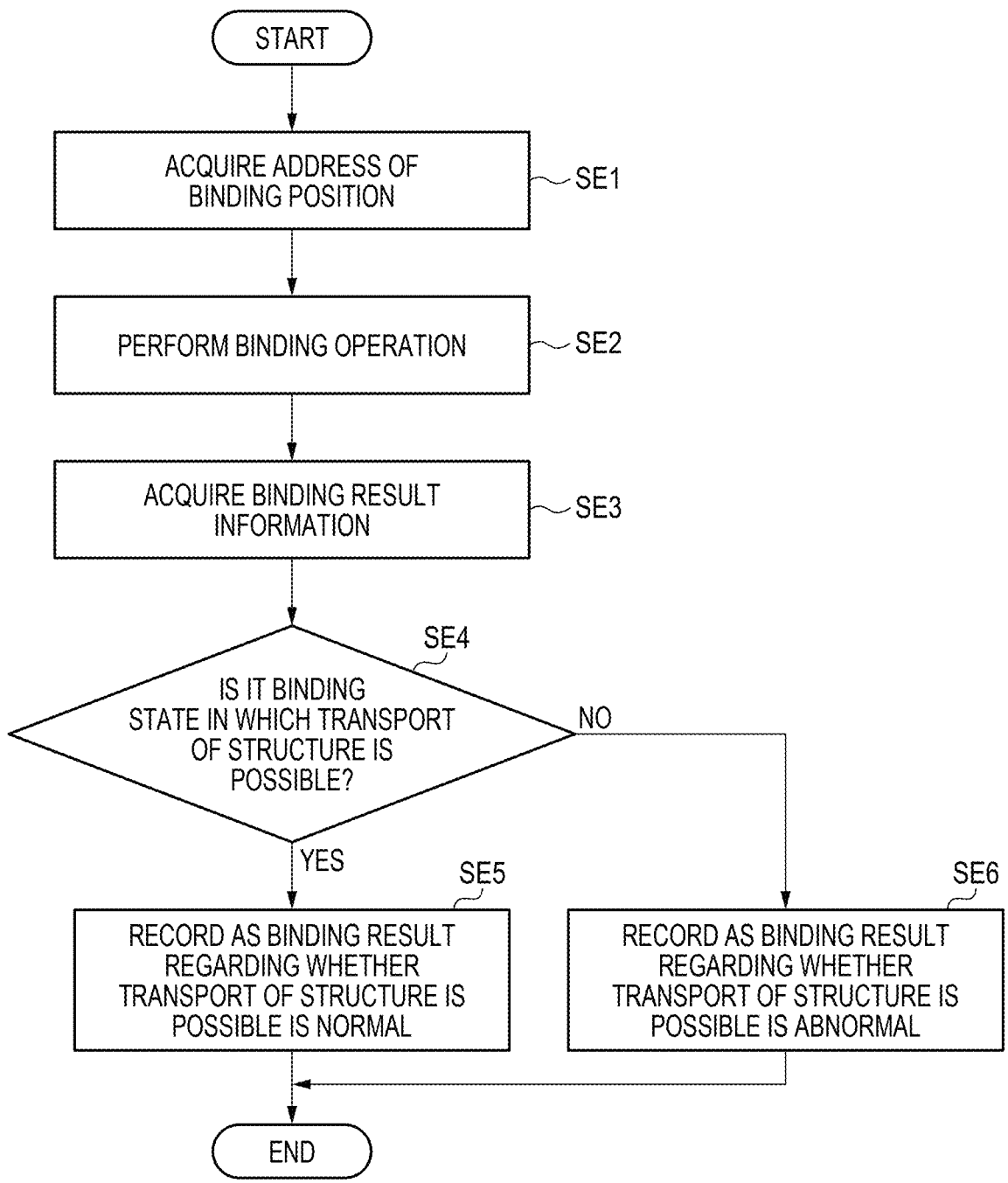
FIG. 13D is a flowchart illustrating an example of the operation of associating the binding result information with the position information.

That is, the address (Si, Sj) of the binding position P10 is acquired in step SE1 of FIG. 13D, and the above-described binding operation is performed at the binding position P10 specified by the address (Si, Sj) in step SE2 of FIG. 13D. When the binding operation is performed, the binding related information is acquired in step SE3 of FIG. 13D. The binding related information is, for example, the binding position image information Pc1 or information based on the binding position image information Pc.

In step SE4 of FIG. 13D, whether the binding is normal or abnormal is determined based on the binding position image information Pc1 acquired in the current binding operation, and whether the binding state is a binding state in which the transport of the structure is possible or a binding state in which the transport of the structure is difficult is determined based on the address of the binding position P10 for which the binding result is abnormal in the same structure.

In the binding state in which the transport of the structure is possible, in step SE5 of FIG. 13D, the binding result information indicating that the binding result regarding whether the transport of the structure is possible is normal is recorded. On the other hand, in the binding state in which the transport of the structure is difficult, in step SE6 of FIG. 13D, the binding result information indicating that the binding result regarding whether the transport of the structure is possible is abnormal is recorded.

Further, in the above-described binding operation, the feed motor 31 is rotated in the reverse direction to feed the wire W in the reverse direction, and in the operation of wrapping the wire W around the reinforcing bar S, when the wire W wound around the reinforcing bar S is cut in the middle of the operation, a rotation amount until the feed motor 31 is stopped becomes larger than that in a normal state. In addition, when the wire W wound around the reinforcing bar S is entangled in the middle of the operation, the rotation amount until the feed motor 31 is stopped becomes smaller than that in the normal state.

Figure 13E:
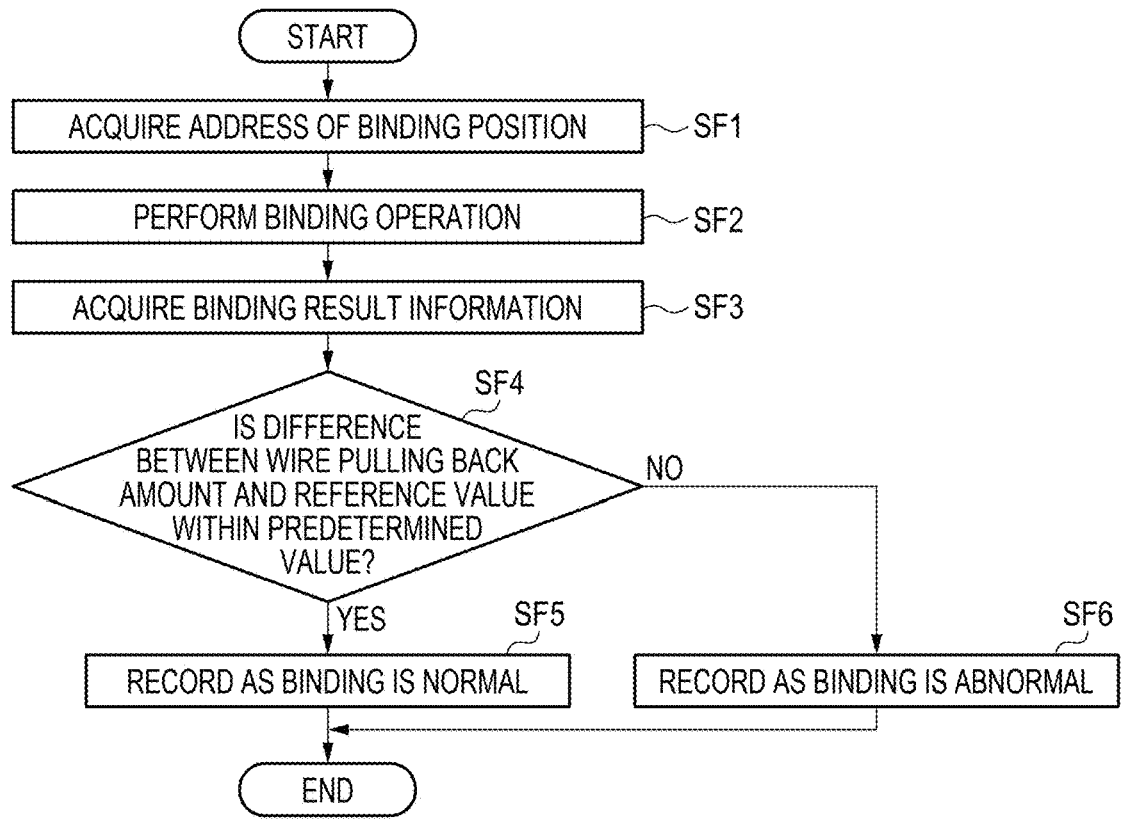
FIG. 13E is a flowchart illustrating an example of the operation of associating the binding result information with the position information.

Therefore, the address (Si, Sj) of the binding position P10 is acquired in step SF1 of FIG. 13E, and the above-described binding operation is performed at the binding position P10 specified by the address (Si, Sj) in step SF2 of FIG. 13E. When the binding operation is performed, the binding related information is acquired in step SF3 of FIG. 13E. The binding related information is a pulling back amount of the wire W in this example, and as the information acquisition means, the control unit 14 acquires a rotation amount when the feed motor 31 is rotated in the reverse direction, and associates the rotation amount of the feed motor 31 which is the pulling back amount of the wire W with the address.

Then, in step SF4 of FIG. 13E, the rotation amount of the feed motor 31, which is the pulling back amount of the wire W acquired in the current binding operation, is compared with a reference value of the rotation amount of the feed motor 31 at the time of pulling back the wire, and whether a difference therebetween is within a predetermined value is determined.

When the difference between the rotation amount of the feed motor 31, which is the pulling back amount of the wire W acquired in the current binding operation, and the reference value of the rotation amount of the feed motor 31 at the time of pulling back the wire is within the predetermined range, the binding result information indicating that the binding result is normal is recorded in step SF5 of FIG. 13E. On the other hand, when the difference between the rotation amount of the feed motor 31, which is the pulling back amount of the wire W acquired in the current binding operation, and the reference value of the rotation amount of the feed motor 31 at the time of pulling back the wire exceeds the predetermined range, the binding result information indicating that the binding result is abnormal is recorded in step SF6 of FIG. 13E. In addition, report information for prompting confirmation of the binding position P10 specified by the address may be output.

When the information processing device 110 determines that the binding result is abnormal, the information processing device 110 may move the reinforcing bar binding machine 1A to the binding position P10 specified by the address associated with the binding result information indicating that the binding result is abnormal and perform the binding operation again.

Figure 14A:
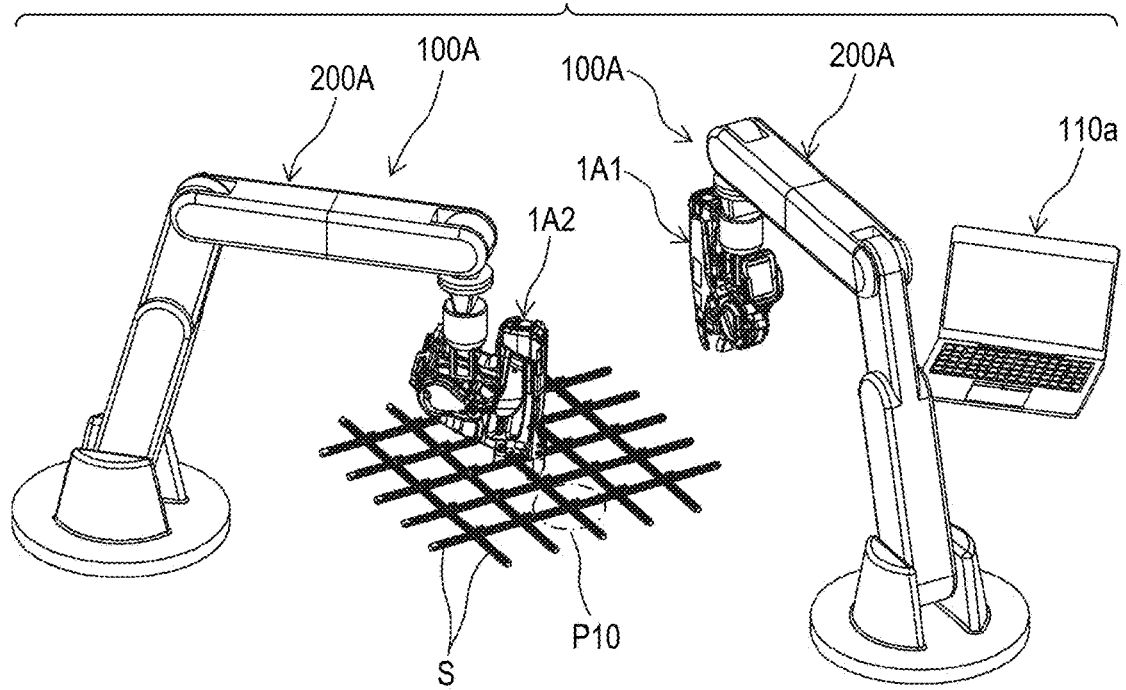
FIG. 14A is a perspective view illustrating an example of binding equipment including a plurality of reinforcing bar binding machines.
Figure 14B:
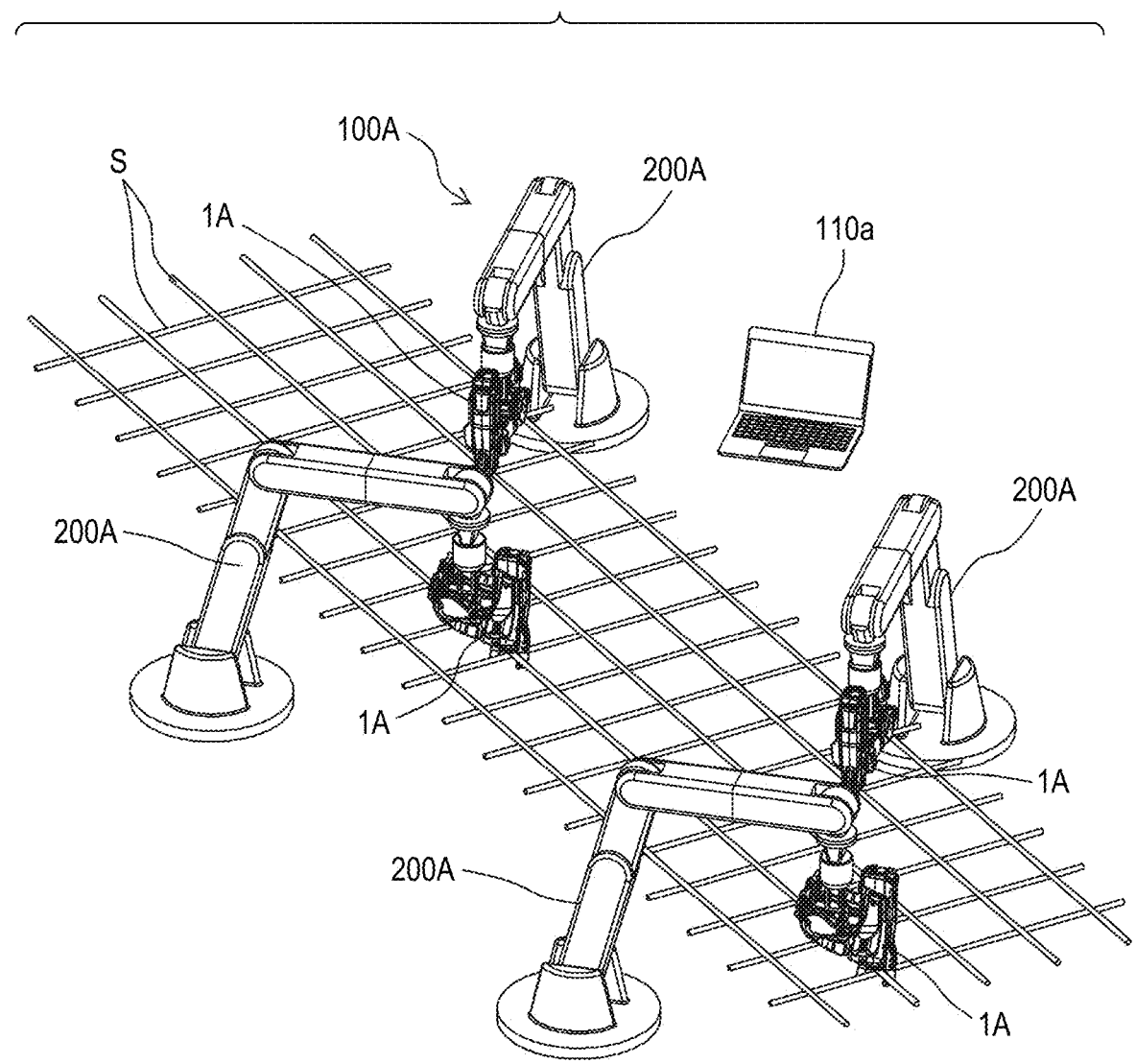
FIG. 14B is a perspective view illustrating an example of the binding equipment including the plurality of reinforcing bar binding machines.
Figure 14C:
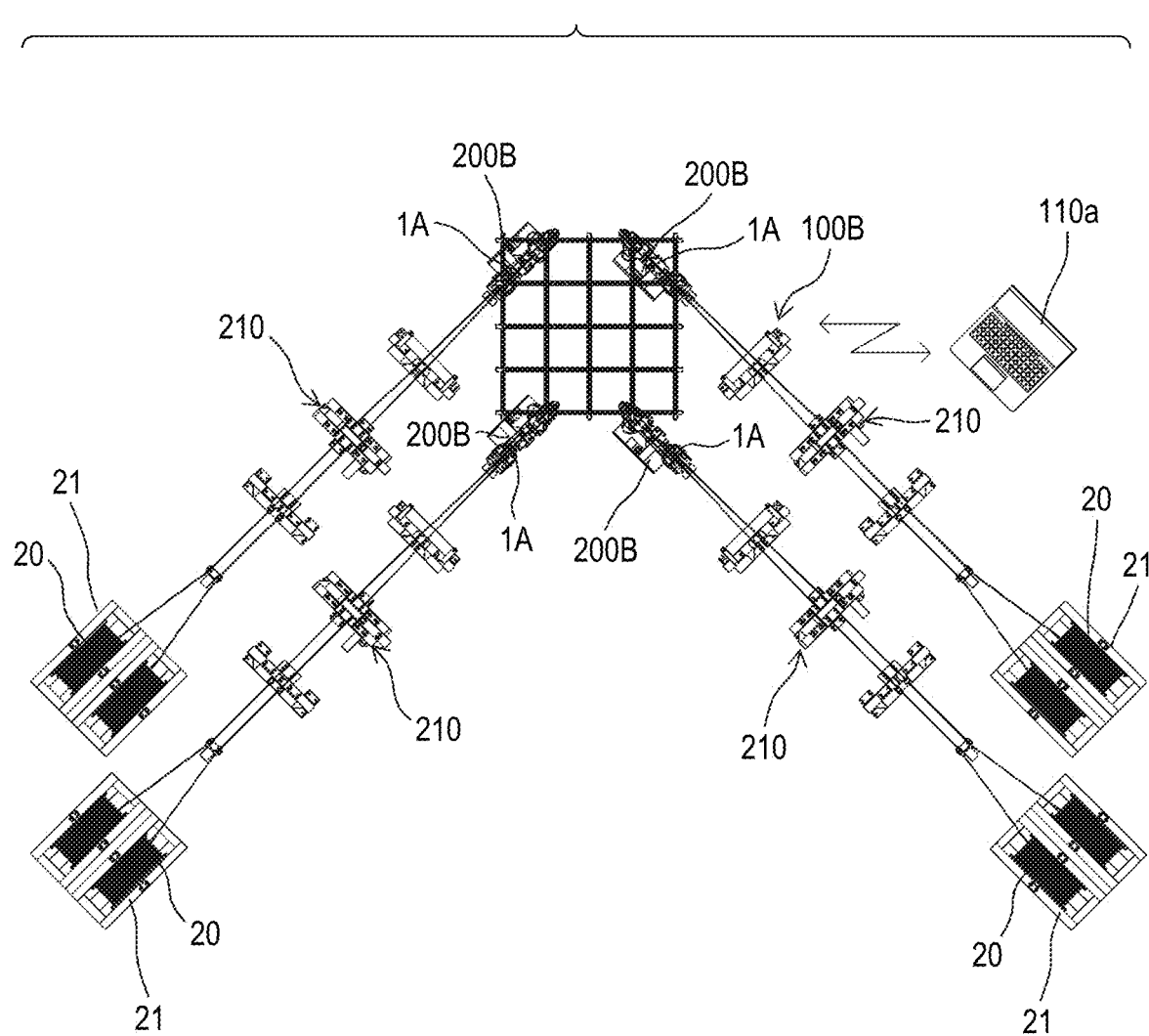
FIG. 14C is a plan view illustrating an example of the binding equipment including the plurality of reinforcing bar binding machines.

Example of Configuration of Binding Equipment Including Plurality of Reinforcing Bar Binding Machine FIGS. 14A and 14B are perspective views illustrating examples of binding equipment including a plurality of reinforcing bar binding machines, and FIG. 14C is a plan view illustrating an example of the binding equipment including a plurality of reinforcing bar binding machines. The binding equipment 100A including the plurality of reinforcing bar binding machines 1A illustrated in FIGS. 14A and 14B includes a plurality of transfer robots 200A capable of moving respective reinforcing bar binding machines 1A to different binding positions P10 and to the same binding position P10.

The binding equipment 100B according to a modification illustrated in FIG. 14C has a configuration in which the reel accommodation unit 21 that accommodates the reels 20 around which the wire W is wound is independent of the reinforcing bar binding machine 1A as illustrated in FIG. 1C, and includes a plurality of the reinforcing bar binding machines 1A, the reel accommodation units 21 provided corresponding to the respective reinforcing bar binding machines 1A, and the wire drawing mechanism 210 that draws out the wire W from the reels 20 accommodated in the respective reel accommodation units 21. In addition, the binding equipment 100B includes a plurality of the transfer robots 200B that move the respective reinforcing bar binding machines 1A to the binding position P10.

For example, in the binding equipment 100A illustrated in FIG. 14A, when it is determined that the binding result is abnormal in the binding operation performed by a certain reinforcing bar binding machine 1A1, the information processing device 110a may move the other reinforcing bar binding machine 1A2 to the binding position P10 specified by the address associated with the binding result information indicating that the binding result is abnormal, and perform the binding operation again.

In addition, the information processing device 110a may stop the device when individual binding results for a predetermined number of reinforcing bar binding machines 1A are abnormal in the binding equipment 100A including the plurality of reinforcing bar binding machines 1A.

Figure 15:
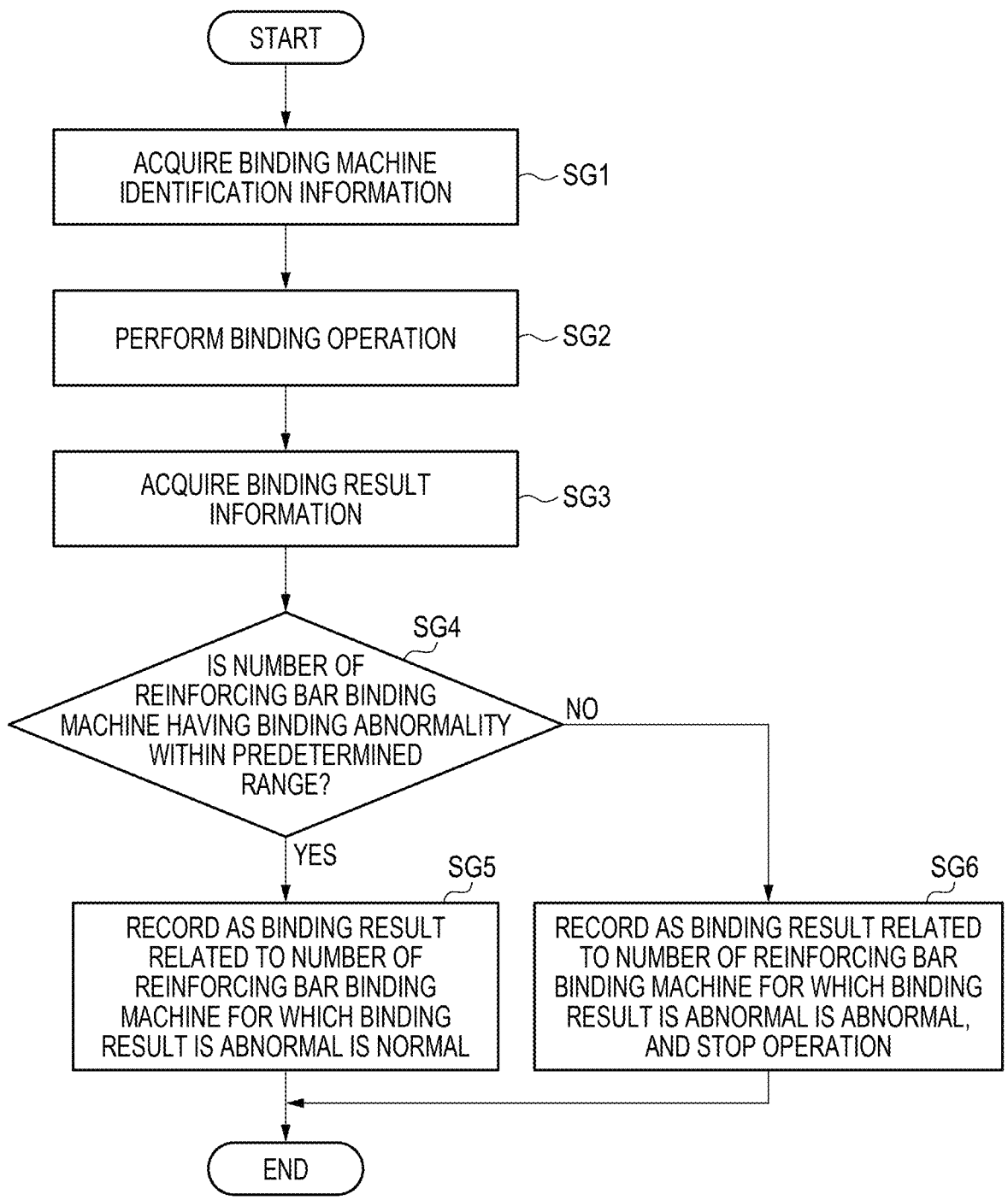
FIG. 15 is a flowchart illustrating an example of an operation of associating the binding result information with binding machine identification information.

Example of Operation of Binding Equipment Including Plurality of Reinforcing Bar Binding Machine FIG. 15 is a flowchart illustrating an example of an operation of associating the binding result information with the binding machine identification information. In step SG1 of FIG. 15, the binding machine identification information for identifying the reinforcing bar binding machine 1A that performs the binding operation is acquired, and in step SG2 of FIG. 15, the above-described binding operation is performed by the reinforcing bar binding machine 1A identified by the binding machine identification information. When the binding operation is performed, the binding related information is acquired in step SG3 of FIG. 15. The binding related information is, for example, the binding position image information Pc1 or information based on the binding position image information Pc1.

In step SG4 of FIG. 15, whether the binding is normal or abnormal is determined based on the binding position image information Pc1 acquired in the current binding operation, and whether the number of the reinforcing bar binding machines 1A for which the individual binding results that are binding results of any binding position are abnormal is within a predetermined value is determined based on the binding machine identification information of the reinforcing bar binding machine 1A in which the binding operation is performed.

When the number of the reinforcing bar binding machines 1A for which the individual binding results are abnormal is within the predetermined value, in step SG5 of FIG. 15, the binding result information indicating that the binding result related to the number of the reinforcing bar binding machines 1A for which the individual binding results are abnormal is normal is recorded. On the other hand, when the number of the reinforcing bar binding machines 1A for which the individual binding results are abnormal exceeds the predetermined value, in step SG6 of FIG. 15, the binding result information indicating that the binding results related to the number of the reinforcing bar binding machines 1A for which the individual binding results are abnormal is abnormal is recorded, and the operation of the binding equipment 100A is stopped.

In the binding equipment 100A and the binding equipment 100B that include the plurality of reinforcing bar binding machines 1A, when the information processing device 110a determines that the binding result is abnormal in the plurality of reinforcing bar binding machines 1A at the same time or within a predetermined time, the information processing device 110a may temporarily interrupt the subsequent binding operations in all the reinforcing bar binding machines 1A.

Example of Operation of Switching Binding Direction

Figure 16A:
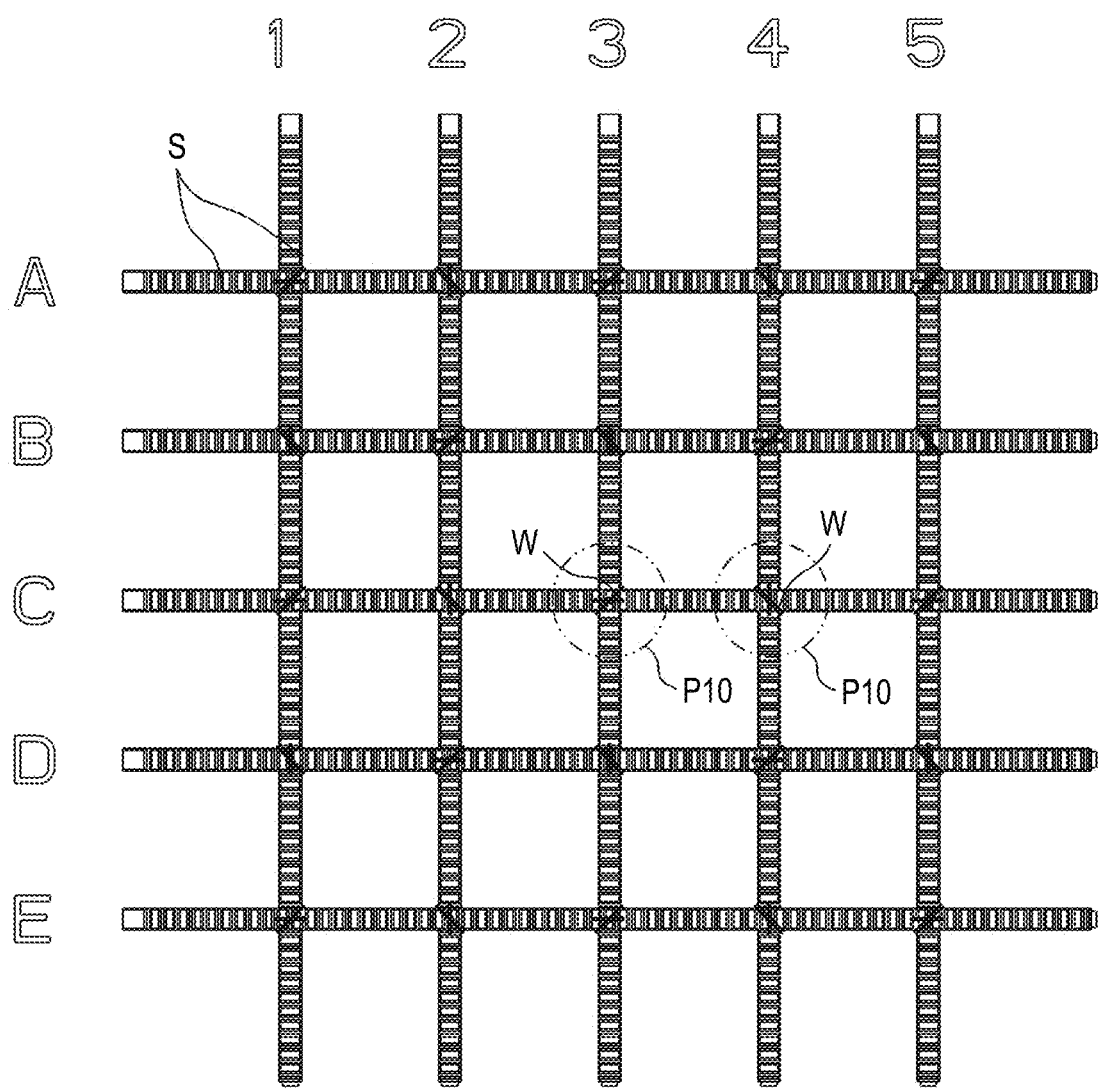
FIG. 16A is a plan view illustrating an example of a binding result obtained after binding directions are switched.
Figure 16B:
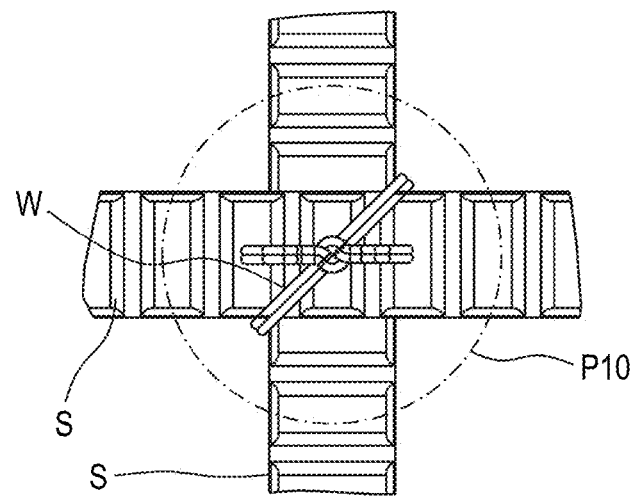
FIG. 16B is a main part plan view illustrating an example of the binding result obtained after the binding directions are switched.
Figure 16C:
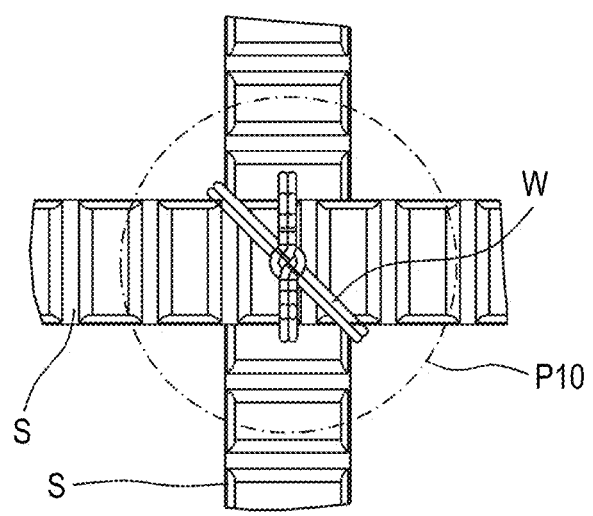
FIG. 16C is a main part plan view illustrating an example of the binding result obtained after the binding directions are switched.

FIG. 16A is a plan view illustrating an example of a binding result in which the binding direction is switched, and FIGS. 16B and 16C are main part plan views illustrating examples of binding results in which the binding direction is switched.

The information processing device 110a acquires the address of the binding position P10 at which the binding position image information Pc1 after binding is acquired, and associates the binding direction of the wire W specified by the binding position image information Pc1 with the address. Then, the reinforcing bar binding machine 1A is rotated in accordance with the address of the binding position P10 to switch the binding direction, thereby preventing the binding direction from being biased in the same direction.

For example, at the binding position P10 specified by an address (C, 3) illustrated in FIG. 16A and the binding position P10 specified by an address (C, 4) adjacent to the address (C, 3), the binding direction may be switched by changing an orientation for winding the wire W by a predetermined angle, for example, approximately 900 with respect to the extending direction of the intersecting two reinforcing bars S.

Figure 17:
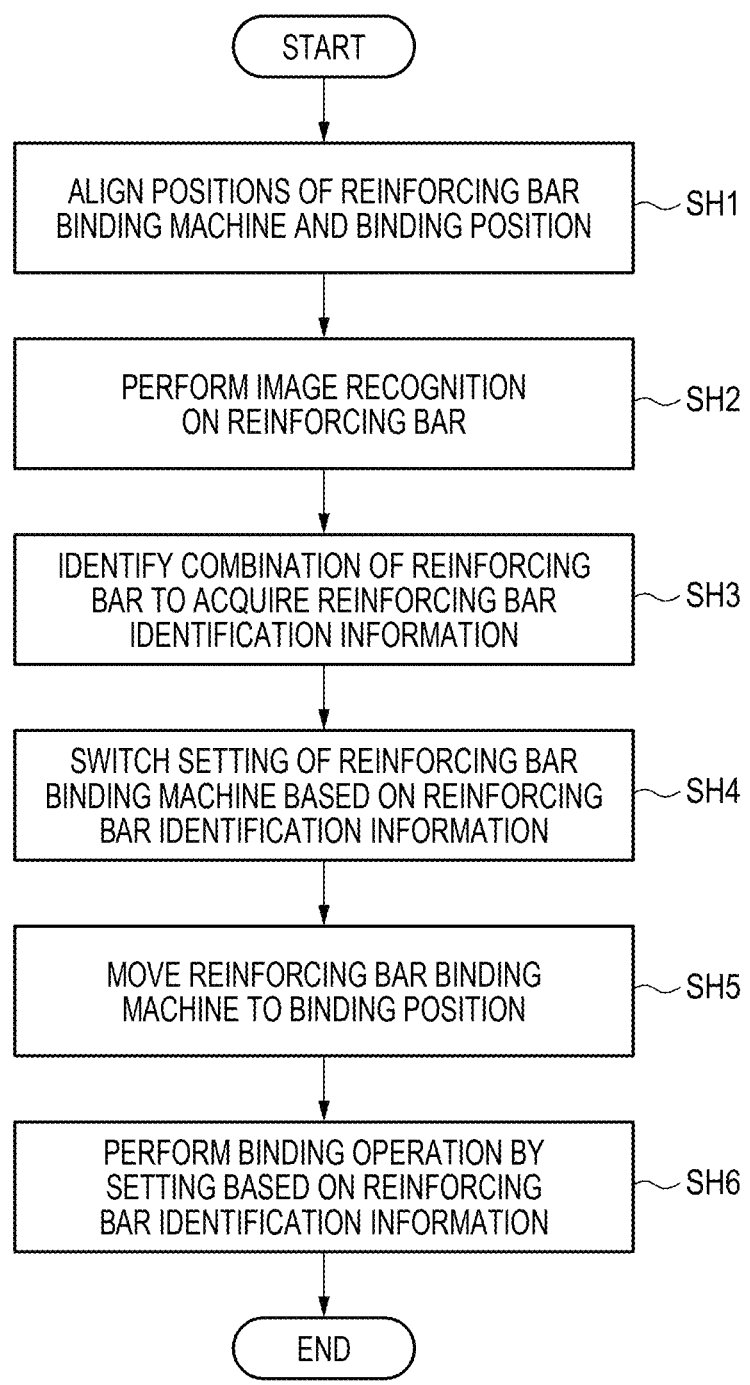
FIG. 17 is a flowchart illustrating an example of an operation based on reinforcing bar identification information acquired by image recognition of reinforcing bars.

Example of Operation Based on Reinforcing Bar Identification Information Acquired by Image Recognition of Reinforcing Bar FIG. 17 is a flowchart illustrating an example of the operation based on the reinforcing bar identification information acquired by the image recognition of the reinforcing bar, and next, the operation of acquiring the reinforcing bar identification information such as the diameter of the reinforcing bar S as the binding related information based on the image recognition of the binding position P10 of the reinforcing bar S and performing binding will be described with reference to the drawings.

In the binding equipment 100A, in step SH1 of FIG. 17, the information processing device 110a illustrated in FIGS. 4A, 4B, 4C, and 4D controls the transfer robot 200A according to the predetermined program to move the reinforcing bar binding machine 1A to a next binding position P10 by the operation of the transfer robot 200A. The binding equipment 100B moves the reinforcing bar S to align the binding position P10 with the position of the reinforcing bar binding machine 1A. The following operation will be described with respect to the binding equipment 100A, and the same applies to the binding equipment 100B. When the reinforcing bar binding machine 1A moves to a position where the next binding position P10 falls within the image capturing range of the camera 121, the control unit 14 of the reinforcing bar binding machine 1A controls the camera 121 to capture the next binding position P10, and acquires binding position image information before binding necessary for identifying the reinforcing bars S to be bound as the reinforcing bar identification information which is an example of the binding related information. The next binding position P10 may be captured from a plurality of directions by changing the orientation of the reinforcing bar binding machine 1A or the like.

The control unit 14 of the reinforcing bar binding machine 1A notifies the information processing device 110b illustrated in FIGS. 4A, 4B, and 4C and the information processing device 110a illustrated in FIG. 4D of the binding position image information before performing the binding operation acquired by capturing the next binding position P10 by the camera 121 through the information communication unit 102. In the information processing device 110b illustrated in FIG. 4C, the binding position image information before binding notified from the reinforcing bar binding machine 1A is notified to the information processing device 110a. In the information processing device 110a illustrated in FIGS. 4A and 4B, the binding position image information notified to the information processing device 110b may be input by a human operation.

Figure 18A:
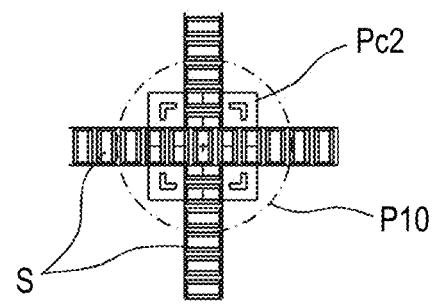
FIG. 18A is an explanatory view illustrating an example of binding position image information before binding.
Figure 18B:
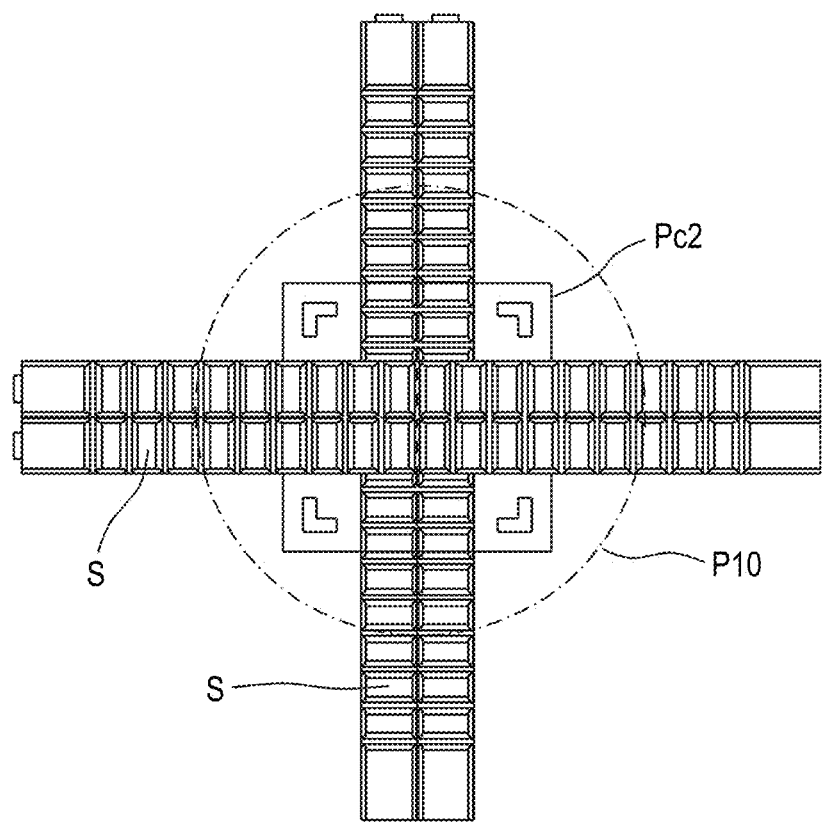
FIG. 18B is an explanatory view illustrating an example of the binding position image information before binding.

FIGS. 18A and 18B are explanatory views illustrating an example of the binding position image information before binding. The information processing device 110a illustrated in FIGS. 4A, 4B, 4C, and 4D performs image recognition on the binding position image information Pc2 before binding in step SH2 of FIG. 17, and identifies the combination of the reinforcing bars S intersecting at the binding position P10 by obtaining the diameter of the reinforcing bars S or the like in step SH3 of FIG. 17 to acquire the reinforcing bar identification information. Incidentally, the information processing device 110a may generate a 3D image by synthesizing the binding position image information of a 2D image acquired by capturing the binding position P10 from a plurality of directions, and identify the combination of the reinforcing bars S intersecting at the binding position P10 based on the 2D image and the 3D image.

Based on the reinforcing bar identification information for identifying the diameter, the combination, and the like of the reinforcing bars S, the information processing device 110a sets the feed amount and a feed speed of the wire W in the above-described binding operation, for example, a feed amount and a feed speed in the reverse direction for winding the wire W around the reinforcing bars S, a rotation speed and a rotation amount of the locking member 70 when the wire W is twisted, and the like, notifies the reinforcing bar binding machine 1A of setting information based on the combination of the reinforcing bars S and the like, and switches, in step SH4 of FIG. 17, each setting in the binding operation to a setting suitable for the diameter or the combination of the reinforcing bars S. Then, in step SH5 of FIG. 17, the reinforcing bar binding machine 1A is moved in a direction approaching the binding position P10 by the operations of the transfer robots 200A and 200B, the reinforcing bars S are inserted between the curl guide 50 and the leading guide 51 of the curl forming unit 5, and the reinforcing bar binding machine 1A is moved to the binding position P10.

When the reinforcing bars S are inserted between the curl guide 50 and the leading guide 51 of the curl forming unit 5, the information processing device 110a controls the operation of the reinforcing bar binding machine 1A, and performs the above-described binding operation based on the setting of a feed amount, a twisting amount, and the like of a wire W suitable for the diameter and the combination of the reinforcing bars S in step SH6 of FIG. 17.

For example, in the above-described binding operation, the feed motor 31 is rotated in the reverse direction to feed the wire W in the reverse direction, and in the operation of wrapping the wire W around the reinforcing bars S, when the diameter of the reinforcing bars S is small, it is necessary to increase the feed amount of the wire W in the reverse direction as compared with a case where the diameter of the reinforcing bars S is large. Therefore, a magnitude of the rotation amount of the feed motor 31 in the operation of feeding the wire W in the reverse direction is set based on the reinforcing bar identification information.

In addition, in the above-described binding operation, in the operation of rotating the motor 80 to twist the wire W, when the diameter of the reinforcing bars S is small, it is necessary to increase the twisting amount of the wire W as compared with the case where the diameter of the reinforcing bars S is large. Therefore, the magnitude of the rotation amount of the motor 80 in the operation of twisting the wire W is set based on the reinforcing bar identification information.

Incidentally, reinforcing bar identification information indicating an appropriate combination of reinforcing bars S or the like is acquired in advance, and when it is determined that the reinforcing bar identification information acquired based on the binding position image information before binding or the like is a combination of reinforcing bars S which is not suitable for the binding or the like, the binding availability information for prohibiting the binding operation may be reported, or the reinforcing bar binding machine 1A and the transfer robots 200A and 200B may be controlled based on the binding availability information for prohibiting the binding operation.

Figure 19:
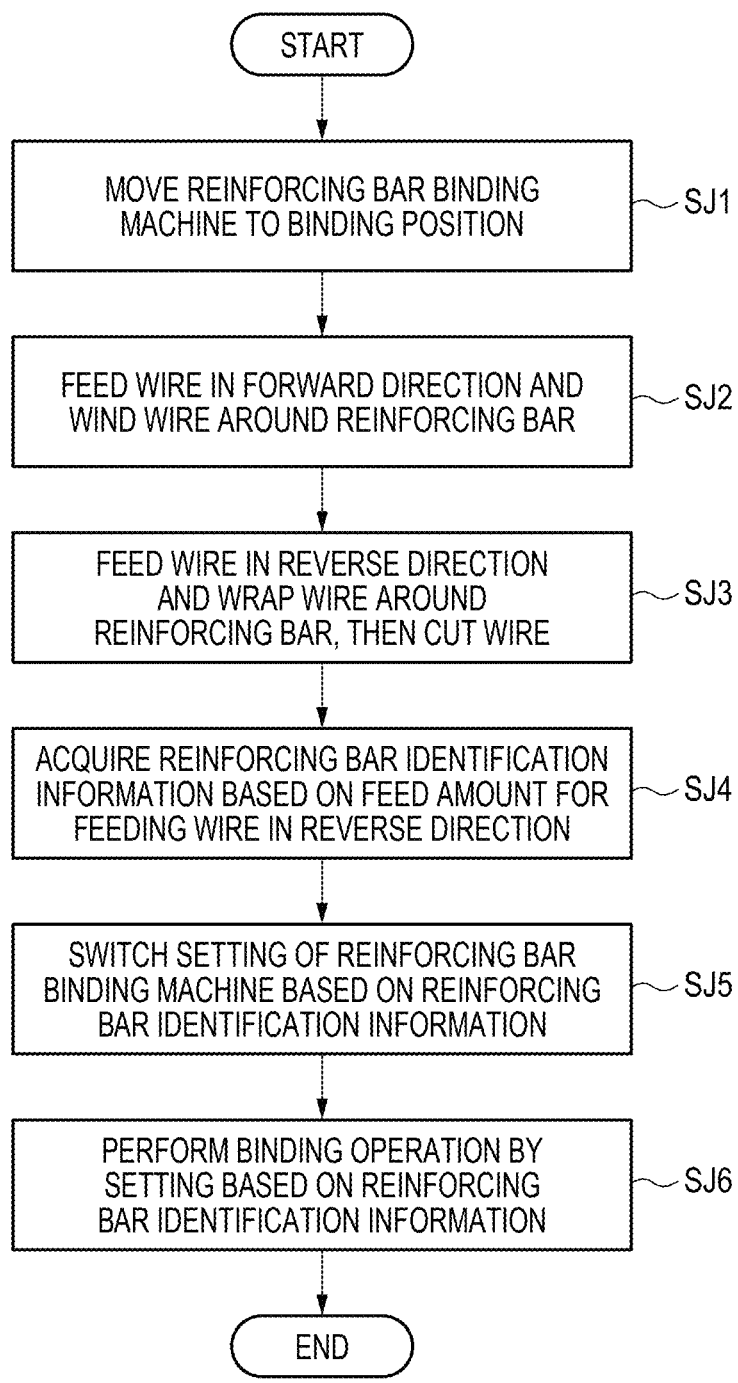
FIG. 19 is a flowchart illustrating an example of an operation based on the reinforcing bar identification information acquired based on a feed amount of a wire.

Example of Operation Based on Reinforcing Bar Identification Information Acquired by Feed Amount of Wire FIG. 19 is a flowchart illustrating an example of the operation based on the reinforcing bar identification information acquired by the feed amount of the wire, and next, the operation of acquiring the reinforcing bar identification information such as the diameter of the reinforcing bar S based on the feed amount of the wire W in the operation of winding the wire W around the reinforcing bar S and binding the reinforcing bar S will be described with reference to the drawings.

The information processing device 110a illustrated in FIGS. 4A, 4B, 4C, and 4D controls the transfer robot 200A to move the reinforcing bar binding machine 1A to the predetermined binding position P10 by the operation of the transfer robot 200A in step SJ1 of FIG. 19, move the reinforcing bar binding machine 1A in a direction approaching the binding position P10, insert the reinforcing bar S between the curl guide 50 and the leading guide 51 of the curl forming unit 5, and move the reinforcing bar binding machine 1A to the binding position P10. The binding equipment 100B illustrated in FIG. 1C and the like moves the reinforcing bar S to align the binding position P10 with the position of the reinforcing bar binding machine 1A. The following operation will be described with respect to the binding equipment 100A, and the same applies to the binding equipment 100B.

When the reinforcing bars S are inserted between the curl guide 50 and the leading guide 51 of the curl forming unit 5, the information processing device 110a controls the operation of the reinforcing bar binding machine 1A, and performs the above-described binding operation. In the operation of binding the reinforcing bars S, in step SJ2 of FIG. 19, the reinforcing bar binding machine 1A winds the wire W around the reinforcing bars S by rotating the feed motor 31 in the forward direction to feed the wire W in the forward direction, and in step SJ3 of FIG. 19, the reinforcing bar binding machine 1A rotates the feed motor 31 in the reverse direction to feed the wire W in the reverse direction and wraps the wire W around the reinforcing bars S, and cuts the wire W.

In the operation of rotating the feed motor 31 in the reverse direction to feed the wire W in the reverse direction and wrapping the wire W around the reinforcing bars S, the reinforcing bar binding machine 1A acquires the rotation amount from the start to the stop of the rotation of the feed motor 31. The rotation amount from the start to the stop of rotating the feed motor 31 in the reverse direction changes in accordance with the diameter of the reinforcing bar S.

Therefore, the reinforcing bar binding machine 1A notifies the information processing device 110a of the rotation amount from the start to the stop of rotating the feed motor 31 in the reverse direction. The information processing device 110a constitutes the information acquisition means, and in step SJ4 of FIG. 19, circumferential lengths of combined (two) reinforcing bars S are obtained based on the rotation amount, and the reinforcing bar identification information for identifying the combination of the reinforcing bars S intersecting at the binding position P10 is acquired. Incidentally, the information acquisition means may constitute of the control unit 14, and the control unit 14 may obtain the circumferential lengths of the combined reinforcing bars S based on the rotation amount, acquire the reinforcing bar identification information for identifying the combination of the reinforcing bars S intersecting at the binding position P10, and notify the information processing device 110a of the reinforcing bar identification information. In addition, the information processing device 110a may report the reinforcing bar identification information. Further, the information processing device 110a illustrated in FIG. 4C may notify the information processing device 110b of the reinforcing bar identification information, and the information processing device 110b may report the reinforcing bar identification information. In addition, the diameter of the reinforcing bars S may be referred to based on the circumferential lengths of the combined reinforcing bars S.

When the rotation amount of the feed motor 31 (feed amount of the wire W in the reverse direction) corresponding to the circumferential lengths of the combined reinforcing bars S is set to "10", for example, before "8" in the middle is reached, the feed motor 31 is rotated at a first speed (higher than a second speed) to feed the wire W in the reverse direction until the rotation amount, and for the remained "2", the feed motor 31 is rotated at a second speed lower than the first speed to feed the wire W in the reverse direction to wrap the wire W around the reinforcing bars S. Accordingly, a time required for the operation of wrapping the wire W around the reinforcing bars S in a series of binding operations is shortened, and a binding time can be shortened. In addition, by reducing the speed before stopping rotating the feed motor 31 in the reverse direction, even when the feeding gear 30 is slightly rotated after the wire W is wrapped around the reinforcing bars S and the wire W cannot be fed, an influence due to a friction of the feeding gear 30 with the wire W can be reduced.

The information processing device 110a sets the rotation speed, the rotation amount, and the like of the locking member 70 when the wire W is twisted in the above-described binding operation based on the reinforcing bar identification information acquired based on the rotation amount of the feed motor 31, and notifies the reinforcing bar binding machine 1A of setting information based on the combination of the reinforcing bars S.

In step SJ5 of FIG. 19, the reinforcing bar binding machine 1A switches each setting in the binding operation to a setting suitable for the diameter and the combination of the reinforcing bars S. Then, in step SJ6 of FIG. 19, the above-described binding operation is performed based on the setting of the twisting amount, a twisting speed, and the like of the wire W suitable for the diameter and the combination of the reinforcing bars S.

Figure 20:
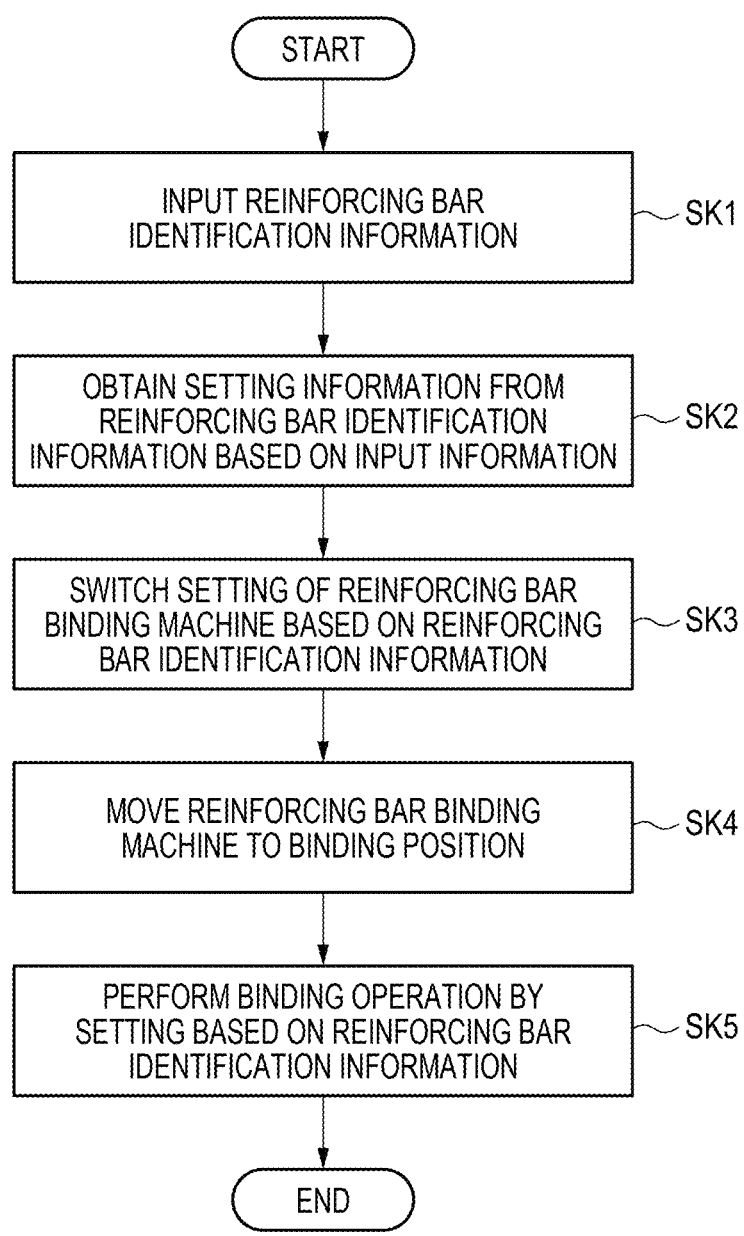
FIG. 20 is a flowchart illustrating an example of an operation based on the reinforcing bar identification information acquired based on input information.

Example of Operation Based on Reinforcing Bar Identification Information Acquired from Input Information FIG. 20 is a flowchart illustrating an example of an operation based on the reinforcing bar identification information acquired from the input information, and next, the operation of acquiring the reinforcing bar identification information such as the diameter of the reinforcing bars S based on the input information and performing binding will be described with reference to the drawings.

The information acquisition means constitutes of the information processing device 110a illustrated in FIGS. 4A, 4B, 4C, and 4D, and in step SK1 of FIG. 20, the information processing device 110a inputs and stores reinforcing bar identification information such as the diameter of the reinforcing bars S, the arrangement of the reinforcing bars S, the combination of intersecting reinforcing bars S, and the position of each binding position P10 by operations of an input unit such as a keyboard of the information processing device 110a. The information acquisition means constitutes of the information processing device 110b illustrated in FIGS. 4C, and in step SK1 of FIG. 20, the information processing device 110b inputs and stores reinforcing bar identification information such as the diameter of the reinforcing bars S, the arrangement of the reinforcing bars S, the combination of intersecting reinforcing bars S, and the position of each binding position P10 by operations of an input unit such as a keyboard of the information processing device 110b. Then, the reinforcing bar identification information input and stored by the information processing device 110b is notified to the information processing device 110a, and is stored in the information processing device 110a.

Figure 21A:
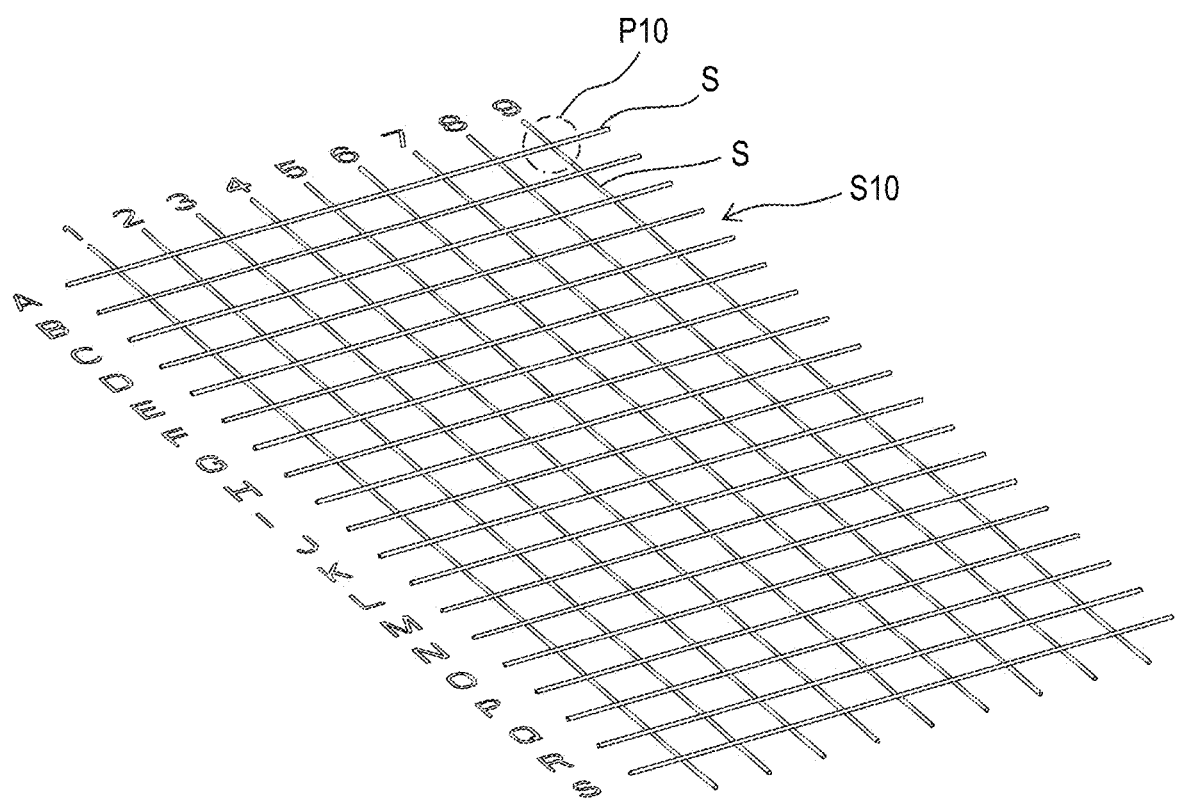
FIG. 21A is an explanatory view illustrating an arrangement example of the reinforcing bars.
Figure 21B:
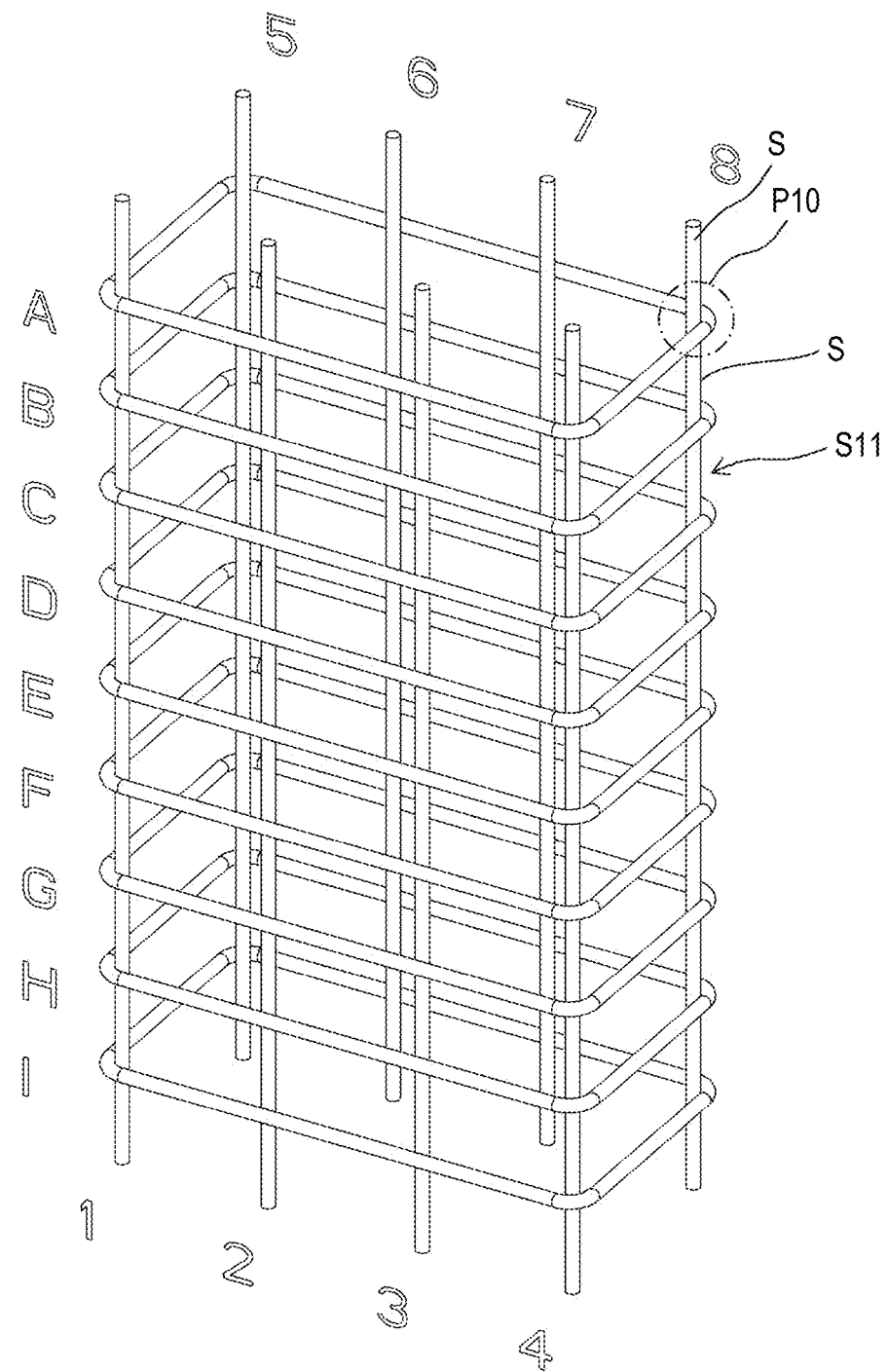
FIG. 21B is an explanatory view illustrating an arrangement example of the reinforcing bars.

FIGS. 21A and 21B are explanatory views illustrating arrangement examples of the reinforcing bars. In a structure S10 in which the reinforcing bars S are arranged in a planar manner as illustrated in FIG. 21A and a structure S11 in which the reinforcing bars S are three-dimensionally arranged as illustrated in FIG. 21B, binding performances required at respective binding positions P10 may be different. In addition, in the same structures (S10 and S11), the required binding performances may also be different depending on the position of the binding position P10.

Therefore, in step SK2 of FIG. 20, based on the input and stored reinforcing bar identification information, the information processing device 110a sets, in accordance with the position of the binding position P10, the feed amount and the feed speed of the wire W in the above-described binding operation, for example, the feed amount and the feed speed in the reverse direction for winding the wire W around the reinforcing bars S, the rotation speed and the rotation amount of the locking member 70 when the wire W is twisted, and the like, and notifies the reinforcing bar binding machine 1A of the setting information based on the combination of the reinforcing bars S, the position of the binding position P10, and the like. In addition, the information processing device 110a sets a position of the binding position P10 to which the reinforcing bar binding machine 1A is to be moved, an order of moving the reinforcing bar binding machine 1A to the binding position P10, and the like based on the input and stored reinforcing bar identification information, and notifies the transfer robot 200A of the setting information.

In step SK3 of FIG. 20, the reinforcing bar binding machine 1A switches each setting in the binding operation to a setting suitable for the reinforcing bar identification information.

On the basis of the setting information based on the reinforcing bar identification information, the information processing device 110a controls the transfer robot 200A to move the reinforcing bar binding machine 1A to the predetermined binding position P10 by the operation of the transfer robot 200A in step SK4 of FIG. 20, move the reinforcing bar binding machine 1A in a direction approaching the binding position P10, insert the reinforcing bar S between the curl guide 50 and the leading guide 51 of the curl forming unit 5, and move the reinforcing bar binding machine 1A to the binding position P10.

When the reinforcing bars S are inserted between the curl guide 50 and the leading guide 51 of the curl forming unit 5, the information processing device 110a controls the operation of the reinforcing bar binding machine 1A based on the setting information corresponding to the binding position P10.

In the reinforcing bar binding machine 1A, in step SK5 of FIG. 20, the control unit 14 controls the motor 80 and the feed motor 31 based on the setting information switched based on the reinforcing bar identification information, and performs a series of operations of binding the reinforcing bars S with the wire W.

The information acquisition unit that acquires the reinforcing bar identification information for identifying the reinforcing bars S is not limited to the camera, and may be a sensor or the like capable of recognizing a size of an object.

Figure 22:
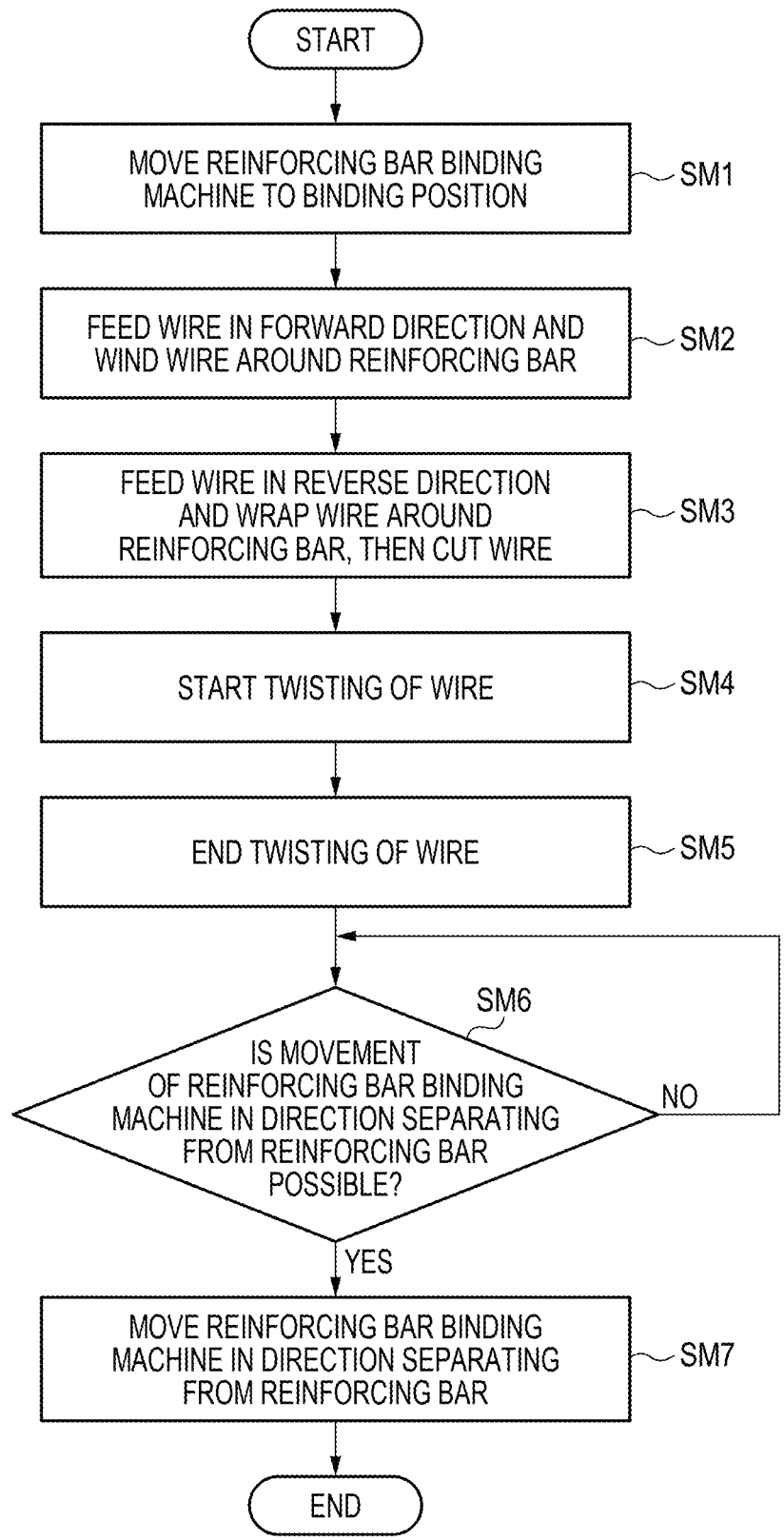
FIG. 22 is a flowchart illustrating an example of an operation of determining a timing of removing the reinforcing bars from the reinforcing bar binding machine in a final stage of a binding operation.

Example of Operation of Determining Timing of Removing Reinforcing Bar from Reinforcing Bar Binding Machine in Final Stage of Binding Operation FIG. 22 is a flowchart illustrating an example of an operation of determining a timing of removing the reinforcing bar from the reinforcing bar binding machine in a final stage of the binding operation, and next, as the operation of moving the reinforcing bar binding machine 1A in the direction separating from the binding position P10, the operation of removing the reinforcing bar S from between the curl guide 50 and the leading guide 51 of the curl forming unit 5 by a relative movement of the reinforcing bar binding machine 1A and the reinforcing bar S at a predetermined timing until driving of the motor 80 of the driving unit 8 that drives the binding unit 7 is stopped in the final stage of the binding operation will be described.

In the binding equipment 100A and 100B, when the reinforcing bar binding machine 1A starts the operation of binding the reinforcing bars S with the wire W, the timing of moving the reinforcing bar binding machine 1A and the binding position P10 in the direction of separating from each other is determined. Then, the transfer robots 200A and 200B move the reinforcing bar binding machine 1A and the binding position P10 in the direction of separating from each other by the relative movement of the reinforcing bar binding machine 1A and the reinforcing bar S in accordance with the determined timing.

In the following operation example, as presence or absence of locking of the wire W by the locking member 70, the timing of moving the reinforcing bar binding machine 1A and the binding position P10 in the direction of separating from each other is determined based on the determination as to whether the locking of the wire W by the locking member 70 is released in the final stage of the binding operation.

The information processing device 110a illustrated in FIGS. 4A, 4B, 4C, and 4D controls the transfer robot 200A to move the reinforcing bar binding machine 1A to the predetermined binding position P10 by the operation of the transfer robot 200A in step SM1 of FIG. 22, move the reinforcing bar binding machine 1A in a direction approaching the binding position P10, insert the reinforcing bar S between the curl guide 50 and the leading guide 51 of the curl forming unit 5, and move the reinforcing bar binding machine 1A to the binding position P10. In the binding equipment 100B illustrated in FIG. 1C, the reinforcing bars S are moved to align the binding position P10 with the position of the reinforcing bar binding machine 1A, the reinforcing bar binding machine 1A is moved in a direction approaching the binding position P10 by the operation of the transfer robot 200B, the reinforcing bars S are inserted between the curl guide 50 and the leading guide 51 of the curl forming unit 5, and the reinforcing bar binding machine 1A is moved to the binding position P10.

When the reinforcing bars S are inserted between the curl guide 50 and the leading guide 51 of the curl forming unit 5, the information processing device 110a controls the operation of the reinforcing bar binding machine 1A, and performs the above-described binding operation. In the reinforcing bar binding machine 1A, in the operation of binding the reinforcing bars S, the control unit 14 winds the wire W around the reinforcing bars S by rotating the feed motor 31 in the forward direction to feed the wire W in the forward direction in step SM2 of FIG. 22.

When the wire W is wound around the reinforcing bars S, the control unit 14 stops the rotation of the feed motor 31, and rotates the motor 80 in the forward direction by a predetermined amount to move the first side hook 70R and the second side hook 70L in a direction approaching the center hook 70C. When the wire W wrapped around the reinforcing bar S is locked by the locking member 70, the control unit 14 stops the rotation of the motor 80, and in step SM3 of FIG. 22, the feed motor 31 is rotated in the reverse direction to feed the wire W in the reverse direction and wraps the wire W around the reinforcing bar S, and cuts the wire W. When the wire W is cut, the control unit 14 rotates the motor 80 in the forward direction to twist the wire W locked by the locking member 70 in step SM4 of FIG. 22.

As described above, the control unit 14 of the reinforcing bar binding machine 1A moves the first side hook 70R and the second side hook 70L in the direction approaching the center hook 70C, locks the wire W wrapped around the reinforcing bars S with the locking member 70, and in step SM4 of FIG. 22, determines the timing of moving the reinforcing bar binding machine 1A in the direction separating from the binding position P10 from the start of the operation of twisting the wire W until the operation of binding the reinforcing bars S with the wire W ends and the driving of the motor 80 of the driving unit 8 that drives the binding unit 7 is stopped.

For example, the timing of moving the reinforcing bar binding machine 1A in the direction separating from the binding position P10 is determined based on either the rotation amount of the motor 80, which is an operation amount of the driving unit 8, or the load applied to the motor 80, which is the load applied to the driving unit 8, or both the rotation amount of the motor 80 and the load applied to the motor 80. In addition, by providing a sensor as a detection means that detects a position and a state of the locking member 70, the timing of moving the reinforcing bar binding machine 1A in the direction separating from the binding position P10 is determined based on the position, the state, and the like of the locking member 70 and the sleeve 71.

As described above, when the wire W is twisted by a predetermined amount according to, for example, a detection that the load applied to the motor 80 is maximized by rotating the locking member 70 to twist the wire W, the normal rotation of the motor 80 is stopped, the operation of twisting the wire W is ended in step SM5 of FIG. 22, and then the motor 80 is driven in the reverse rotation direction.

When the motor 80 is driven in the reverse rotation direction, the first side hook 70R moves in a direction separating from the center hook 70C, and the second side hook 70L moves in a direction separating from the center hook 70C, the sleeve 71 returns to an initial position, and the wire W that binds the reinforcing bars S can be pulled out from the locking member 70 before the reverse rotation of the motor 80 is stopped.

When the wire W that binds the reinforcing bars S enters a state in which the wire W can be pulled out from the locking member 70, the sleeve 71 returns to the initial position, and the reinforcing bar binding machine 1A can be moved in the direction separating from the binding position P10 before the reverse rotation of the motor 80 is stopped.

Therefore, the control unit 14 detects that the first side hook 70R moves by a predetermined amount in the direction separating from the center hook 70C and the second side hook 70L moves by a predetermined amount in the direction separating from the center hook 70C based on, for example, the rotation amount of the motor 80 or opening and closing states of the first side hook 70R and the second side hook 70L acquired by a sensor (not illustrated), until the wire W that binds the reinforcing bars S enters the state in which the wire W can be pulled out from the locking member 70.

Then, it is determined whether the locking of the wire W by the locking member 70 is released based on the rotation amount of the motor 80 from the start of the rotation of the motor 80 in the reverse rotation direction, and when it is determined in step SM6 of FIG. 22 that it is the timing to move the reinforcing bar binding machine 1A in the direction separating from the binding position P10 based on the presence or absence of the locking of the wire W by the locking member 70, movement permission information is notified.

When the movement permission information is notified from the reinforcing bar binding machine 1A, in step SM7 of FIG. 22, the information processing device 110*a* controls the transfer robot 200A to move the reinforcing bar binding machine 1A in a direction separating from the binding position P10 and further moves the reinforcing bar binding machine 1A to the next binding position. In the binding equipment 100B illustrated in FIG. 1C, the transfer robot 200B is controlled to move the reinforcing bar binding machine 1A in the direction separating from the binding position P10, and further move the reinforcing bar S such that the reinforcing bar binding machine 1A is positioned at the next binding position.

Accordingly, since the reinforcing bar binding machine 1A can start moving in the direction separating from the binding position P10 before the operation of binding the reinforcing bars S with the wire W is ended and the driving of the motor 80 that drives the locking member 70 is stopped, a processing time can be shortened when the binding operation is continuously performed at the plurality of binding positions P10.

Figure 23:
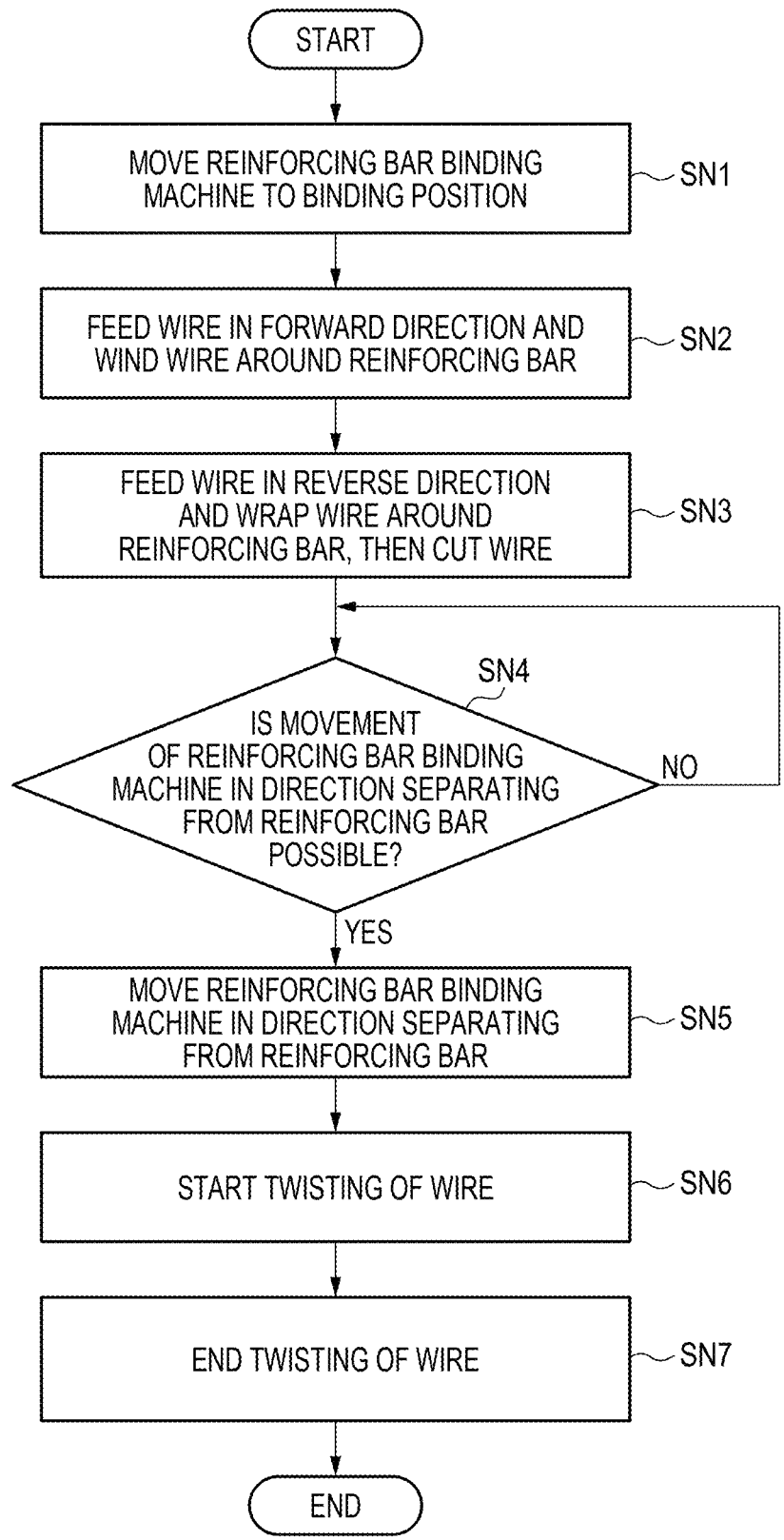
FIG. 23 is a flowchart illustrating an example of an operation of removing slack of the wire by moving the reinforcing bar binding machine in a direction separating from the reinforcing bars.

Example of Operation of Removing Slack of Wire by Moving Reinforcing Bar Binding Machine in Direction Separating from Reinforcing Bar FIG. 23 is a flowchart illustrating an example of an operation of removing slack of the wire by moving the reinforcing bar binding machine in a direction separating from the reinforcing bar. As the operation of moving the reinforcing bar binding machine 1A in the direction separating from the binding position P10, an operation of removing the slack of the wire by the relative movement of the reinforcing bar binding machine 1A and the reinforcing bar S in an initial stage of the binding operation will be described.

In the following operation example, as the presence or absence of locking of the wire W by the locking member 70, the timing of moving the reinforcing bar binding machine 1A and the binding position P10 in the direction of separating from each other is determined based on the determination as to whether the wire W is locked by the locking member 70 in the initial stage of the binding operation.

The information processing device 110*a* illustrated in FIGS. 4A, 4B, 4C, and 4D controls the transfer robot 200A to move the reinforcing bar binding machine 1A to the predetermined binding position P10 by the operation of the transfer robot 200A in step SN1 of FIG. 23, move the reinforcing bar binding machine 1A in a direction approaching the binding position P10, insert the reinforcing bar S between the curl guide 50 and the leading guide 51 of the curl forming unit 5, and move the reinforcing bar binding machine 1A to the binding position P10. In the binding equipment 100B illustrated in FIG. 1C, the reinforcing bars S are moved to align the binding position P10 with the position of the reinforcing bar binding machine 1A, the reinforcing bar binding machine 1A is moved in a direction approaching the binding position P10 by the operation of the transfer robot 200B, the reinforcing bars S are inserted between the curl guide 50 and the leading guide 51 of the curl forming unit 5, and the reinforcing bar binding machine 1A is moved to the binding position P10.

When the reinforcing bars S are inserted between the curl guide 50 and the leading guide 51 of the curl forming unit 5, the information processing device 110*a* controls the operation of the reinforcing bar binding machine 1A, and performs the above-described binding operation. In the reinforcing bar binding machine 1A, in the operation of binding the reinforcing bars S, the control unit 14 winds the wire W around the reinforcing bars S by rotating the feed motor 31 in the forward direction to feed the wire W in the forward direction in step SN2 of FIG. 23.

When the wire W is wound around the reinforcing bars S, the control unit 14 stops the rotation of the feed motor 31, and rotates the motor 80 in the forward direction by a predetermined amount to move the first side hook 70R and the second side hook 70L in a direction approaching the center hook 70C. When the wire W wrapped around the reinforcing bar S is locked by the locking member 70, the control unit 14 stops the rotation of the motor 80, and in step SN3 of FIG. 23, the feed motor 31 is rotated in the reverse direction to feed the wire W in the reverse direction and wraps the wire W around the reinforcing bar S, and cuts the wire W.

When the wire W wrapped around the reinforcing bars S and locked by the locking member 70 is pulled in the direction separating from the reinforcing bars S, the slack before the wire W is twisted is removed. Further, when the wire W wrapped around the reinforcing bars S and locked by the locking member 70 is twisted while applying a pulling force in the direction separating from the reinforcing bars S, the wire W is twisted such that a gap is not generated between the wire W and the reinforcing bars S.

Therefore, in step SN4 of FIG. 23, the control unit 14 detects that a predetermined timing is reached after the wire W is locked by the locking member 70 based on, for example, the rotation amount of the motor 80, and notifies the movement permission information when it is determined that it is the timing to move the reinforcing bar binding machine 1A in the direction separating from the binding position P10.

When the movement permission information is notified from the reinforcing bar binding machine 1A, the information processing device 110*a* controls the transfer robots 200A and 200B to move the reinforcing bar binding machine 1A in the direction separating from the reinforcing bar S by a predetermined amount in step SN5 of FIG. 23.

When the reinforcing bar binding machine 1A is moved by a predetermined amount in the direction separating from the reinforcing bar S, in step SN6 of FIG. 23, the control unit 14 rotates the motor 80 in the forward direction to twist the wire W locked by the locking member 70. Then, when the wire W is twisted by a predetermined amount according to the detection that the load applied to the motor 80 is maximized by rotating the locking member 70 to twist the wire W, the normal rotation of the motor 80 is stopped in step SN7 of FIG. 23, and the operation of twisting the wire W is ended.

Accordingly, during a period from the start of the operation of binding the reinforcing bars S with the wire W to the end of the operation of binding the reinforcing bars S with the wire W, by moving the reinforcing bar binding machine 1A in the direction separating from the binding position P10A in the initial stage of the binding operation, the wire W wrapped around the reinforcing bars S and locked by the locking member 70 is pulled in the direction separating from the reinforcing bars S, and the slack before the wire W is twisted can be removed.

Figure 24A:
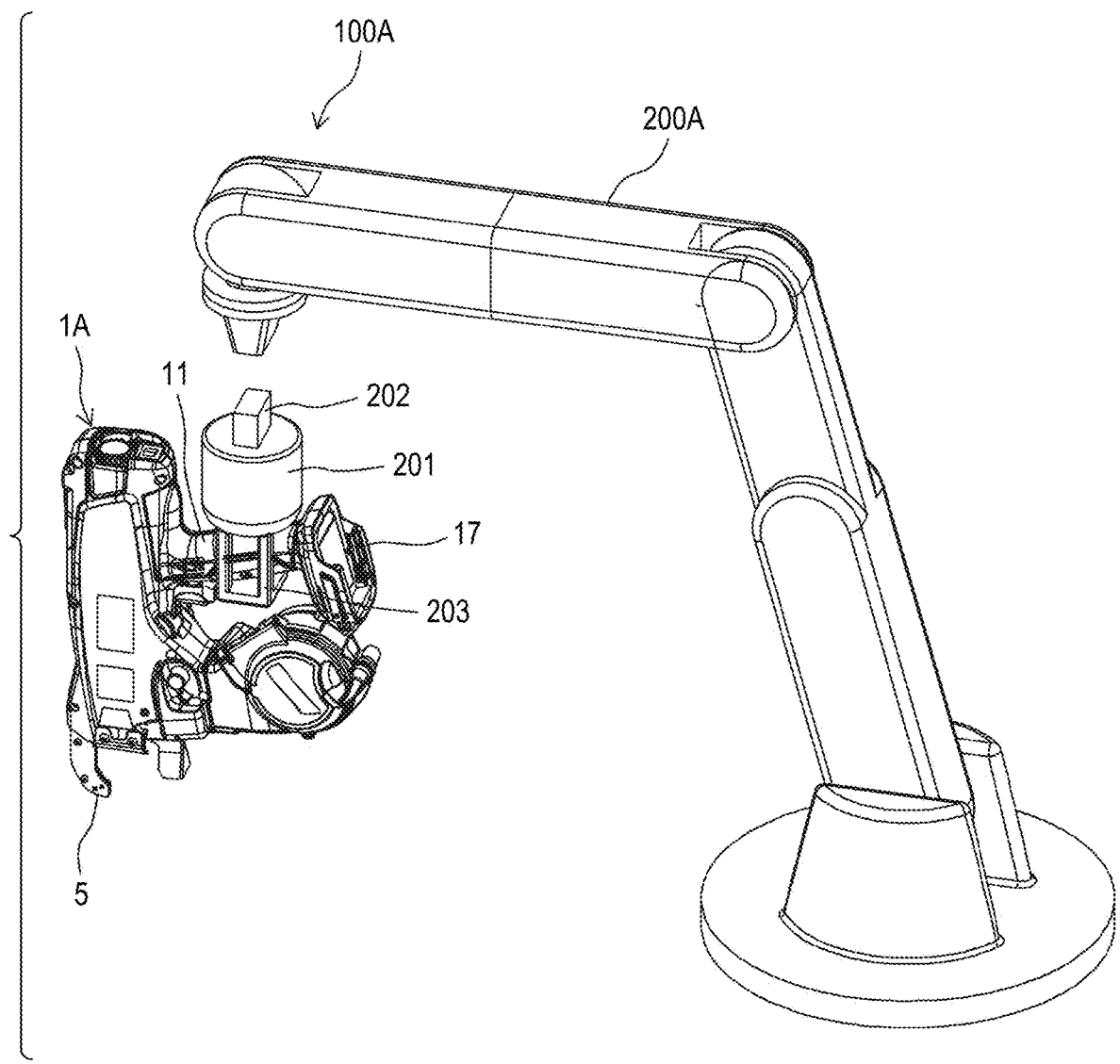
FIG. 24A is a perspective view illustrating an example of an attachment and detachment structure of the reinforcing bar binding machine.
Figure 24B:
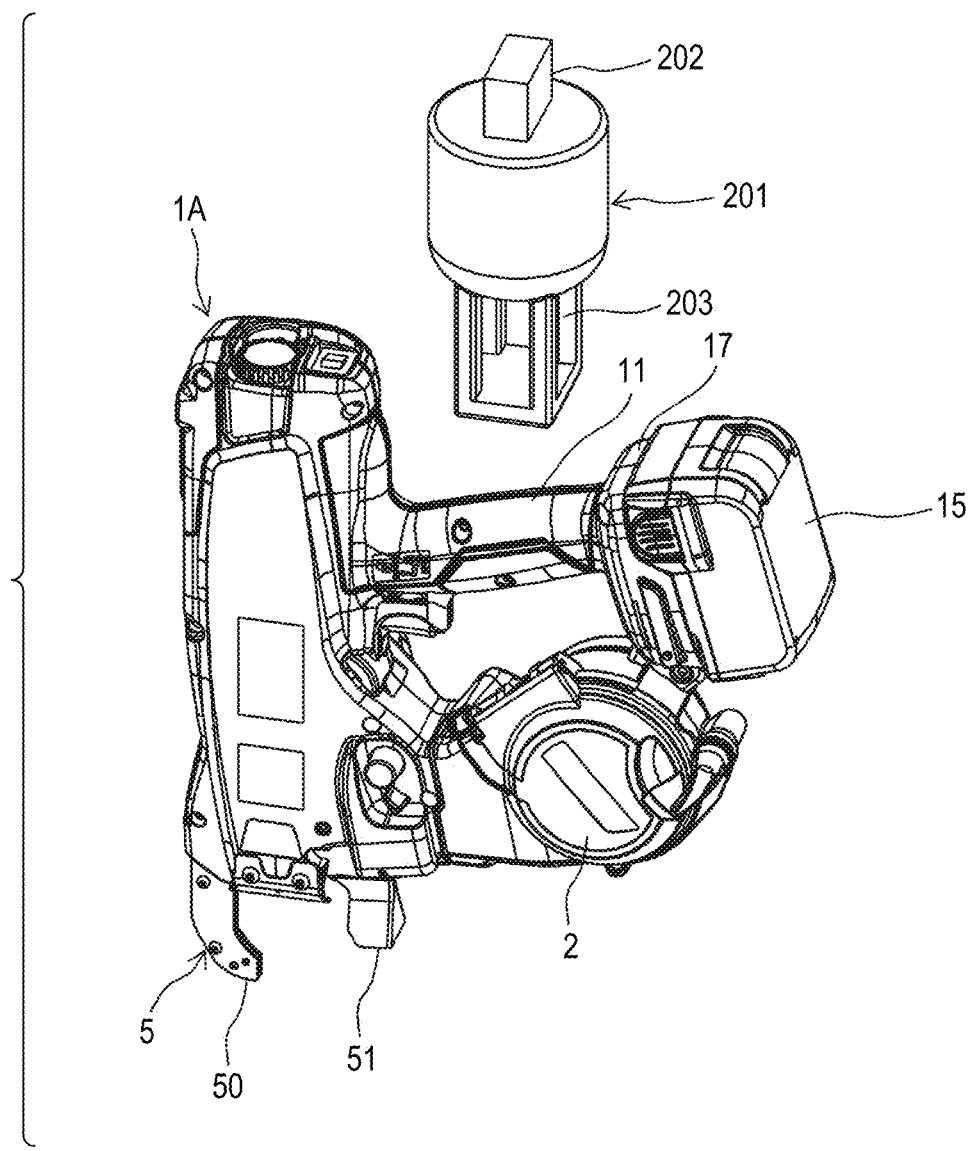
FIG. 24B is a perspective view illustrating an example of the attachment and detachment structure of the reinforcing bar binding machine.

Example of Attachment and Detachment Structure of Reinforcing Bar Binding Machine FIGS. 24A and 24B are perspective views illustrating an example of an attachment and detachment structure of the reinforcing bar binding machine. The binding equipment 100A includes an attachment and detachment unit 201 that attachably and detachably attaches the reinforcing bar binding machine 1A to the transfer robot 200A. As illustrated in FIG. 24A, the attachment and detachment unit 201 includes a connecting portion 202 that is attachably and detachably connected to the transfer robot 200A. As illustrated in FIG. 24B, the attachment and detachment unit 201 includes a holding portion 203 that attachably and detachably holds the handle portion 11 of the reinforcing bar binding machine 1A.

The reinforcing bar binding machine 1A is attached to the transfer robot 200A in a state in which the control by the information processing device 110a is possible when the handle portion 11 is held by the holding portion 203 of the attachment and detachment unit 201, the connecting portion 202 of the attachment and detachment unit 201 that holds the reinforcing bar binding machine 1A is connected to the transfer robot 200A, and a wiring (not illustrated) is connected. Incidentally, the reinforcing bar binding machine 1A may be wirelessly connected to the information processing device 110a or the like.

In addition, the reinforcing bar binding machine 1A can be used alone by detaching the attachment and detachment unit 201 from the transfer robot 200A as illustrated in FIG. 24A and detaching the handle portion 11 from the attachment and detachment unit 201 as illustrated in FIG. 24B.

Figure 25:
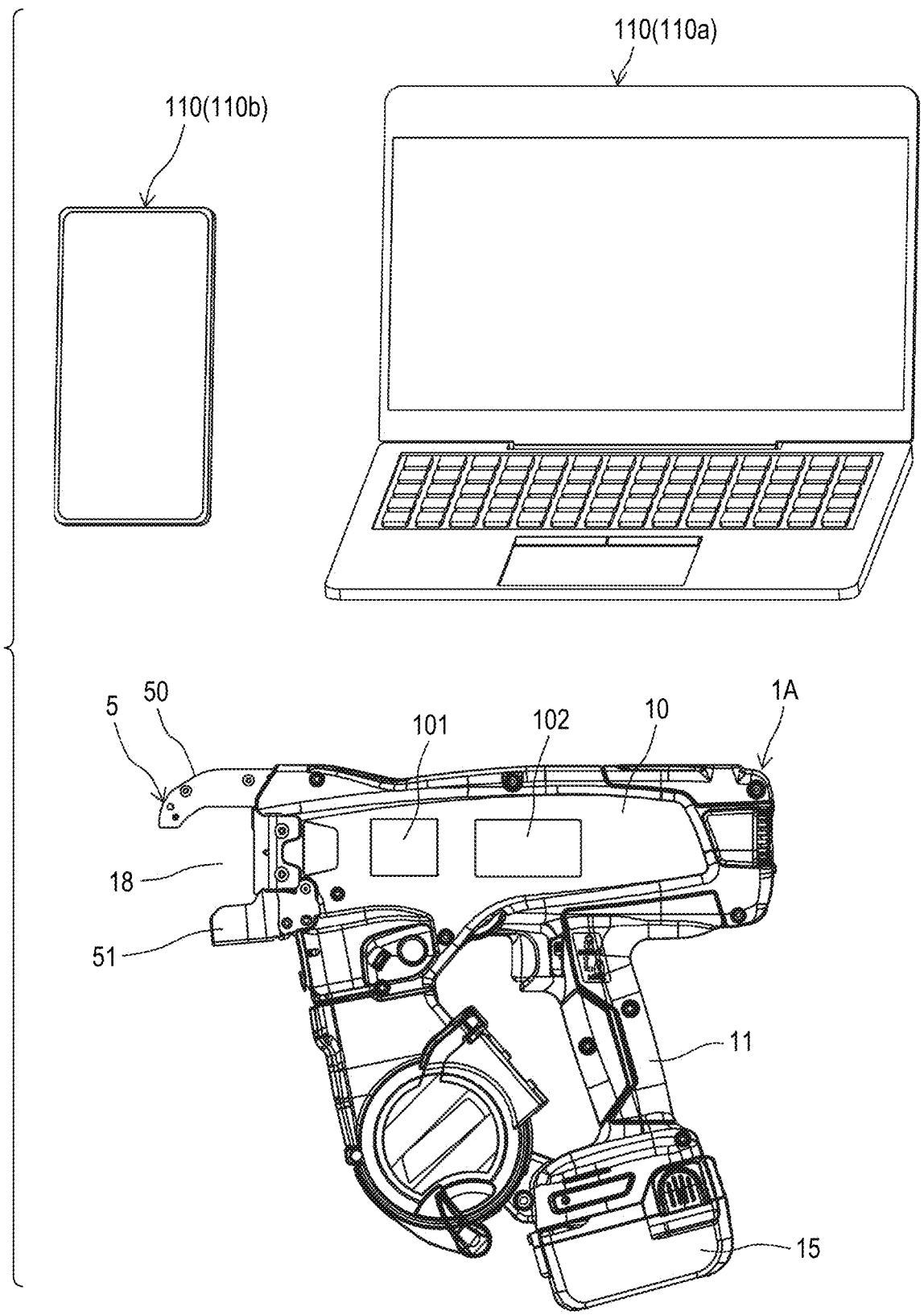
FIG. 25 is an explanatory view illustrating an example of a mode in which the reinforcing bar binding machine is used alone.

FIG. 25 is an explanatory view illustrating an example of a mode in which the reinforcing bar binding machine is used alone. When the reinforcing bar binding machine 1A is used alone, the battery 15 is attached to the battery attachment portion 17. Then, the above-described binding operation is performed by holding the handle portion 11 by hand and operating the trigger 12. Incidentally, since the magazine 2 is integrally provided in the reinforcing bar binding machine 1A, the operation of binding the reinforcing bars S with the wire W by the reinforcing bar binding machine 1A alone can be performed without receiving a supply of the wire W from the outside in a form of being held and used by hand.

Modification of Moving Machine

Figure 26A:
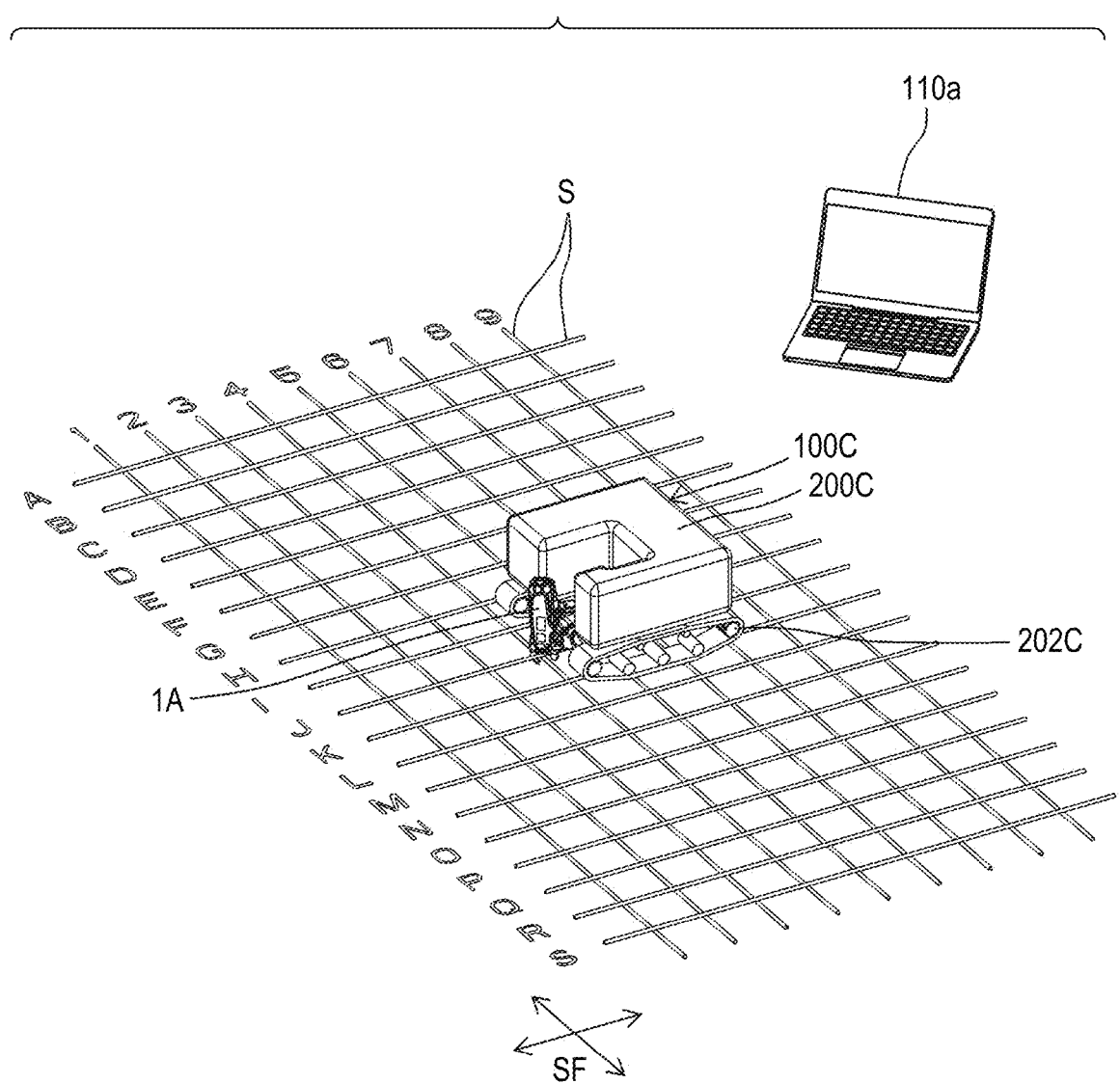
FIG. 26A is a perspective view of the binding equipment according to the present embodiment illustrating a modification of the transfer robot.
Figure 26B:
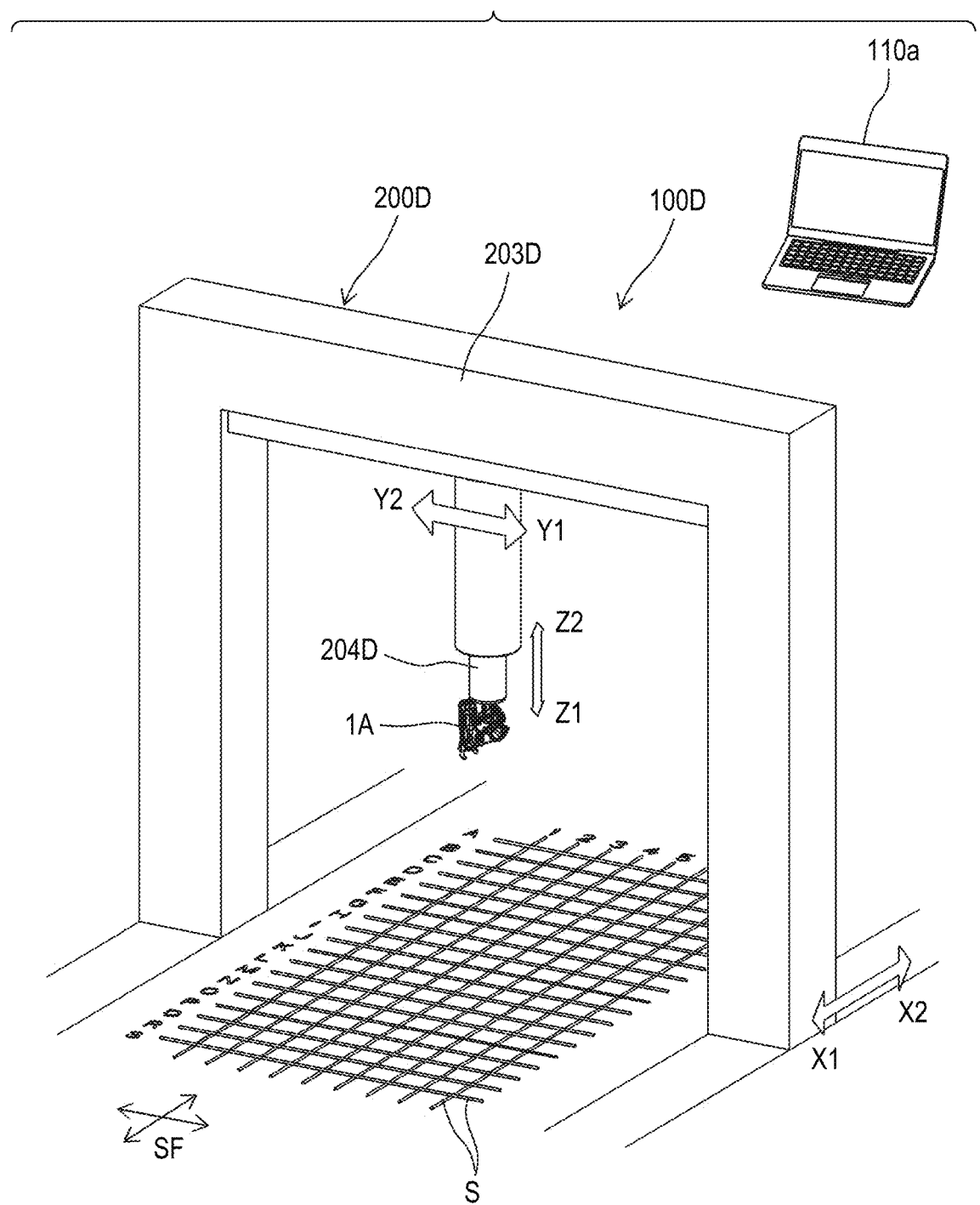
FIG. 26B is a perspective view of the binding equipment according to the present embodiment illustrating a modification of the transfer robot.

FIG. 26A is a perspective view of the binding device according to the present embodiment illustrating a modification of the transfer robot, and FIG. 26B is a perspective view of the binding equipment according to the present embodiment illustrating a modification of the transfer robot. The binding device 100C illustrated in FIG. 26A includes the reinforcing bar binding machine 1A and the transfer robot 200C that causes the reinforcing bar binding machine 1A to travel along the disposition plane SF of the reinforcing bars S. The transfer robot 200C is provided with endless tracks 202C that is driven by a motor (not illustrated) and runs on the reinforcing bars S. The transfer robot 200C moves along the extending direction of the reinforcing bars S by a rotation of the endless tracks 202C. In addition, by changing the number of rotations of left and right endless tracks 202C, a traveling direction of the transfer robot 200C is changed, and the transfer robot 200C moves along the extending direction of each of the reinforcing bars S arranged in a lattice pattern. Further, the transfer robot 200C includes an elevating machine (not illustrated) that moves the reinforcing bar binding machine 1A in a direction approaching the disposition plane SF of the reinforcing bars S and in a direction separating from the disposition plane SF.

Binding equipment 100D illustrated in FIG. 26B includes the reinforcing bar binding machine 1A and a transfer robot 200D in which the reinforcing bar binding machine 1A is suspended from a frame 203D. The transfer robot 200D is implemented such that the frame 203D is movable in directions of arrows X1 and X2 along one direction of the reinforcing bars S arranged in a lattice pattern, and the reinforcing bar binding machine 1A is movable in directions of arrows Y1 and Y2 along the other direction of the reinforcing bars S arranged in a lattice pattern. In addition, the transfer robot 200D includes an elevating machine 204D that moves the reinforcing bar binding machine 1A in an arrow Z1 direction approaching the disposition plane SF of the reinforcing bars S and in an arrow Z2 direction separating from the disposition plane SF.

Example of Binding Operation Based on Remaining Amount of Wire

Figure 27A:
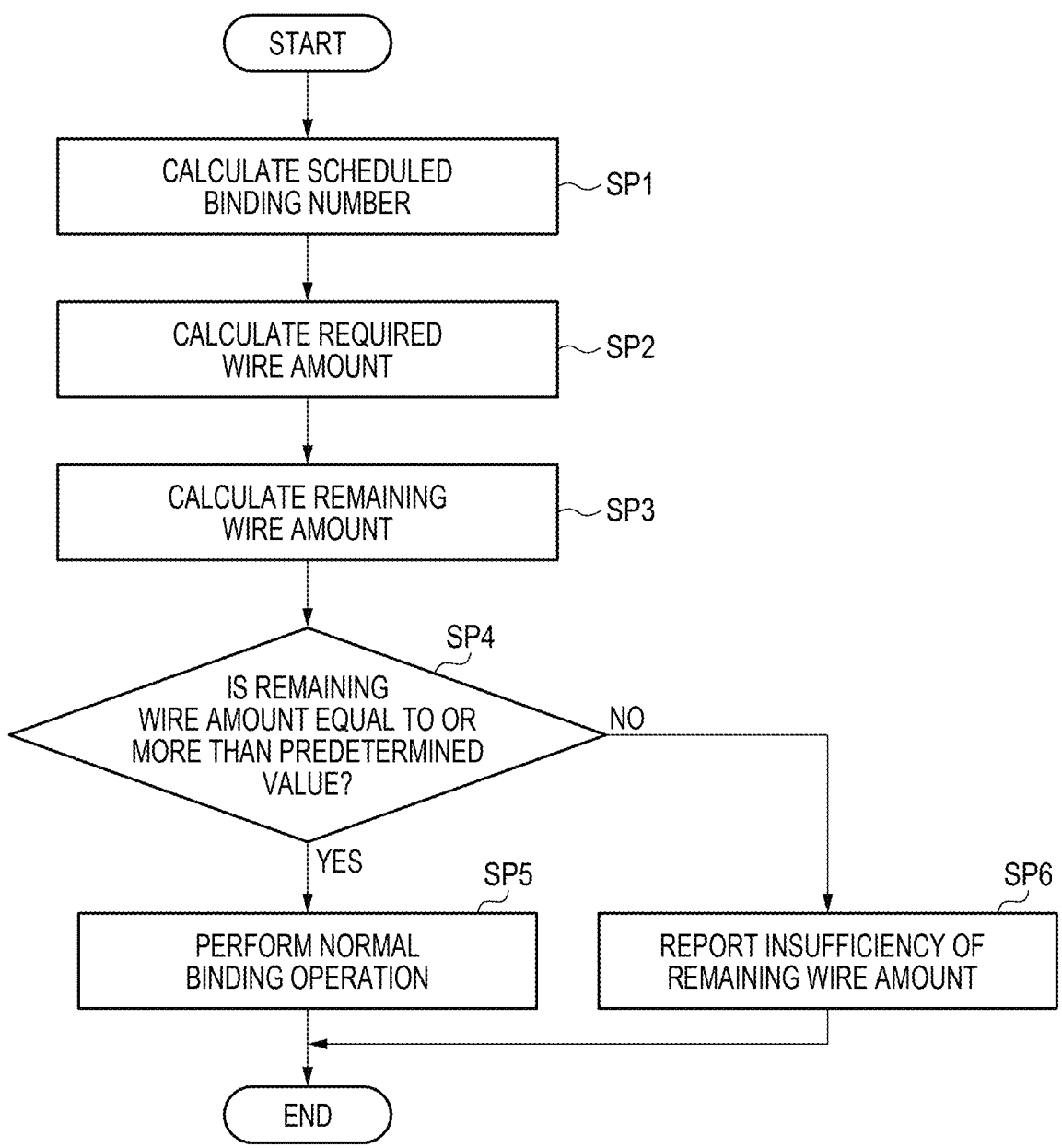
FIG. 27A is a flowchart illustrating an example of the binding operation based on a remaining amount of the wire.
Figure 27B:
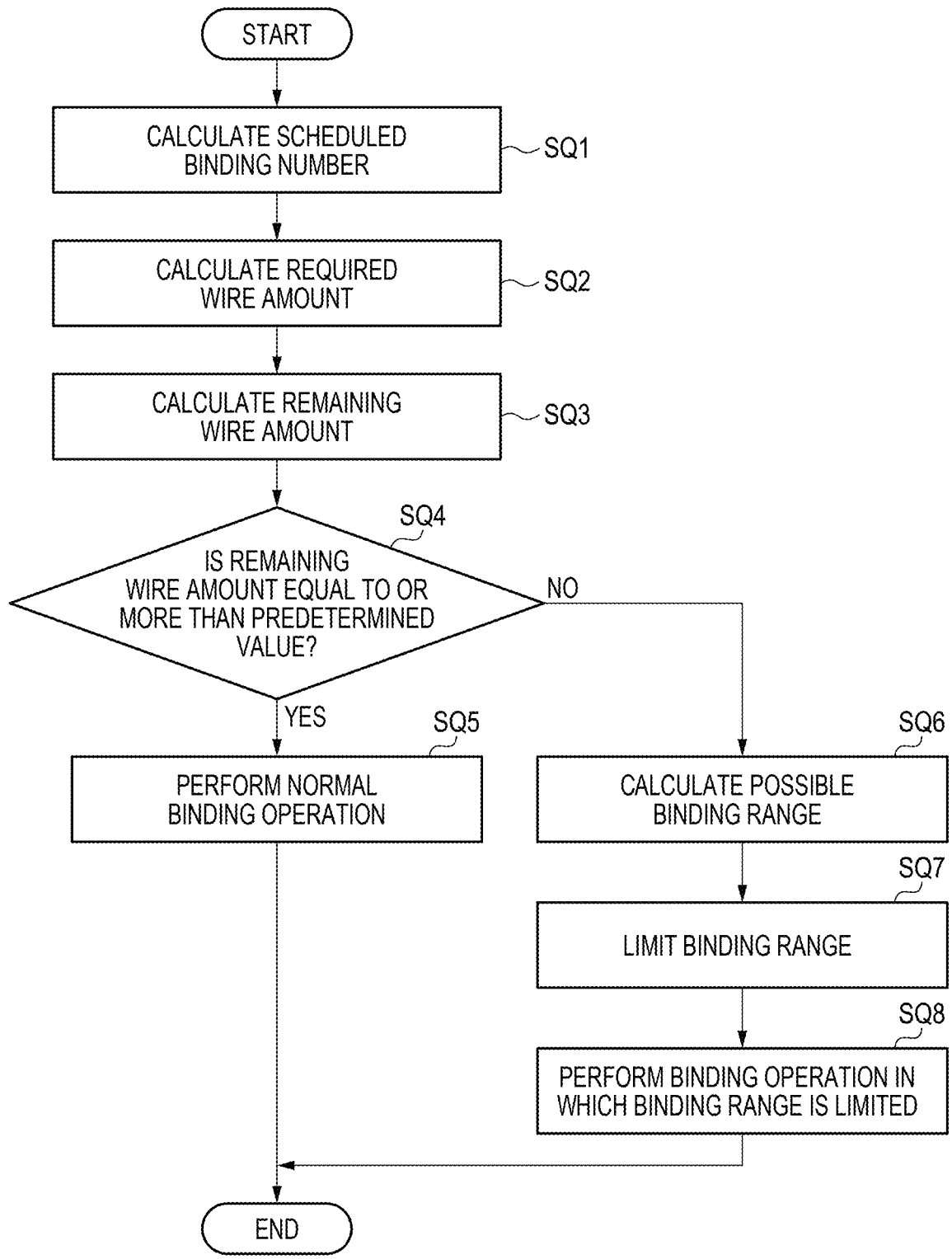
FIG. 27B is a flowchart illustrating an example of the binding operation based on the remaining amount of the wire.

FIGS. 27A and 27B are flowcharts illustrating examples of the binding operation based on a remaining amount of the wire. In the above-described reinforcing bar binding equipment 100A, 100B, and 100D and the binding device 100C, the remaining amount of the wire W may be detected, and the binding operation may be controlled based on the remaining amount of the wire W as the binding related information.

The information processing device 110a illustrated in FIGS. 4A, 4B, 4C, and 4D constitutes a scheduled binding number prediction means, and predicts the scheduled binding number required for binding the reinforcing bars S with the wire W in the structure by input of information, calculation based on the number of reinforcing bars S, or the like in step SP1 of FIG. 27A.

In addition, the information processing device 110a constitutes a required wire amount prediction means, and predicts the required wire amount required for binding the reinforcing bars S by the scheduled binding number required for binding the reinforcing bars S with the wire W, calculation based on the diameter of the reinforcing bars S, and the like in step SP2 of FIG. 27A.

The control unit 14 of the reinforcing bar binding machine 1A constitutes a remaining wire amount detection means, estimates a drawn out amount of the wire W based on a difference between the feed amount in the forward direction and the feed amount in the reverse direction of the wire W based on, for example, the rotation amount of the feed motor 31, and acquires the remaining wire amount wound around the reel 20 in step SP3 of FIG. 27A. In addition, the control unit 14 notifies the information processing device 110a of the remaining wire amount. The feed amount of the wire W in the forward direction is substantially constant regardless of the diameter of the reinforcing bars S or the like. On the other hand, the feed amount of the wire W in the reverse direction varies depending on the diameter of the reinforcing bars S around which the wire W is wrapped. Therefore, the remaining amount of the wire W can be acquired by estimating an amount of the wire W drawn out from the reel 20 based on the feed amount of the wire W in the reverse direction. The information processing device 110a may notify the reinforcing bar binding machine 1A of the scheduled binding number and the required wire amount.

In step SP4 of FIG. 27A, the information processing device 110a compares the required wire amount with the remaining wire amount, and determines whether the remaining wire amount is excessive or insufficient with respect to the required wire amount. When the information processing device 110a determines that the remaining wire amount is equal to or greater than a specified value with respect to the required wire amount, in step SP5 of FIG. 27A, the above-described binding operation is performed. When the information processing device 110a determines that the remaining wire amount is insufficient with respect to the required wire amount, in step SP6 of FIG. 27A, the report information is output.

When the information processing device 110a determines that the remaining wire amount is insufficient with respect to the required wire amount, the information processing device 110a may set the binding position P10 at which the binding operation is performed, control the transfer robot 200A based on the address of the binding position P10 to move the reinforcing bar binding machine 1A to the binding position P10, and control the transfer robots 200A and 200B to align the positions of the reinforcing bar binding machine 1A and the binding position P10 by the relative movement of the reinforcing bar binding machine 1A and the reinforcing bars S, and control the reinforcing bar binding machine 1A to perform the binding operation.

That is, the information processing device 110a constitutes the scheduled binding number prediction means, and predicts the scheduled binding number required for binding the reinforcing bars S with the wire W in the structure by input of information, calculation based on the number of reinforcing bars S, or the like in step SQ1 of FIG. 27B.

In addition, the information processing device 110a constitutes a wire usage amount prediction means, and predicts the required wire amount required for binding the reinforcing bars S by the scheduled binding number required for binding the reinforcing bars S with the wire W, calculation based on the diameter of the reinforcing bars S, and the like in step SQ2 of FIG. 27B.

The control unit 14 of the reinforcing bar binding machine 1A constitutes a remaining wire amount detection means, estimates a drawn out amount of the wire W based on a difference between the feed amount in the forward direction and the feed amount in the reverse direction of the wire W based on, for example, the rotation amount of the feed motor 31, and acquires the remaining wire amount wound around the reel 20 in step SQ3 of FIG. 27B. In addition, the control unit 14 notifies the information processing device 110a of the remaining wire amount.

In step SQ4 of FIG. 27B, the information processing device 110a compares the required wire amount with the remaining wire amount, and determines whether the remaining wire amount is excessive or insufficient with respect to the required wire amount. When the information processing device 110a determines that the remaining wire amount is equal to or greater than the specified value with respect to the required wire amount, in step SQ5 of FIG. 27B, the above-described normal binding operation in which the binding position is not limited is performed. When the information processing device 110a determines that the remaining wire amount is insufficient with respect to the required wire amount, in step SQ6 of FIG. 27B, a possible binding range with the remaining wire amount is calculated.

In a case where a standby position of the reinforcing bar binding machine 1A is set, for example, in step SQ7 of FIG. 27B, a binding position P10 close to the standby position is selected to limit a range of the binding position, and in step SQ8 of FIG. 27B, a binding operation in which the range of the binding position is limited is performed. Accordingly, for example, in the binding device 100C illustrated in FIG. 26A, when the reinforcing bar binding machine 1A moves to a binding position P10 far from the standby position, the wire W is prevented from running out. In addition, for example, a binding position P10 necessary for maintaining a shape of the structure is selected as the binding position to be preferentially bound, and the strength and the shape of the structure are maintained even when not all the binding positions P10 are bound.

Figure 28A:
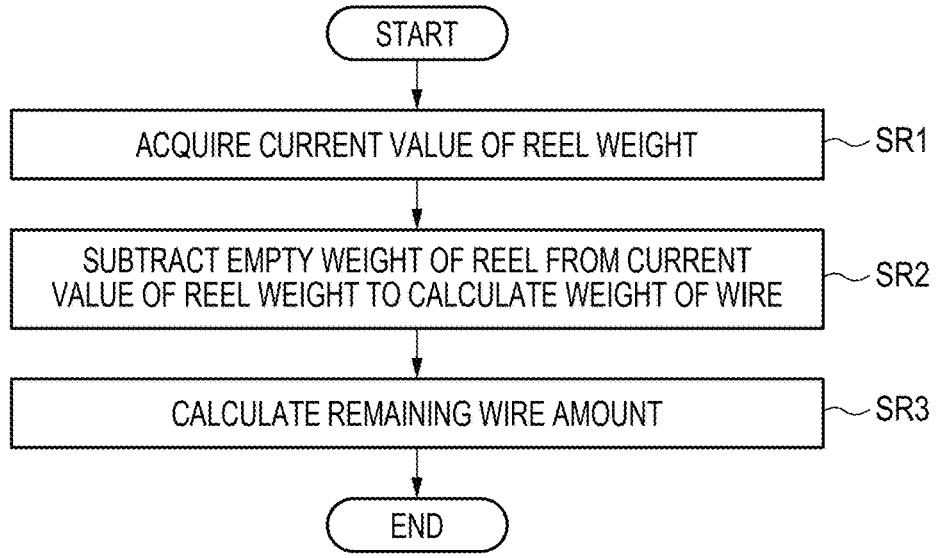
FIG. 28A is a flowchart illustrating an example of an operation of calculating a remaining wire amount.
Figure 28B:
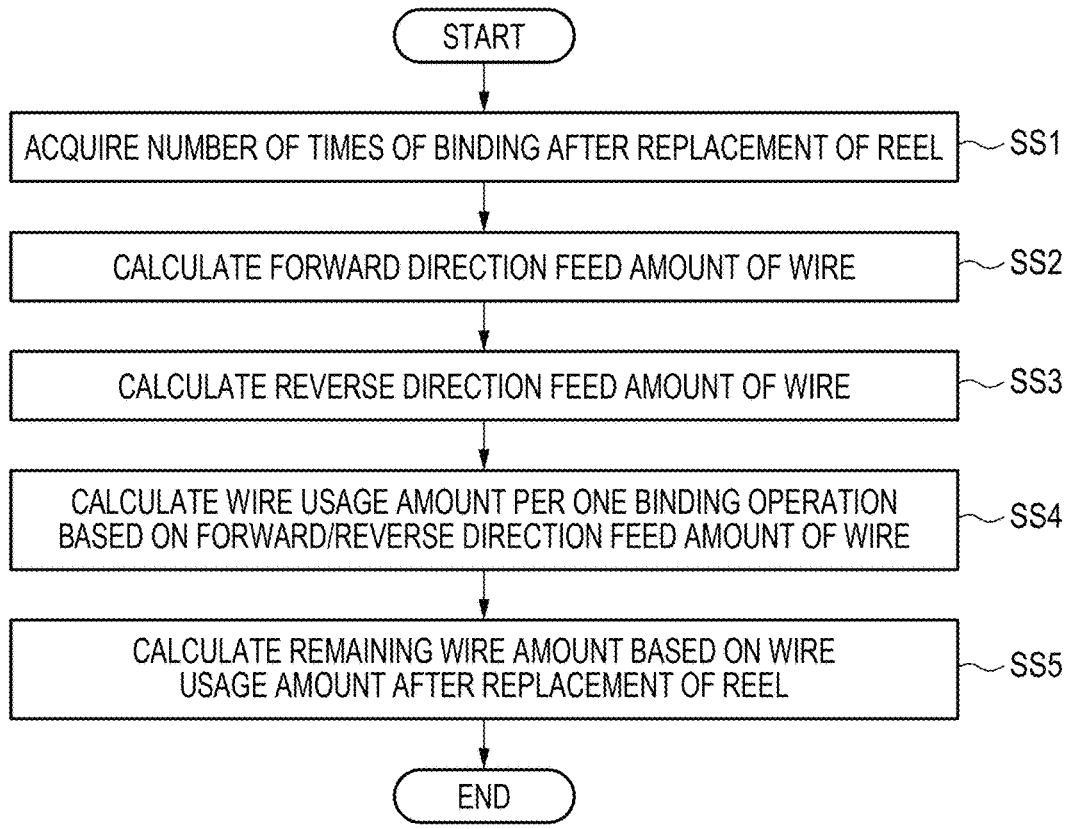
FIG. 28B is a flowchart illustrating an example of the operation of calculating the remaining wire amount.
Figure 28C:
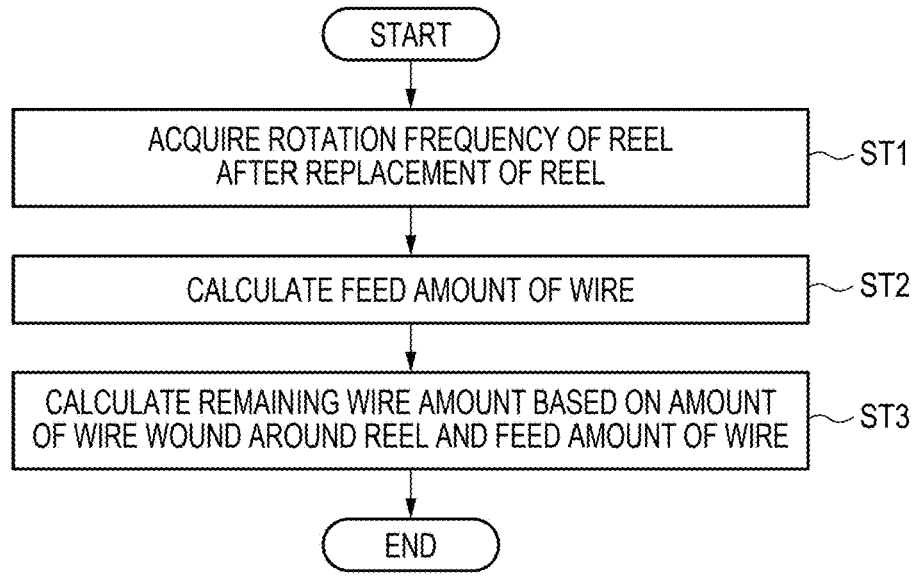
FIG. 28C is a flowchart illustrating an example of the operation of calculating the remaining wire amount.

FIGS. 28A, 28B, and 28C are flowcharts illustrating operation examples of calculating the remaining wire amount. The remaining amount of the wire W may be determined based on a weight of the reel 20. That is, a current value of the weight of the reel 20 is acquired in step SR1 of FIG. 28A, an empty weight of the reel 20 around which the wire W is not wound acquired in advance is subtracted from the current value of the weight of the reel 20 in step SR2 of FIG. 28A to calculate a weight of the wire W wound around the reel 20, and the remaining wire amount is calculated based on the weight of the wire W in step SR3 of FIG. 28A.

When the amount of the wire W wound around the reel 20 is large, the weight of the reel 20 becomes heavy, and when the amount of the wire W wound around the reel 20 is small, the weight of the reel 20 becomes light. Therefore, if a table or the like in which the weight of the reel 20 and the remaining amount of the wire W wound around the reel 20 are associated with each other is created, the remaining amount of the wire W to be wound around the reel 20 can be estimated based on the weight of the reel 20.

The remaining amount of the wire W may be determined based on the number of times of binding. That is, a length of the wire W wound around a new reel 20 is obtained in advance, and an amount of the wire W to be used in one binding operation is obtained in accordance with the diameter of the reinforcing bars S or the like, so that the remaining amount of the wire W to be wound around the reel 20 can be estimated based on the cumulative number of times of binding from the start of a use of the new reel 20.

For example, the number of times of binding after replacement of the reel 20 is acquired in step SS1 of FIG. 28B, a forward direction feed amount by which the wire W is fed in the forward direction is calculated based on the number of times of binding in step SS2 of FIG. 28B, and a reverse direction feed amount by which the wire W is fed in the reverse direction is calculated based on the number of times of binding in step SS3 of FIG. 28B. Then, in step SS4 of FIG. 28B, the wire usage amount per one binding operation is calculated based on a difference between the forward direction feed amount and the reverse direction feed amount, and in step SS5 of FIG. 28B, the wire usage amount after the replacement of the reel 20 is calculated based on the wire usage amount per one binding operation and the number of times of binding, and the remaining wire amount is calculated based on the wire usage amount.

The remaining amount of the wire W may be determined based on a rotation frequency of the reel 20. For example, assuming that a rotation speed of the reel 20 can be acquired by a sensor (not illustrated), the rotation frequency of the reel 20 after the replacement is acquired in step ST1 of FIG. 28C. In step ST2 of FIG. 28C, the feed amount of the wire W is calculated based on the rotation frequency of the reel 20, and in step ST3 of FIG. 28C, the remaining wire amount is calculated based on the length of the wire W wound around the new reel 20 acquired in advance and the feed amount of the wire W.

Figure 29A:
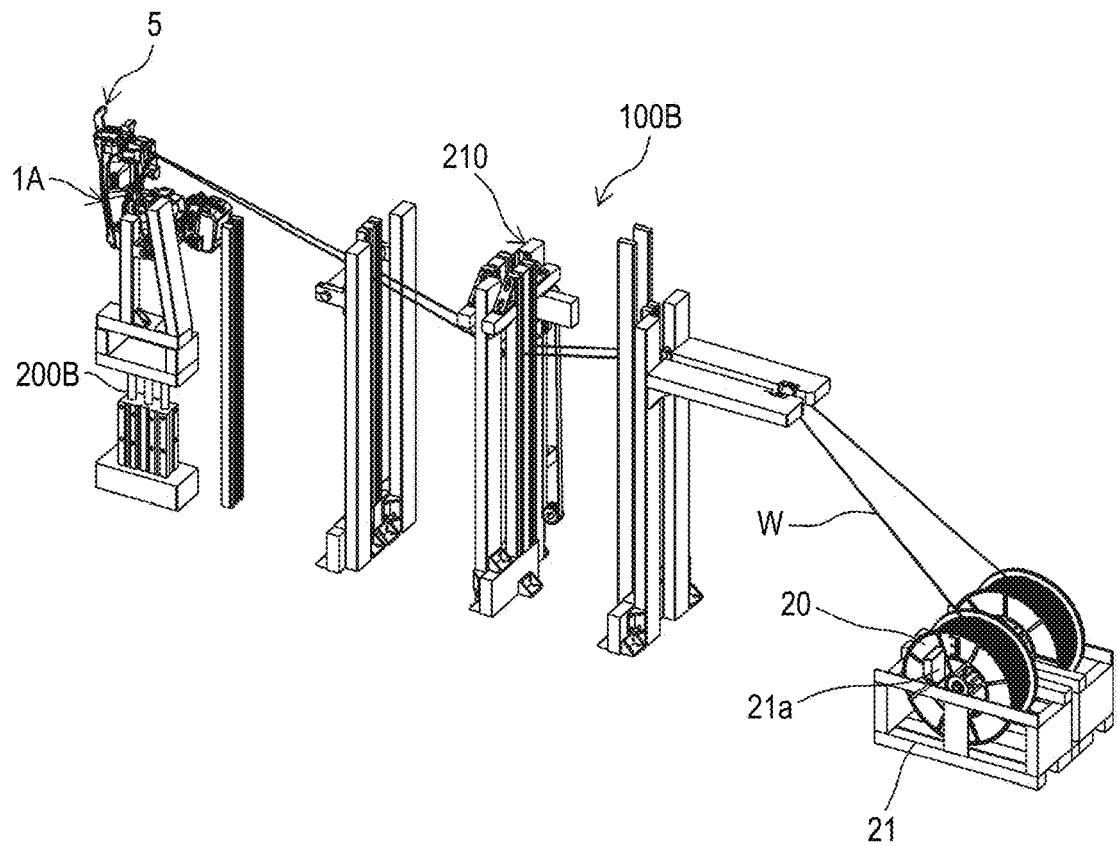
FIG. 29A is a perspective view illustrating a modification of the binding equipment according to the present embodiment.
Figure 29B:
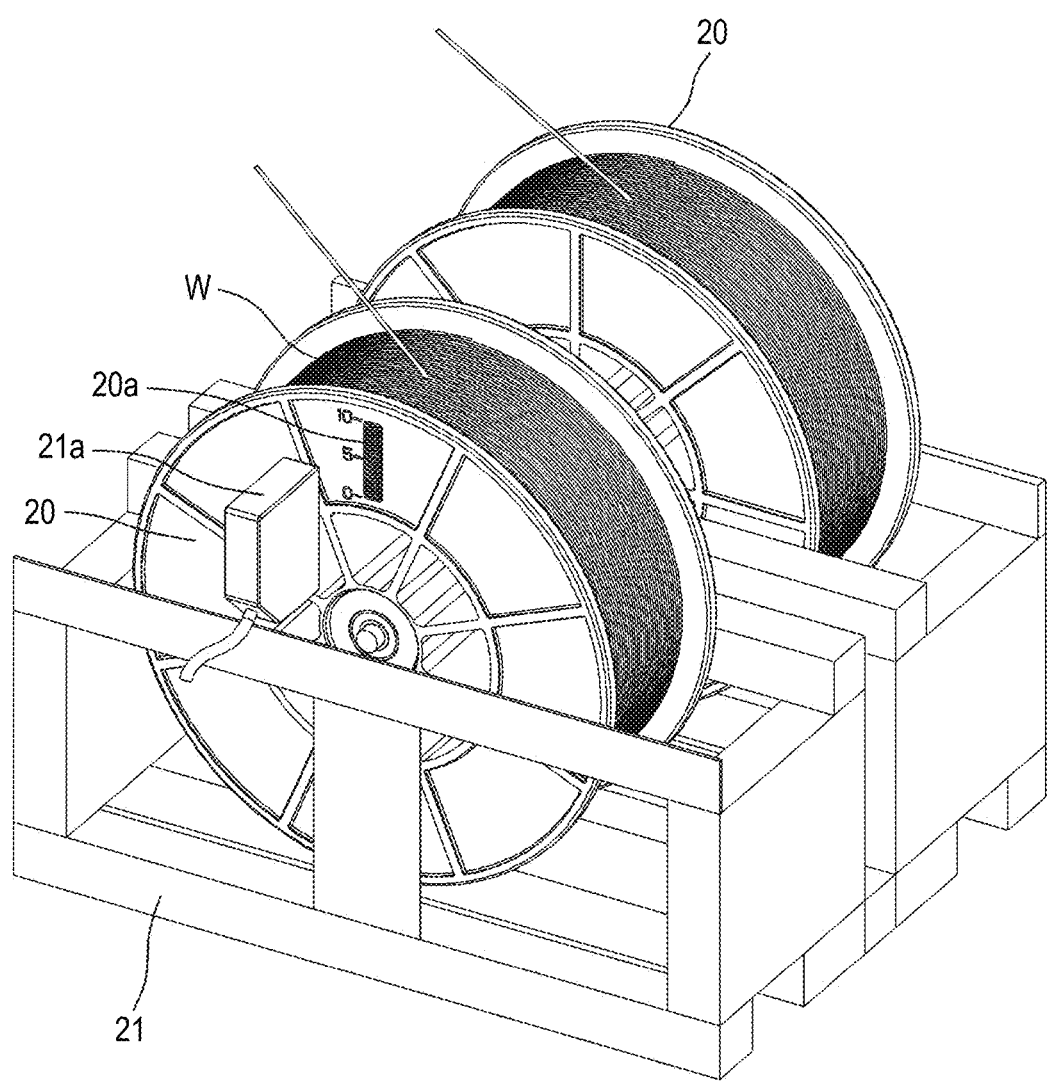
FIG. 29B is a perspective view illustrating a configuration of main parts of a reel accommodation unit.

FIG. 29A is a perspective view illustrating a modification of the binding equipment according to the present embodiment, and FIG. 29B is a perspective view illustrating a configuration of a main part of a reel accommodation unit. In a configuration in which the reel accommodation unit 21 that accommodates the reel 20 around which the wire W is wound is independent of the reinforcing bar binding machine 1A as the binding equipment 100B illustrated in FIG. 1C, FIG. 29A, and the like, it is possible to add a configuration of acquiring the remaining amount of the wire W wound around the reel 20 while diverting an existing reinforcing bar binding machine 1A.

The reel accommodation unit 21 includes a remaining wire amount detection unit 21a that detects the remaining amount of the wire W wound around the reel 20. In the configuration in which the reinforcing bars S are bound with two wires W, two reels 20 are rotatably attached to the reel accommodation unit 21.

The remaining wire amount detection unit 21a is an example of a remaining wire amount detection means, and includes, for example, an optical sensor. The remaining wire amount detection unit 21a detects the remaining amount of the wire W wound around the reel 20 by detecting a height of the wire W exposed to an opening 20a provided in a side surface of the reel 20 from a core portion (not illustrated).

What is claimed is:

1. A binding system comprising:
    a binding device including a binding machine that binds reinforcing bars with a wire, and a transfer robot that moves the binding machine to a binding position by a relative movement between the binding machine and the reinforcing bars;
    a sensor capable of acquiring information based on optical information or magnetic information, or a camera capable of acquiring information based on image information, configured to acquire binding related information related to an operation of binding the reinforcing bars with the wire; and
    a personal computer, a smartphone, or a tablet configured to acquire position information of the binding position in a manner associable with the binding related information for the binding position acquired by the sensor or the camera,
    wherein the personal computer, the smartphone, or the tablet is configured to store the binding related information and the position information in association with each other,
    wherein the personal computer, the smartphone, or the tablet is configured to determine, based on the binding related information, whether binding is normally performed, and to associate binding result information corresponding to a binding result with the position information,
    wherein the personal computer, the smartphone, or the tablet is configured to determine whether a predetermined number of times or more abnormal binding results have occurred in a structure in which a plurality of binding positions are formed, and to stop a binding operation when it is determined that the predetermined number of times or more abnormal binding results have occurred in the structure, and
    wherein the personal computer, the smartphone, or the tablet is configured to determine, based on the position information of the binding position in the structure at which the binding result is abnormal, whether transport of the structure is difficult, and to output report information when it is determined that transport of the structure is difficult.

2. The binding system according to claim 1, wherein association between the binding related information acquired by the sensor or the camera and the position information includes association in a manner that allows comparison between the binding related information and the position information.

3. The binding system according to claim 1, wherein the personal computer, the smartphone, or the tablet is configured to output report information in which the binding related information and the position information are associated with each other.

4. The binding system according to claim 1, wherein the personal computer, the smartphone, or the tablet is configured to output report information in which the binding result information corresponding to the binding result and the position information are associated with each other.

5. The binding system according to claim 1, wherein the personal computer, the smartphone, or the tablet is configured to perform, when it is determined that the binding result is abnormal, the binding operation again at the binding position specified by an address associated with the binding result information indicating that the binding result is abnormal.

6. The binding system according to claim 5, further comprising another binding device, wherein the personal computer, the smartphone, or the tablet is configured to perform, when it is determined that the binding result is abnormal, the binding operation by the other binding device at the binding position specified by the address associated with the binding result information indicating that the binding result is abnormal.

7. A method for binding reinforcing bars with a wire using a binding device, the binding device including a binding machine that binds the reinforcing bars with a wire, and a transfer robot that moves the binding machine to a binding position by a relative movement between the binding machine and the reinforcing bars, the method comprising computer-implemented steps of:
    acquiring, by a sensor capable of acquiring information based on optical information or magnetic information, or a camera capable of acquiring information based on image information, binding related information related to an operation of binding the reinforcing bars with the wire;

acquiring, by a personal computer, a smartphone, or a tablet, position information of the binding position in a matter associable with the binding related information for the binding position;

storing, by the personal computer, a smartphone, or a tablet, the binding related information and the position information in association with each other;

determining, by the personal computer, a smartphone, or a tablet and based on the binding related information, whether binding is normally performed;

associating, by the personal computer, a smartphone, or a tablet, binding result information corresponding to a binding result with the position information;

determining, by the personal computer, a smartphone, or a tablet, whether a predetermined number of times or more abnormal binding results have occurred in a structure in which a plurality of binding positions are formed;

stopping, by the personal computer, a smartphone, or a tablet, a binding operation when it is determined that the predetermined number of times or more abnormal binding results have occurred in the structure;

determining, by the personal computer, the smartphone, or the tablet and based on the position information of the binding position in the structure at which the binding result is abnormal, whether transport of the structure is difficult; and outputting, by the personal computer, the smartphone, or the tablet, report information when it is determined that transport of the structure is difficult.

8. The method according to claim 7, further comprising computer-implemented step of:

performing, when it is determined that the binding result is abnormal, the binding operation again at the binding position specified by an address associated with the binding result information indicating that the binding result is abnormal.

9. A non-transitory computer-readable storage medium storing a program for causing a computer to execute the method according to claim 7.

* * * * *